United States Patent
Becker et al.

(10) Patent No.: US 7,822,281 B2
(45) Date of Patent: Oct. 26, 2010

(54) DIGITAL VIDEO COMPRESSION

(75) Inventors: Axel Becker, Cammeray (AU); Woei Chan, Darlinghurst (AU); James Philip Andrew, Waverton (AU); David Dominique M Poulouin, Saint Donan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1350 days.

(21) Appl. No.: 10/958,484

(22) Filed: Oct. 6, 2004

(65) Prior Publication Data

US 2005/0100229 A1 May 12, 2005

(30) Foreign Application Priority Data

| Oct. 31, 2003 | (AU) | ............................. | 2003906071 |
| Oct. 31, 2003 | (AU) | ............................. | 2003906072 |
| Oct. 31, 2003 | (AU) | ............................. | 2003906073 |
| Oct. 31, 2003 | (AU) | ............................. | 2003906091 |

(51) Int. Cl.
*G06K 9/36* (2006.01)
*G06K 9/46* (2006.01)

(52) U.S. Cl. ........................ 382/239; 382/232; 382/240

(58) Field of Classification Search ................. 382/232, 382/239, 240
See application file for complete search history.

(56) References Cited

U.S. PATENT DOCUMENTS

| 6,263,110 B1 | 7/2001 | Andrew et al. ............... 382/232 |
| 6,351,568 B1 | 2/2002 | Andrew ....................... 382/239 |
| 6,389,074 B1 | 5/2002 | Andrew ................. 375/204.05 |
| 6,683,991 B1 | 1/2004 | Andrew et al. ............... 382/240 |
| 2002/0091665 A1 | 7/2002 | Beek et al. ...................... 707/1 |
| 2003/0185453 A1* | 10/2003 | Joshi et al. ................... 382/239 |
| 2004/0047511 A1 | 3/2004 | Tzannes et al. ............. 382/232 |
| 2004/0146205 A1* | 7/2004 | Becker et al. ............... 382/232 |
| 2004/0228537 A1* | 11/2004 | Yeung et al. ................ 382/239 |

FOREIGN PATENT DOCUMENTS

| AU | 2003/248470 A1 | 4/2004 |
| JP | 2000-188552 | 7/2000 |
| JP | 2002-359850 A | 12/2002 |
| WO | WO 2004/006188 A2 | 1/2004 |

OTHER PUBLICATIONS

Fan, X.—"Flicking Reduction in All Intra Frame Coding"—Oct. 2002—JVT-E070—pp. 1-8.*
Taubman, D.—"High performance scalable image compression with EBCOT"—IEEE 2000, pp. 1158-1170.*

(Continued)

*Primary Examiner*—Bhavesh M Mehta
*Assistant Examiner*—Bernard Krasnic
(74) *Attorney, Agent, or Firm*—Fitzpatrick, Cella, Harper & Scinto

(57) ABSTRACT

A method of compressing a current image of a sequence of images. The current image is transformed with a predetermined transform to provide a set of transform coefficients, which are divided into blocks. An encoding termination condition is determined for at least one block, and the block is encoded in a series of coding passes. In a current coding pass, a performance measure is predicted, and encoding is terminated if the performance measure satisfies the encoding termination condition. Different color components may be given different weightings.

11 Claims, 27 Drawing Sheets

OTHER PUBLICATIONS

Alexis P. Tzannes, "An Iterative Rate Control Technique for Motion JPEG2000," JPEG 2000 Session, SPIE Annual Meeting Seattle, SPIE, pp. 1-8, Jul. 2002.

JPEG 2000 Part I Final Committee Draft Version 1.0, ISO/IEC FCD 15444-1 (Part I), pp. 1-190, Mar. 16, 2000, ISO/IEC JTC 1/SC 29/WG1 N1646R.

JPEG 2000 Part II Final Committee Draft, ISO/IEC FCD 15444-2 (Part II), pp. 1-332, Dec. 7, 2000, ISO/IEC JTC 1/SC 29/WG1 N2000.

Motion JPEG 2000 Final Committee Draft 1.0, ISO/IEC 15444-3 (Part III), pp. 1-42, Mar. 2001, ISO/IEC JTC 1/SC 29/WG1 N2117.

Yeung, Y.M, et al., "Successive Bit-Plane Rate Allocation Technique for JPEG 2000 Image Coding", Proceedings of the IEEE International Conference on Acoustics, Speech, and Signal Processing, vol. 3, pp. III-261-III-264, Apr. 6, 2003.

Chang, Te-Hao, et al., "Computation Reduction Technique for Lossy JPEG2000 Encoding Through Ebcot Tier-2 Feedback Processing", Proceedings of the International Conference on Image Processing, vol. 3, pp. III-85-III-88, 2002.

* cited by examiner

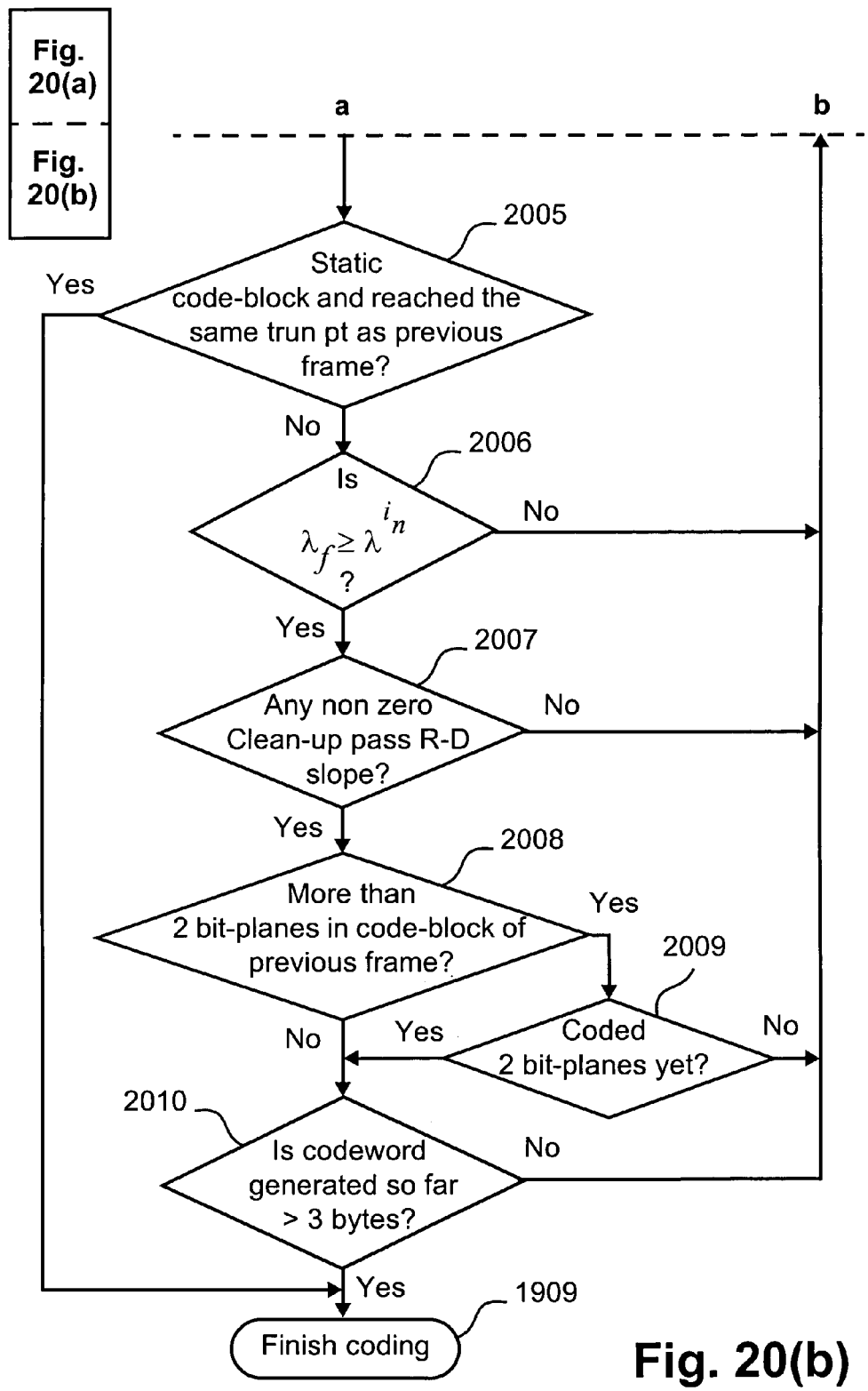

DIGITAL VIDEO COMPRESSION

CROSS-REFERENCE TO RELATED PATENT APPLICATIONS

This application claims the right of priority under 35 U.S.C. §119 based on Australian Patent Applications 2003906071, 2003906072, 2003906073 and 2003906091, all filed on 31 Oct. 2003, which are incorporated by reference herein in their entirety as if fully set forth herein.

FIELD OF THE INVENTION

The present invention relates to the field of digital video compression. In particular, it relates to a method of encoding a sequence of video frames and to rate control in video encoding applications. The invention also relates to an apparatus and a computer program for encoding a sequence of video frames.

BACKGROUND

Digital images and videos are stored and used on many devices, including general-purpose computers, digital still cameras and digital video cameras. Digital images and videos are typically stored in compressed form on devices in order to reduce storage, memory and bandwidth costs. A widely used standard for image compression is the "Joint Photographic Experts Group" or JPEG standard. An emerging new standard for image compression is the JPEG2000 standard. Both JPEG and JPEG2000 are nominally still image compression standards. While JPEG is predominantly used to compress a still image, there are various video encoding formats known loosely as "Motion JPEG". Motion JPEG encodes each frame of a video as a still image using JPEG, and provides a compressed video stream format for wrapping all the encoded frames of a video into a Motion JPEG encoded stream. However, Motion JPEG was never formally standardized. Currently, the JPEG2000 standard provides for a still image compression mode, which is described in the JPEG 2000 Final Committee Draft Version 1.0, 16 Mar. 2000, ISO/IEC FCD 15444-1 (Part I), and the JPEG 2000 Final Committee Draft, 7 Dec. 2000, ISO/IEC FCD 15444-2 (Part II) publications. It is also proposed that the JPEG2000 standard provide for a video encoding mode known as Motion JPEG2000, which is described in the publication Motion JPEG 2000 Final Committee Draft 1.0, 14 Mar. 2001 ISO/IEC 15444:3 (Part III) 2000. Motion JPEG2000 is analogous to Motion JPEG in that single frames of a video are encoded with JPEG2000 (in a still image mode) and the resulting compressed frames wrapped into a compressed video stream (eg. file format). While there are other video encoding formats, such as the MPEG family, that potentially offer better compression than the JPEG motion family (Motion JPEG or Motion JPEG2000), the JPEG motion family offers several different advantages. In addition Motion JPEG2000 offers a suite of features inherited from JPEG2000 in still image mode.

For the purpose of this description the term "JPEG2000" will be used to refer to the JPEG2000 standard in a still image mode—that is for compressing/decompressing a still image (one frame of a video), and "Motion JPEG2000" (MJ2K) when referring to JPEG2000 standard in a video compressing/decompressing mode.

An important decision to be made when compressing images or videos is how many bytes are available for the compressed images and videos. The higher the compression rate the lower the number of bytes required for storage and transmission. The trade-off is that quality of the resulting decompressed image or video generally decreases as the compression rate increases. One goal is to maximize the compression while maintaining an acceptable level of quality or alternatively maximizing the image or video quality within a constant number of bytes. A technique recommended by the JPEG2000 standard to maximize image quality at a given rate is to use a rate control strategy called the post-coding rate distortion optimization (PCRD-opt). The optimization is employed when the actual coding itself is complete but the available byte budget is exceeded. PCRD-opt is then used to trim back (i.e. to discard part of the compressed data) the compressed data to fit the desired target bit-rate at for example, the highest achievable image quality. One problem with the compression scheme utilizing PCRD-opt as recommended by the JPEG2000 standard is that often code-blocks are overcoded, i.e. more coding passes are made than are necessary. Too much overcoding will slow the compression scheme. Furthermore, overcoding increases the amount of memory required to buffer the intermediate compressed data.

In addition to rate control there are various important compression system parameters affecting quality. For example, in JPEG and JPEG2000 a set of subband or coefficient weights is used to emphasize the importance of low frequencies as opposed to high frequencies commensurate with the response of the human visual system. In JPEG2000 these are typically referred to as "human visual weights".

Compressing a video sequence introduces a different set of distortions than are encountered in encoding a single frame. For example, when MJ2K videos are decoded and displayed, distortion can appear as a type of rapidly moving noise, called flicker. Often this flicker is not readily apparent in each decompressed frame, and only becomes apparent when the frames are displayed in rapid succession as when displaying the decoded video. In addition since MJ2K encodes each video frame independently, when PCRD-opt is used, corresponding code-blocks in subsequent frames are often truncated to different bit-planes resulting in another form of flicker called "code-block truncation flicker". Various sets of human visual weights have been proposed as means of ameliorating flicker. These visual weightings are generally derived according to the human contrast sensitivity function (CSF). Visual weighting typically consists of a fixed weighting for the luminance and chrominance components according to the CSF. However, the improvement from such specific weights for reducing flicker is not substantial, and further improvement remains desirable.

SUMMARY

It is an object of the present invention to substantially overcome, or at least ameliorate, one or more disadvantages of existing arrangements.

According to a first aspect of the invention there is provided a method of compressing a current image of a sequence of images, said method comprising the steps of:

(a) transforming the current image with a predetermined transform to provide a set of transform coefficients;

(b) dividing the set of transform coefficients into blocks;

(c) determining an encoding termination condition for at least one block;

(d) encoding the at least one block in a series of coding passes;

(e) predicting, in a current coding pass, a performance measure; and (f) terminating encoding of the at least one block if the predicted performance measure satisfies the encoding termination condition.

According to a second aspect of the invention there is provided a method of compressing a current image of a sequence of images, the method comprising the steps of:

(a) transforming the current image with a predetermined transform to provide a set of transform coefficients;

(b) dividing the set of transform coefficients into blocks;

(c) determining an encoding termination condition for at least one block;

(d) encoding the at least one block in a series of coding passes;

(e) predicting, in a current coding pass, a performance measure for a subsequent coding pass in the series; and (f) terminating encoding of the at least one block before the subsequent coding pass if the predicted performance measure satisfies the encoding termination condition.

According to a third aspect of the invention there is provided a method of compressing a current image of a sequence of images, the method comprising the steps of:

(a) transforming the current image with a predetermined transform to provide a set of transform coefficients;

(b) dividing the set of transform coefficients into blocks;

(c) comparing the blocks with corresponding blocks of a previous image in the sequence;

(d) designating at least one block as a static block if the comparing step shows that a difference between the at least one block and the corresponding previous block is small according to a predetermined criterion;

(e) encoding the transform coefficients to provide a compressed bit-stream wherein, if a current coefficient falls in a static block, the current coefficient is encoded to a truncation bit-plane that is the same as a truncation bit-plane of the corresponding previous block.

According to a fourth aspect of the invention there is provided a method of compressing a current image of a sequence of images, the current image being defined with respect to a plurality of color-space components, said method comprising the steps of:

determining an encoding termination condition for the current image;

encoding a first set of components of the current image until the encoding termination condition is reached;

estimating a compressibility of the current image relative to a previous image in the sequence based on the encoded first set of components and corresponding encoded components of the previous image;

weighting the encoding termination condition based on the estimated compressibility; and encoding a second set of components of the current image until the weighted encoding termination condition is reached.

According to a further aspect of the invention there is provided an apparatus for compressing a current image of a sequence of images, said apparatus comprising:

(a) means for transforming the current image with a predetermined transform to provide a set of transform coefficients;

(b) means for dividing the set of transform coefficients into blocks;

(c) means for determining an encoding termination condition for at least one block;

(d) means for encoding the at least one block in a series of coding passes;

(e) means for predicting, in a current coding pass, a performance measure; and (f) means for terminating encoding of the at least one block if the predicted performance measure satisfies the encoding termination condition.

According to a further aspect of the invention there is provided an apparatus for compressing a current image of a sequence of images, the apparatus comprising:

(a) means for transforming the current image with a predetermined transform to provide a set of transform coefficients;

(b) means for dividing the set of transform coefficients into blocks;

(c) means for determining an encoding termination condition for at least one block;

(d) means for encoding the at least one block in a series of coding passes;

(e) means for predicting, in a current coding pass, a performance measure for a subsequent coding pass in the series; and (f) means for terminating encoding of the at least one block before the subsequent coding pass if the predicted performance measure satisfies the encoding termination condition.

According to a further aspect of the invention there is provided an apparatus for compressing a current image of a sequence of images, the apparatus comprising:

(a) means for transforming the current image with a predetermined transform to provide a set of transform coefficients;

(b) means for dividing the set of transform coefficients into blocks;

(c) means for comparing the blocks with corresponding blocks of a previous image in the sequence;

(d) means for designating at least one block as a static block if the means for comparing shows that a difference between the at least one block and the corresponding previous block is small according to a predetermined criterion;

(e) means for encoding the transform coefficients to provide a compressed bit-stream wherein, if a current coefficient falls in a static block, the current coefficient is encoded to a truncation bit-plane that is the same as a truncation bit-plane of the corresponding previous block.

According to a further aspect of the invention there is provided an apparatus for compressing a current image of a sequence of images, the current image being defined with respect to a plurality of color-space components, the apparatus comprising:

means for determining an encoding termination condition for the current image;

means for encoding a first set of components of the current image until the encoding termination condition is reached;

means for estimating a compressibility of the current image relative to a previous image in the sequence based on the encoded first set of components and corresponding encoded components of the previous image;

means for weighting the encoding termination condition based on the estimated compressibility; and means for encoding a second set of components of the current image until the weighted encoding termination condition is reached.

According to a further aspect of the invention there is provided a system for compressing a current image in a sequence of images, the system comprising:

a storage unit that stores information descriptive of the compression of previous images in the sequence; and a processor connected to said storage unit and adapted to:
transform the current image with a predetermined transform to provide a set of transform coefficients;
divide the set of transform coefficients into blocks;

determine an encoding termination condition for at least one block, wherein the termination condition depends on the stored information for one or more previous images in the sequence;

encode the at least one block in a series of coding passes;

predict, in a current coding pass, a performance measure;

terminate encoding of the at least one block if the predicted performance measure satisfies the encoding termination condition; and store information descriptive of the compression of the current image in said storage unit.

According to a further aspect of the invention there is provided a system for compressing a current image in a sequence of images, the system comprising:

a storage unit that stores information descriptive of the compression of previous images in the sequence; and a processor connected to said storage unit and adapted to:

transform the current image with a predetermined transform to provide a set of transform coefficients;

divide the set of transform coefficients into blocks;

determine an encoding termination condition for at least one block, wherein the termination condition depends on the stored information for one or more previous images in the sequence;

encode the at least one block in a series of coding passes;

predict, in a current coding pass, a performance measure for a subsequent coding pass in the series;

terminate encoding of the at least one block before the subsequent coding pass if the predicted performance measure satisfies the encoding termination condition; and store information descriptive of the compression of the current image in said storage unit.

According to a further aspect of the invention there is provided a system for compressing a current image of a sequence of images, the system comprising:

a storage unit that stores transform coefficients of the current image and transform coefficients of a previous image in the sequence wherein the transform coefficients are obtained by applying a predetermined transform to the image and the previous image and wherein the stored transform coefficients are divided into blocks; and a processing unit that:

(a) compares each block of the current image with the corresponding block of the previous image and designates as static those blocks of the current image that are substantially the same as the corresponding previous block; and (b) encodes the transform coefficients of the current image to provide a compressed bit-stream wherein, if a current one of the coefficients falls in a static block, the processing unit encodes the coefficient to a truncation bit-plane that is the same as the truncation bit-plane of the corresponding previous block.

According to a further aspect of the invention there is provided a system for compressing a current image of a sequence of images, the system comprising:

a storage unit that stores a compressed version of a previous image in the sequence; and a processing unit that:

(a) determines an encoding termination condition for the current image;

(b) encodes a first set of components of the current image until the encoding termination condition is reached;

(c) estimates a compressibility of the current image relative to the previous image based on the encoded set of components and corresponding encoded components retrieved from the storage unit;

(d) weights the encoding termination condition based on the estimated compressibility, and (e) encodes a second set of components of the current image until the weighted encoding termination condition is reached.

According to a further aspect of the invention there is provided a computer program product comprising machine-readable program code recorded on a machine-readable recording medium, for controlling the operation of a data processing apparatus on which the program code executes to perform a method of compressing a current image of a sequence of images, the method comprising the steps of:

(a) transforming the current image with a predetermined transform to provide a set of transform coefficients;

(b) dividing the set of transform coefficients into blocks;

(c) determining an encoding termination condition for at least one block;

(d) encoding the at least one block in a series of coding passes;

(e) predicting, in a current coding pass, a performance measure; and (f) terminating encoding of the at least one block if the predicted performance measure satisfies the encoding termination condition.

According to a further aspect of the invention there is provided a computer program product comprising machine-readable program code recorded on a machine-readable recording medium, for controlling the operation of a data processing apparatus on which the program code executes to perform a method of compressing a current image of a sequence of images, the method comprising the steps of:

(a) transforming the current image with a predetermined transform to provide a set of transform coefficients;

(b) dividing the set of transform coefficients into blocks;

(c) determining an encoding termination condition for at least one block;

(d) encoding the at least one block in a series of coding passes;

(e) predicting, in a current coding pass, a performance measure for a subsequent coding pass in the series; and (f) terminating encoding of the at least one block before the subsequent coding pass if the predicted performance measure satisfies the encoding termination condition.

According to a further aspect of the invention there is provided a computer program product comprising machine-readable program code recorded on a machine-readable recording medium, for controlling the operation of a data processing apparatus on which the program code executes to perform a method of compressing a current image of a sequence of images, the method comprising the steps of:

(a) transforming the current image with a predetermined transform to provide a set of transform coefficients;

(b) dividing the set of transform coefficients into blocks;

(c) comparing the blocks with corresponding blocks of a previous image in the sequence;

(d) designating at least one block as a static block if the comparing step shows that a difference between the at least one block and the corresponding previous block is small according to a predetermined criterion;

(e) encoding the transform coefficients to provide a compressed bit-stream wherein, if a current coefficient falls in a static block, the current coefficient is encoded to a truncation bit-plane that is the same as a truncation bit-plane of the corresponding previous block.

According to a further aspect of the invention there is provided a computer program product comprising machine-readable program code recorded on a machine-readable recording medium, for controlling the operation of a data processing apparatus on which the program code executes to perform a method of compressing a current image of a sequence of images, the current image being defined with respect to a plurality of color-space components, the method comprising the steps of:

determining an encoding termination condition for the current image;

encoding a first set of components of the current image until the encoding termination condition is reached;

estimating a compressibility of the current image relative to a previous image in the sequence based on the encoded first set of components and corresponding encoded components of the previous image;

weighting the encoding termination condition based on the estimated compressibility; and encoding a second set of components of the current image until the weighted encoding termination condition is reached.

BRIEF DESCRIPTION OF THE DRAWINGS

Some aspects of the prior art and a number of embodiments of the present invention will now be described with reference to the drawings, in which:

FIG. 20(a) and 20(b) shows a flow chart of termination conditions for use in the method of FIG. 19;

DETAILED DESCRIPTION INCLUDING BEST MODE

Figure 1:
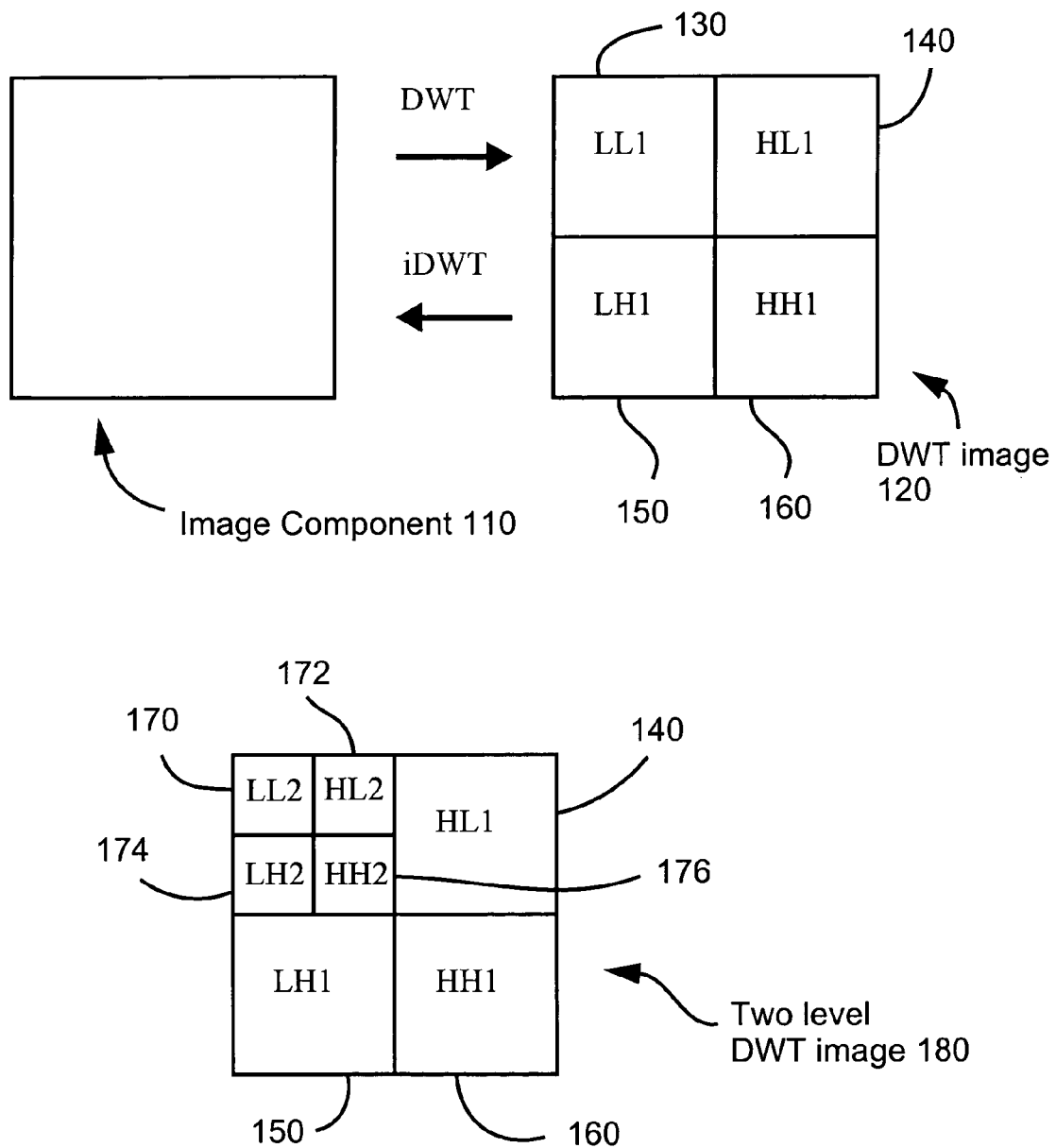
FIG. 1 illustrates the transformation of an original image component into a corresponding single level DWT image and into a two level DWT image according to the prior art JPEG2000 standard.

Where reference is made in any one or more of the accompanying drawings to steps and/or features which have the same reference numerals, those steps and/or features have for the purposes of this description the same function(s) or operation(s), unless the contrary intention appears.

The principles of the arrangements described herein have general applicability to encoding a sequence of video frames. However, for ease of explanation, the arrangements are described with reference to MJ2K. However, it is not intended that the present invention be limited to the described arrangements. For example, the invention may have application to a number of intra-frame video compression methods based on wavelet encoding.

1.0 Overview of JPEG2000

Before describing various implementations of the present invention, a brief review of JPEG2000 will be undertaken in order to assist in the understanding of the invention. The review concentrates on the parts of JPEG2000 most relevant to the present invention. Furthermore, for the purposes of the description of the arrangements of the invention, the terminology used herein is the same as that described in the aforementioned JPEG2000 (Part I, Part II, and Part III) publications, unless the contrary intention appears.

Figure 5:
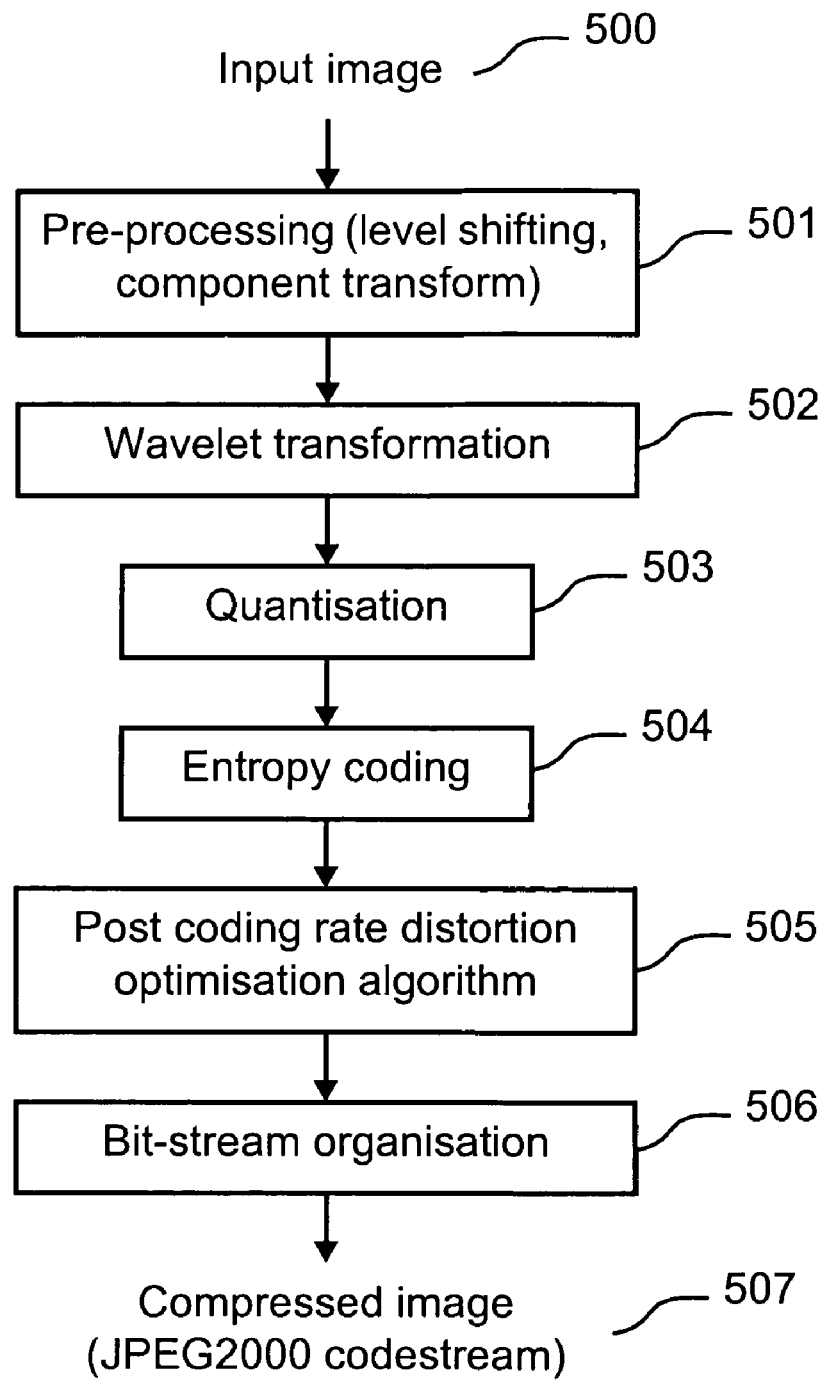
FIG. 5 shows a flow chart of a method of compressing an input image into a JPEG2000 format.

The encoding of a JPEG2000 image is summarized in FIG. 5. An input image 500 is optionally pre-processed in step 501. The pre-processing includes level shifting and component transformation. For example, an input RGB color space image can be transformed to an YCbCr color space image. In step 502, each color-space component of the image is transformed independently with a discrete wavelet transform. The wavelet transform coefficients are quantized, in step 503, to integer values and are tiled into code-blocks. Then, in step 504, each code-block is entropy encoded in bit-planes, or fractions thereof, down to some minimum fractional bit-plane with an arithmetic encoder. After completing this encoding a post coding rate-distortion optimization algorithm (PCRD-opt) recommended by the JPEG2000 standard is used for rate control (step 505). In step 506 the encoded code-blocks are grouped along with header information to provide a JPEG2000 code-stream 507.

A JPEG2000 image is decoded by performing the inverse of each of these steps in a reverse sequence.

The following sections describe the encoding process of FIG. 5 in more detail.

1.1 The Discrete Wavelet Transform and Multi-resolution Decoding

A single level discrete wavelet transform (DWT) of an image component is illustrated in FIG. 1. The image component 110 is decomposed into 4 subbands, LL1 130, HL1 140, LH1 150 and HH1 160, which together form a single level DWT image 120. The DWT gives a multi-resolution description of an image. The LL1 subband 130 represents the image component at a reduced resolution. In particular the reduced-resolution image is represented at a size with nominally half as many pixels per row, and nominally half as many pixels per column, as the original image.

A single level inverse DWT can be performed on the DWT image 120 (the LL1, HL1, LH1 and HH1 subbands) to give the original image 110. Thus the DWT image 120 implicitly represents the image at two resolutions: namely the original image, referred to as resolution 1, and the LL1 subband, referred to as resolution 0.

Another single-level DWT can be performed on the LL1 subband 130. Analysing the LL1 subband into four subbands, LL2 170, HL2 172, LH2 174 and HH2 176, results in a two-level DWT image 180 comprising the subbands LL2, HL2, LH2, HH2, HL1, LH1 and HH1. The LL2 subband represents the original image at a further lower resolution (and also represents the LL1 subband at a lower resolution). In particular the image is represented at a size with nominally a quarter as many pixels per row, and nominally a quarter as many pixels per column, as the original image. The subbands HL1, LH1 and HH1 are referred to as level 1 subbands. The subbands LL2, HL2, LH2 and HH2 are referred to as level 2 subbands. For convenience the original image is referred to as the LL0 subband.

Higher level DWT images, and further reduced resolution representations of the image component, are obtained by further applications of the single level DWT on ensuing LL subbands. An S-level DWT comprises a LLS subband and subbands HLS, LHS, HHS, HL(S−1), LH(S−1), HH(S−1), ..., HL1, LH1, and HH1. The number after the two-letter subband denomination refers to the DWT level. Thus HL(S−1) refers to the HL subband at level S−1. An S level DWT image implicitly represents the image at (S+1) resolutions. These resolutions are referred to as resolution 0, resolution 1, ..., resolution S. Resolution 0 refers to the LLS subband, resolution 1 to the LL(S−1) subband, and so on. Thus resolution S refers to the original image.

JPEG2000 uses a DWT on each image component. Each subband is coded independently. Each subband can be decoded from the compressed image code-stream independently. For example, for a single level DWT image the LL1 subband (or resolution 0 of the image) can be decoded and displayed without decoding the other level 1 subbands, HL1, LH1 and HH1. For higher-level DWT images other resolution versions of the image can also be decoded and displayed by reconstructing the various LL subbands at each stage of the DWT analysis. For example, for a 3-level DWT image, the image can be displayed at resolution 1 by reconstructing the LL2 subband from the LL3, HL3, LH3 and HH3 subbands.

1.2 Code-blocks, Coding-passes and Layers

Figure 2:
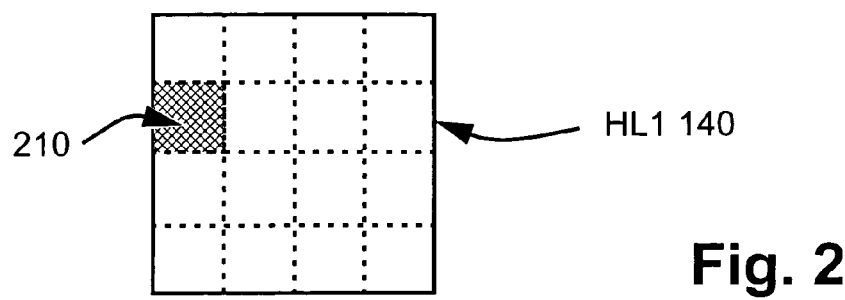
FIG. 2 illustrates the tiling of a subband into code-blocks according to the prior art JPEG2000 standard.

Each subband of a transformed image in JPEG2000 is tiled into blocks, referred to as code-blocks. FIG. 2 illustrates a tiling of the HL1 subband 140 into 16 blocks, with one block 210 indicated by shading. Each code-block is quantised to give an integer representation of the code-block coefficients and is then (entropy) coded substantially independently. Each code-block is coded in order from the most significant bit-plane to the least significant bit-plane. There are normally three coding passes per bit-plane.

Figure 3:
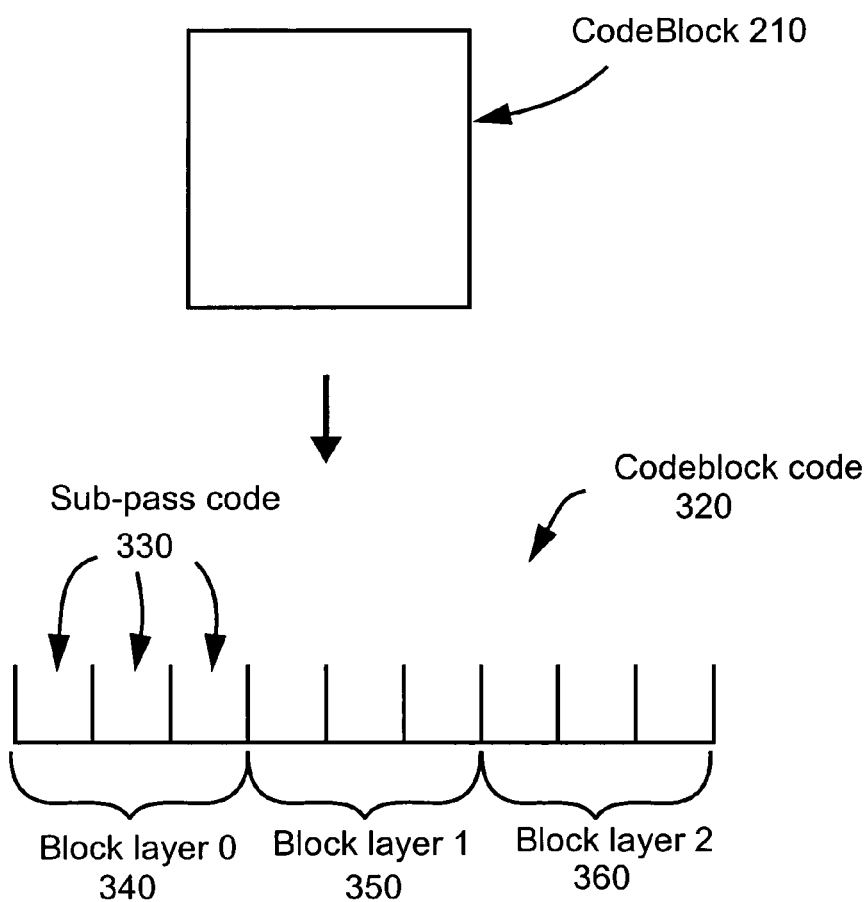
FIG. 3 illustrates the coding of a code-block into block layers according to the prior art JPEG2000 standard.

FIG. 3 illustrates the coding of such a code-block. A code-block 210 is coded into a compressed code-block which is sometimes simply referred to as a code-block 320. The code-block 320 comprises a sequence of coding-pass code segments 330. The code-block is thus an ordered sequence of coding-pass code segments (or simply coding-passes).

A code-block can be partitioned into block layers. For ease of explanation the term block layer is used herein to refer to those coding-passes of a code-block which contribute to a corresponding quality layer. Each quality layer successively improves the image quality, so that a decoder shall be able to decode the code-block contributions contained in each layer in sequence. Thus a quality layer can be said to be a collection of corresponding block layers at all resolutions. FIG. 3 shows an example of a code-block partitioned into three layers: namely block layer 0, 340, block layer 1, 350, and block layer 2, 360. Each block layer contains a non-negative number of coding-passes. The first layer comprises the first number of coding-passes, the second layer, a next number of coding-passes and so on. It is important to note that a block layer of a code-block can be empty. The example of FIG. 3 shows three coding passes per block layer.

A decoder reconstructs the code-block from the block code by undoing the entropy encoding. A lower quality representation of the code-block is obtained by decoding only a first number of coding-passes. For example, in FIG. 3 the code-block could be reconstructed from layer 0 only, or layers 0 and 1. Thus truncating a block code at some coding-pass boundary results in a lower-quality representation of the code-block. Truncating a block in this way is a form of quantisation. By coding bit-planes an embedded form of quantisation of the code-block is effected. For each extra bit-plane included in the block code, the effective quantisation step size decreases by a factor of two.

A layer of the image is constructed from a collection of corresponding block layers. That is, layer 0 comprises block layer 0 for each code-block in the DWT image, layer 1 comprises block layer 1 for each code-block and so on. A block layer can be empty, in that no coding-passes are contained within the block layer. An image can be decoded by decoding layer 0 only (and performing the appropriate inverse DWT, component transform etc). Decoding layer 0 means decoding block layer 0 for each code-block. In this case each code-block, and hence the image, is decoded at a lower quality than is represented in the compressed image code-stream.

1.3 Rate-distortion Optimisation

As described above, each code-block is coded in several coding-passes. Of course, encoding each coding pass can consume bits from the given overall byte budget. The rate of a given coding pass is the number of bytes consumed by the coding pass and all previous coding passes.

'Distortion' is the quality degradation associated with the compressed image (or block) as compared to the original image (or block). The distortion of a code-block reflects how much video degradation is introduced if the current coding pass is the last coding pass. In general the distortion decreases (or, equivalently, the quality increases) for each further coding-pass. As more information is encoded the precision of the code-block is increased from the perspective of a decoder.

So, each coding-pass has an associated rate measure and a distortion measure, which together define a rate-distortion point. Each code-block has a set of rate-distortion points that comprise the pair (rate, distortion) for each coding-pass. The set of rate-distortion points characterises the efficiency of the compression algorithm.

If the code-block n is terminated at the i-th coding pass, let us denote by $r^0, r^1, r^2, \ldots, r^i$ the rates, and by $d^0, d^1, d^2, \ldots, d^i$ the distortions associated with each coding pass. The total rate is then given by:

$$R_{total} = \sum_{j=0}^{i} r^j, \quad (1)$$

and a measure of total distortion is:

$$D_{total} = \sum_{j=0}^{i} d^j. \quad (2)$$

Note that the rate-distortion point $(r^0, d^0)$ refers to the point where no coding-pass at all is included into the code stream. A "truncation point" is the last coding pass included into the final code stream. The truncation point is discussed further with reference to FIG. 8.

As mentioned above, one goal is to minimize the distortion for a given rate. That is to find $$\min_{i_n} D_{total} \text{ such that } R_{total} \leq R_{desired}, \quad (3)$$

where $R_{total}$ is the actual total achieved rate and the minimum is taken over the different truncation points of the code-blocks. This optimization problem can be solved using the method of Lagrange multipliers. That is, find $\lambda \geq 0$ (if possible) and a set $i_n$ of code-block truncation points such that $$\{D^{i_n} + \lambda i^n\} \quad (4)$$

is minimal under the constraint $R_{total} \leq R_{desired}$. This set of code-block truncation points $i_n$ also solves the constrained problem of (3). In practice $R_{total} \approx R_{desired}$ may be used (where typically $R_{total} < R_{desired}$), as the exact constraint may not be met by any $\lambda$.

Figure 6:
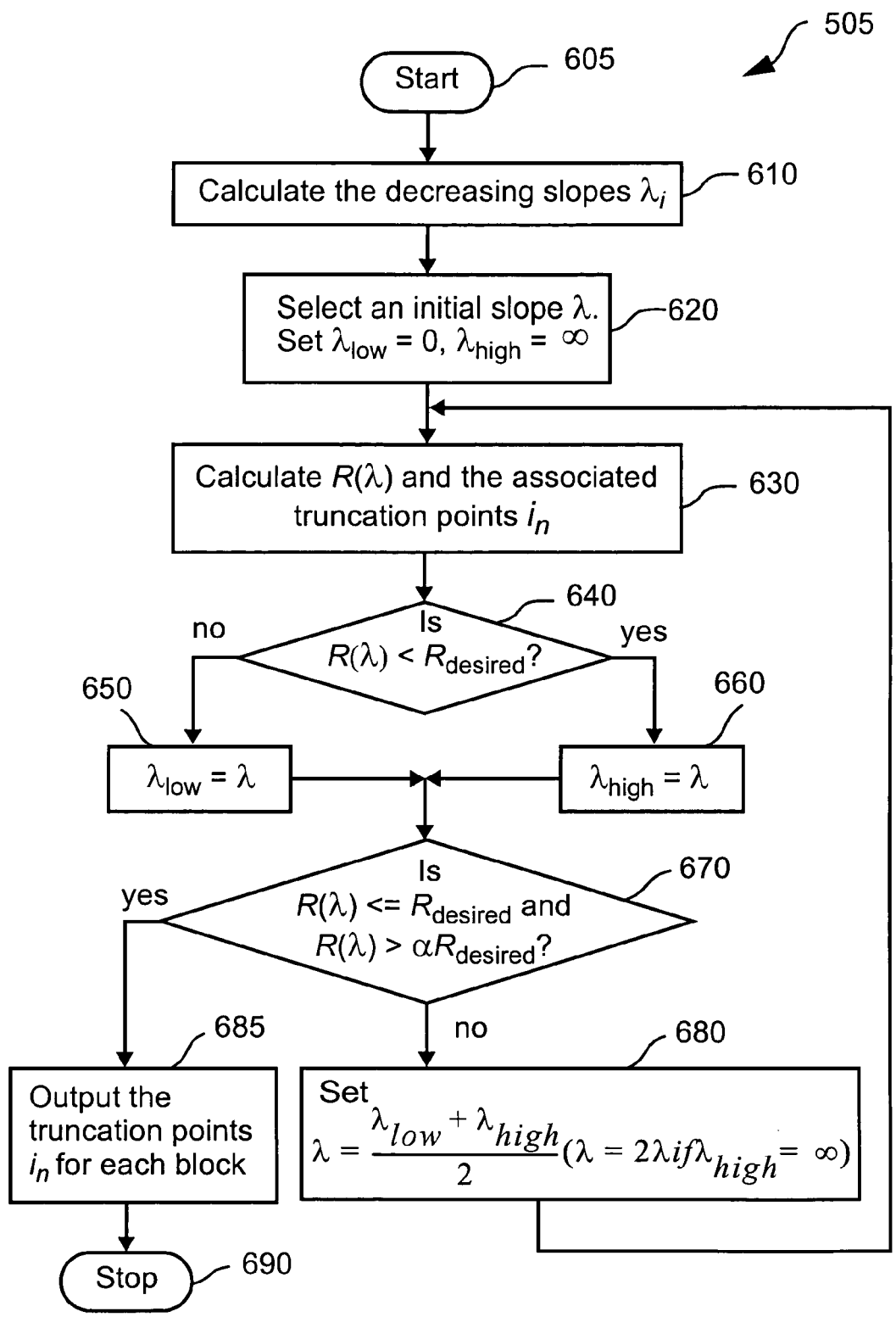
FIG. 6 shows a flow chart of the PCRD-opt algorithm for use in the method of FIG. 5.

A procedure for solving problem (3) with the term (4) is described with reference to FIG. 6 as follows. The procedure corresponds to step 505 of FIG. 5. The procedure commences in step 605 and proceeds to step 610, which calculates the slope corresponding to each rate-distortion point for each block. For block n with $i_n$ coding passes, the set of rate-distortion slopes, $\lambda^0, \lambda^1, \lambda^2, \ldots, \lambda^{i_n}$, is given by $$\lambda^j = \begin{cases} \infty & j = 0 \\ \dfrac{d^{j-1} - d^j}{r^j - r^{j-1}} & j = 1, \ldots, i_n \\ 0 & j = i_n + 1 \end{cases} \quad (5)$$

These slopes are assumed to be decreasing: that is $\lambda^0 \geq \lambda^1 \geq \lambda^2 \geq \ldots \geq \lambda^{i_n}$ for each code-block n. If $\lambda^j < \lambda^{j+1}$ then the rate-distortion point $(r^j, d^j)$ is removed from the set of possible rate-distortion points for code-block n. The remaining rate-distortion points are then relabelled and the slopes recalculated. This process continues until the slopes are all decreasing. Assuming that at the end of this process there are k rate-distortion points, where $k \leq i_n$, then $\lambda^0 \geq \lambda^1 \geq \lambda^2 \geq \ldots \geq \lambda^k$. This set of slopes is called the set of rate-distortion slopes for block n. Alternatively this set of slopes is said to lie on a convex hull for block n.

In the next step 620 an initial slope $\lambda$ is selected, and $\lambda_{low}$ and $\lambda_{high}$ are set to 0 and $\infty$ respectively. Preferably a slope of $\lambda=10$ is selected as an initial slope. In step 630 the optimum termination point $i_n$ for each block n is determined and the optimum associated total rate $R(\lambda)$ is calculated. These termination points are the solution to the Lagrangian minimization problem in (4). Step 630 is described below in more detail.

After completion of step 630, a check is made at decision block 640 to determine if $R(\lambda) < R_{desired}$. If decision block 640 returns a "no", processing continues at step 650, in which $\lambda_{low}$ is set to $\lambda$. Processing then resumes at step 670. If decision block 640 returns "yes", then processing continues at step 660, in which $\lambda_{high}$ is set to $\lambda$. Processing then resumes at step 670.

At decision block 670 a check is made to determine if $R(\lambda) \leq R_{desired}$ and $R(\lambda) > \alpha\, R_{desired}$, where $\alpha$ is some rate tolerance less than 1. Preferably $\alpha=0.99$ is used. Although it is not shown in FIG. 6 an iteration count is to be kept, and if this count is exceeded then decision block 670 returns a "yes". The purpose of this iteration is to stop the procedure entering an infinite loop. If decision block 670 returns a "yes" then processing continues at step 685. At step 685, the optimum truncation points for each block (the $i_n$) are output. Processing then terminates in step 690. If decision block 670 returns a "no", then processing continues at step 680. At step 680 the current slope $\lambda$ is updated and processing resumes at step 630.

The optimum total rate and associated truncation points are calculated in step 630 as follows. For block n the optimum truncation point for an operating slope of $\lambda$ is $i_n$, where $$\lambda^{i_n+1} \leq \lambda \leq \lambda^{i_n}. \quad (6)$$

Note that the optimum $i_n$ is a function of $\lambda$. Hence the rate $r^{i_n}$ associated with the optimum truncation point is a function of $\lambda$ and the total optimum rate is given by $$R(\lambda) = \sum_n r^{i_n}(\lambda). \quad (7)$$

In the case where there is more than one $i_n$ that satisfies (6) a record is kept of each possible $i_n$. Correspondingly, there is then a set of different possible total optimum rates $\{R(\lambda)\}$ and within this finite set there is a minimum $R_{min}(\lambda)$ and a maximum $R_{max}(\lambda)$. If at decision block 670 $R_{min}(\lambda) < R_{desired}$ and $R_{max}(\lambda) > R_{desired}$, then decision block 670 returns a "yes", and the set of truncation points $i_n$ corresponding to the largest $R(\lambda)$ that is less than or equal to $R_{desired}$ is output at step 685. Many variations of this procedure exist for solving equation (3) via equation (4), and can alternatively be used.

Associated with a truncation point $i_n$ is a rate-distortion slope $\lambda^{i_n}$ (or $\lambda^{i_n+1}$), and the rate-distortion slope for code-block n at truncation point $i_n$ is the slope $\lambda^{i_n}$.

This optimisation can be used to determine the number of coding-passes to keep for each code-block, in order to "optimally" encode an image for a given rate. These coding-passes can be encoded for each code-block to form a single layer to encode the image. The optimisation technique can also be used to construct several layers for encoding an image. For example two sets of truncation points can be determined where one is the set of coding-pass truncation points optimum for an overall rate of 1 bit per pixel and the other is the set of coding-pass truncation points optimum for an overall rate of 2 bits per pixel. For a given code-block the coding-pass corresponding to the second set is the same or a later coding-pass than that corresponding to the first set. The first layer is then constructed by including all determined coding-passes according to the first set. A second layer is then formed by including all coding-passes according to the second set that were not included in the first layer.

In general, this optimisation technique is referred to herein as the PCRD-opt routine. PCRD-opt is a form of post-compression rate-distortion optimisation. The technique generally involves determining the optimal set of truncation points after the data has been coded. The disadvantage of using this technique lies in the overcoding of code-blocks. For example some bit-planes will be coded to determine their rate-distortion slopes, only to be discarded after PCRD-opt is applied.

It should be noted that code-block truncation at coding-pass termination points after applying the PCRD-opt routine is a form of quantisation. The bit-planes of the block that are coded after the termination points are not included in the final bit-stream. The PCRD-opt quantisation is generally more significant than any quantisation that occurs in representing the DWT coefficients in a fixed precision binary format, and is usually more significant than the explicit quantisation used in JPEG2000 (unless no bit-planes are discarded in the truncation process).

An important aspect of the practical effectiveness of the rate-distortion optimisation is the selection of a good distortion function. Human visual weights can be used to weight the mean-square error distortion for each code-block, according to the subband to which each code-block belongs. In this way code-blocks from sub-bands that have larger weights are generally coded to a higher quality (that is, with more fractional bit-planes) than those from subbands with smaller weights.

1.4 Coding Passes

Figure 4:
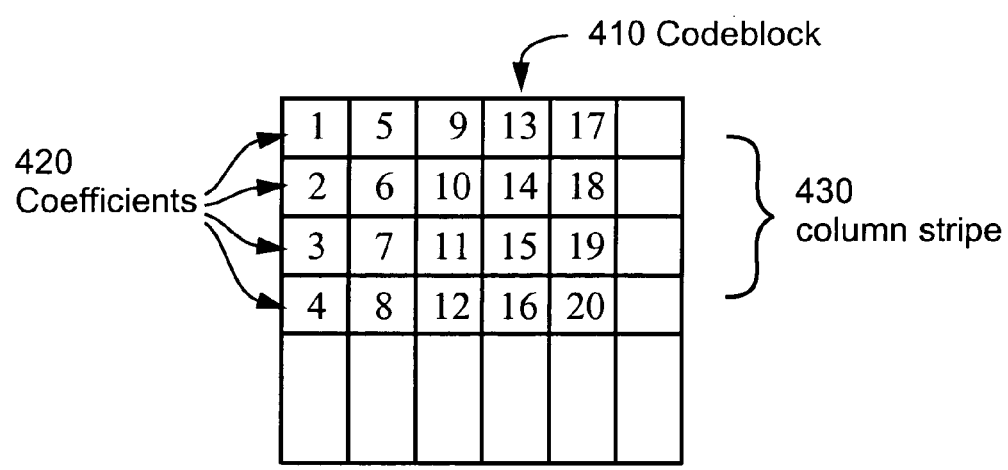
FIG. 4 illustrates the stripe oriented scan of the coding pass in a code-block according to the prior art JPEG2000 standard.

Within each bit-plane the coding is along a stripe oriented scan as illustrated by FIG. 4. Each stripe 430 contains four rows of bit symbols and within each stripe the bit symbols are scanned column by column from left to right following path 420.

Bit-plane coding starts in the most significant bit-plane that (generally) contains a non-zero element and proceeds down to the least significant bit-plane. Each bit-plane is normally coded in 3 coding-passes:

1 Significance propagation pass—codes those coefficients whose significance state is still set to insignificant but which have at least one of the 8 nearest neighbors with a significant state. This means that the significance propagation pass includes those coefficients which are likely to become significant.
2 Magnitude refinement pass—codes coefficients that became significant in a previous bit-plane. Through this the magnitude of the wavelet coefficient is further refined.
3 Cleanup pass—is the last pass in a given bit plane and includes those coefficients that were not coded in the previous coding passes. If a number of coefficients are not significant and have no significant neighbors they are run-length encoded, otherwise they are coded as in the previous coding passes.

Bit-planes are normally encoded in the above order of coding-passes.

1.5 Code-stream Construction

A number of code-blocks in each resolution level is collected within a precinct and the set of block layers within a precinct is arranged into a packet. 'Precinct' is a term used to describe corresponding regions in each subband of a particular DWT level. In a simple case a precinct is an entire resolution level subband (for example the HL1, LH 1 and HH1 subbands). A packet can be thought of as the basic building block for the JPEG2000 compressed code-stream, where a packet contains all the compressed image data from a particular precinct, block layer, and a resolution level.

The JPEG2000 bit-stream comprises a sequence of packets. Each packet contains encoded image information for a single resolution, (quality) layer, component and spatial region of the image tile. A JPEG2000 code-stream is constructed by a sequence of packets and header information blocks (for more information refer to the J2K standard).

2.0 Motion JPEG2000

Motion JPEG2000 is a video compression system that involves JPEG2000 compression of each individual video frame independent from the other video frames. As a wavelet-based encoder, non-lossless JPEG2000 compression of a video frame introduces wavelet artefacts into the decompressed output. For a given video frame there is a level of non-lossless compression that is considered visually lossless. At such a visually lossless compression rate the wavelet artefacts introduced by the coding process are of small magnitude and will not be noticed by the viewer looking at a single image.

However, in a video stream where each frame has been independently coded using the JPEG2000 encoder, even small changes between frames can lead to quite different sets of wavelet artifacts in consecutive decoded frames due to the non-linear nature of the encoder. Within a decoded video stream, these wavelet artifacts change rapidly in a manner that is not simply related to the changes in the underlying video content. These changes are often visible and are sometimes visually unacceptable even when the individual frames of the video could be considered visually acceptable. The problem of these rapidly changing artifacts, or flicker artifacts, becomes much greater at higher levels of compression, as the artifacts become larger and more obvious at lower bit rates.

For several applications it is desirable to encode a video at a fixed bit-rate, for example 24 Mbits per second. An obvious approach to achieve a fixed rate in a video is to compress each frame by the same amount. For instance, at 30 frames per second, each frame must be compressed to a target bit rate of around 820 Kbits to satisfy the constraint of 24 Mbits per second. The rate control algorithm recommended by the JPEG2000 standard is PCRD-opt, which is applied after compression to ensure the compressed data of each video frame meets the desired target rate. The advantage of using this method is that at any given rate, the optimum video quality can be achieved for that rate since the algorithm uses the actual rate and distortion values of each code-block in each frame to arrive to the desired rate. However, the disadvantage of using PCRD-opt is that each code-block is substantially over-coded. Since arithmetic coding is one of the slower operations in JPEG2000 , too much over-coding is undesirable, especially in video applications where video frames need to be compressed in real time.

2.1 Flicker Artefacts 2.1.1 Code-block Truncation Point Flicker

Flicker artifacts in decoded MJ2K videos limit the minimum bit rate at which a MJ2K encoded video can be encoded in a visually lossless way, and decrease the quality of encoded video at any lower bit rate. In MJ2K the rate-distortion optimization algorithm is normally applied to each frame independently. This may cause flicker because the number of coding passes included in the compressed bit-stream for each code-block may change between frames in a way which is not related to gross changes in the underlying video footage. That is, the truncation point for a given code-block may frequently change between different bit-planes causing some wavelet artifacts to appear and disappear between subsequent frames. For example, some experiments suggest that the truncation point of 25% of the code-blocks changes every frame, even when there is not a lot of motion in the video.

The usual method of applying rate-distortion optimisation to each frame independently suffers in that the resulting decoded video stream contains wavelet artefacts that appear and disappear in consecutive frames due to changes in the bit depth to which the code-blocks are coded. Tables 1 to 4 illustrate this point.

TABLE 1

DWT coefficients for a portion of a block in frame 1

| | | |
|---|---|---|
| −2.426220 | −11.162438 | −0.539887 |
| 3.697484 | 16.796406 | 5.798251 |
| −3.639841 | −15.364249 | −7.301143 |

TABLE 2

Quantized DWT coefficients for the coefficients of Table 1 with a quantization step size of 16

| | | |
|---|---|---|
| 0 | 0 | 0 |
| 0 | 1 | 0 |
| 0 | 0 | 0 |

TABLE 3

DWT coefficients for a portion of a block in frame 2

| | | |
|---|---|---|
| −2.184122 | −11.267410 | 0.155337 |
| 3.005134 | 16.275234 | 4.651533 |
| −2.982268 | −5.198070 | −7.582343 |

TABLE 4

Quantized DWT coefficients for the coefficients of Table 3 with a quantization step size of 8

| | | |
|---|---|---|
| 0 | −1 | 0 |
| 0 | 2 | 0 |
| 0 | 0 | 0 |

A possible 3×3 subset of DWT coefficients from a first encoded frame of an example video sequence is shown in Table 1. The corresponding quantised values with a quantisation step size of 16 shown in Table 2. In the next frame, the visual content is very similar and the same subset of DWT coefficients is shown in Table 3. These are quantised at a step size of 8 and the results are shown in Table 4. These (effective) quantisation step sizes could be the result of explicit quantisation in JPEG2000 or in the implicit quantisation through bit-plane truncation (of the PCRD-opt process). However, for the purposes of this example, these quantisation step sizes are meant to result from bit-plane truncation. It is not uncommon for the same corresponding code-block in similar frames to have quantisation thresholds that differ by a factor of 2. Thus, as can be seen in the differences between the values in Tables 2 and 4 a typical decoder would dequantize the decoded coefficients for each frame to significantly different values. This can lead to the appearance and disappearance of wavelet artefacts (caused by a transition between a zero and non-zero value) and a change in the apparent size and intensity of the wavelet artefact (caused by a change in the magnitude of the coefficient), even when the difference between the DWT coefficients between code-blocks is quite small.

2.1.2 Wavelet Coefficient Flicker

Wavelet coefficient flicker is caused by non-linear amplification of small changes in the video stream using J2K encoding. It is desirable to remove small changes in the wavelet coefficients due to noise while retaining visually important changes due to motion and scene changes.

2.2 Implementation

The aforementioned methods of encoding a sequence of video frames, and also the first and second arrangements described below, are preferably implemented in dedicated hardware such as one or more integrated circuits performing the functions or sub-functions of methods. Such dedicated hardware may include graphic processors, digital signal processors, or one or more microprocessors and associated memories.

Figure 26:
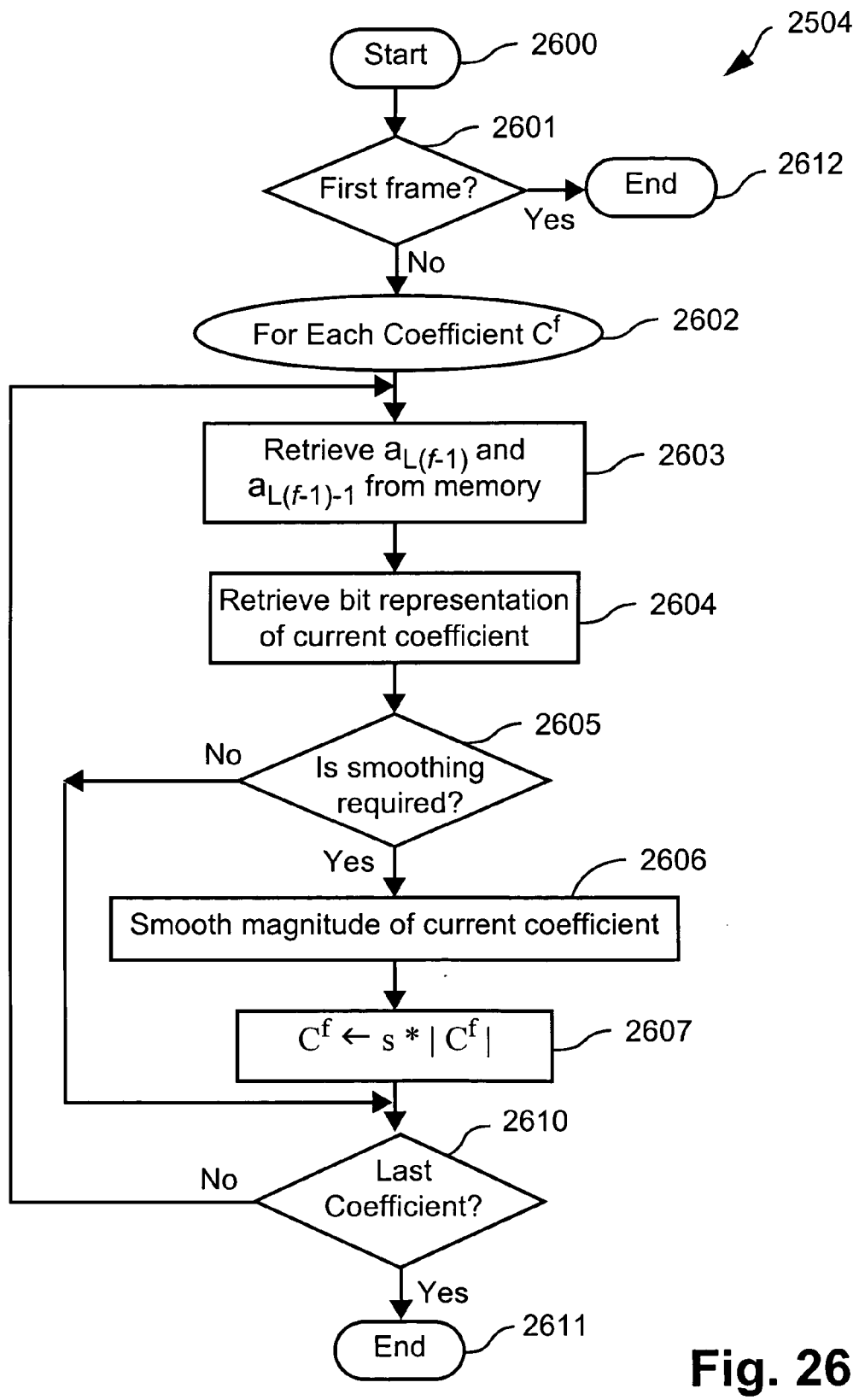
FIG. 26 shows a flow chart of the coefficient smoothing step 2504 for use in the method of FIG. 25.
Figure 27:
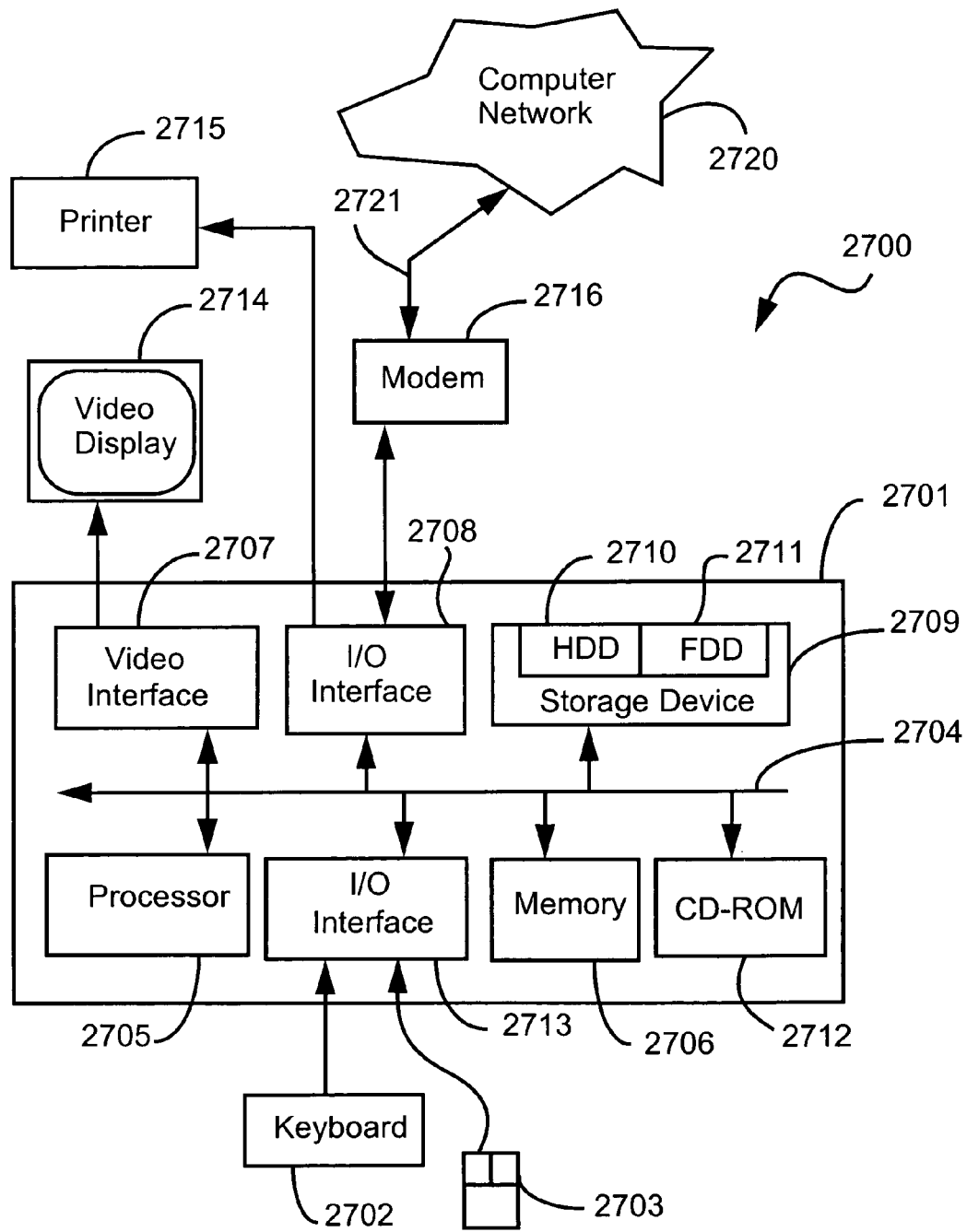
FIG. 27 is a schematic block diagram of a general-purpose computer upon which arrangements described can be practiced.

The methods of encoding a sequence of video frames may also be practiced using a general-purpose computer system 2700, such as that shown in FIG. 27 wherein the processes of FIGS. 5-7, 10-21, 25 and 26 may be implemented as software, such as an application program executing within the computer system 2700. In particular, the steps of the methods of 5-7, 10-21, 25 or 26 are effected by instructions in the software that are carried out by the computer. The instructions may be formed as one or more code modules, each for performing one or more particular tasks. The software may also be divided into two separate parts, in which a first part performs the encoding methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding a sequence of video frames.

The computer system 2700 is formed by a computer module 2701, input devices such as a keyboard 2702 and mouse 2703, output devices including a printer 2715, a display device 2714 and loudspeakers (not shown). A Modulator-Demodulator (Modem) transceiver device 2716 is used by the computer module 2701 for communicating to and from a communications network 2720, for example connectable via a telephone line 2721 or other functional medium. The modem 2716 can be used to obtain access to the Internet, and other network systems, such as a Local Area Network (LAN) or a Wide Area Network (WAN), and may be incorporated into the computer module 2701 in some implementations.

The computer module 2701 typically includes at least one processor unit 2705, and a memory unit 2706, for example formed from semiconductor random access memory (RAM) and read only memory (ROM). The module 2701 also includes an number of input/output (I/O) interfaces including an audio-video interface 2707 that couples to the video display 2714 and loudspeakers, an I/O interface 2713 for the keyboard 2702 and mouse 2703 and optionally a joystick (not illustrated), and an interface 2708 for the modem 2716 and printer 2715. In some implementations, the modem 27116 may be incorporated within the computer module 2701, for example within the interface 2708. A storage device 2709 is provided and typically includes a hard disk drive 2710 and a floppy disk drive 2711. A magnetic tape drive (not illustrated) may also be used. A CD-ROM drive 2712 is typically provided as a non-volatile source of data. The components 2705 to 2713 of the computer module 2701, typically communicate via an interconnected bus 2704 and in a manner, which results in a conventional mode of operation of the computer system 2700 known to those in the relevant art. Examples of computers on which the described arrangements can be practised include IBM™-PCs and compatibles, SUN™ Sparcstations or alike computer systems evolved therefrom.

Typically, the application program is resident on the hard disk drive 2710 and read and controlled in its execution by the processor 2705. Intermediate storage of the program and any data fetched from the network 2720 may be accomplished using the semiconductor memory 2706, possibly in concert with the hard disk drive 2710. In some instances, the application program may be supplied to the user encoded on a CD-ROM or floppy disk and read via the corresponding drive 2712 or 2711, or alternatively may be read by the user from the network 2720 via the modem device 2716. Still further, the software can also be loaded into the computer system 2700 from other computer readable media. The term "computer readable medium" as used herein refers to any storage or transmission medium that participates in providing instructions and/or data to the computer system 2700 for execution and/or processing. Examples of storage media that can participate in providing the instructions or data include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2701. Examples of transmission media include radio or infra-red transmission channels as well as a network connection to another computer or networked device, and the Internet or Intranets including e-mail transmissions and information recorded on Websites and the like.

The compressed video data generated by the software running on system 2701 may be transmitted across the computer network 2720. Alternatively, the compressed data may be stored for future use, for example on the disk drive 2710 or the CD-ROM 2712.

3.0 First Arrangement

Figure 7:
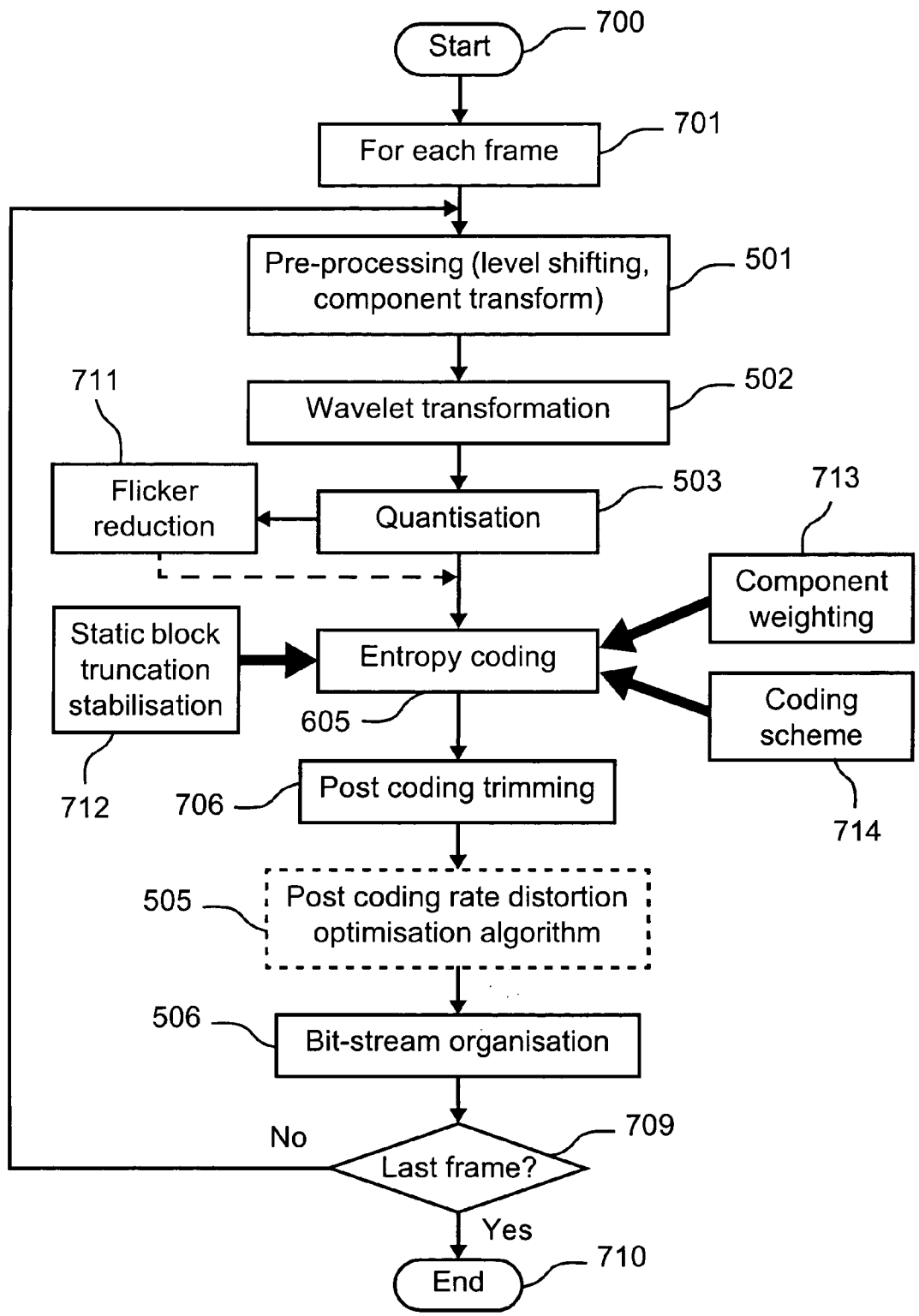
FIG. 7 shows a flow chart of a first arrangement for compressing video images in accordance with the present disclosure.

FIG. 7 shows an overview of a first arrangement for processing a video sequence. Some steps of the method of FIG. 7 are the same as steps used in processing an image using the methods of FIG. 5. However, such steps are now placed within a loop 701, wherein each iteration of the loop 701 encodes a single frame of the video sequence.

The method commences in step 700 and enters a loop 701 to process each frame of the video sequence in turn. Once all the frames of the video sequence are processed, loop 701 exits at step 709 and the method terminates in step 710.

Within loop 701, in step 501 the program running on processor 2705 applies any necessary pre-processing to the current input frame. As described above with reference to encoding of a single image, such pre-processing may include level shifting or a component transform. After the pre-processing is complete, processor 2705 applies a wavelet transformation to the current image in step 502. Then, in step 503 the processor 2705 quantises the wavelet-transform coefficients to integer values. Preferably, a flicker reduction step 711 is applied to the quantised wavelet coefficient. However, if the flicker reduction 711 is not used, process flow continues directly to entropy coding step 705. The flicker reduction method 711 is described below in Section 5.0 with reference to FIGS. 24-26.

In the entropy coding step 705 the program running on the processor 2705 arranges the process wavelet coefficients into code-blocks and each code-block is encoded in bit-planes with an arithmetic encoder. The coding of each code-block is governed by a coding scheme 714 to reduce the amount of overcoding. The coding scheme 714 is described in more detail in Section 3.6 with reference to FIGS. 15 and 16.

The coding performed in step 705 is also affected by a component weighting scheme 713 which takes into account the component a code-block belongs to. In one implementation the component is one of the $YC_bC_r$ color-space components. The Y component is a luminance component and the $C_b$ and $C_r$ components are chrominance components. The component weighting scheme 713 is described in more detail in Section 3.5 with reference to FIGS. 13 and 14.

In addition, the decision to terminate coding a code-block in step 705 is affected by a static block truncation stabilization scheme 712. Such truncation of static blocks is described in more detail in section 3.4 with reference to FIGS. 10-12.

Once the entropy coding 705 is completed for the code-blocks in the current video frame, the processor 2705 trims the compressed data to the target bit number in step 706. The trimming step 706 discards those coding passes of a code-block that have a rate-distortion slope that falls below a cut-off threshold. The method of selecting the cut-off threshold is described below in Section 3.3.

As an alternative to the post-coding trimming step 706, the PCRD-opt routine recommended by the JPEG 2000 standard may be applied to the entropy coded data. The PCRD-opt algorithm is shown as step 505 in FIG. 7 and is shown in broken outline to indicate that it is an alternative step.

Next, in step 506 the processor 2705 organizes the coded data into a bit-stream to output the compressed frame. The bit-stream may be transmitted across the network 2720, or it may be stored for future use, for example on CD-ROM 2712.

Then, in step 709 the method checks whether the current frame is the last frame of the video sequence. If there are still frames in the sequence (the No option of step 709), then process flow returns to step 501 to process the next frame in the sequence. If a current frame is the last frame (the Yes option of 709) then loop 701 ends and processing terminates in step 710. The compressed video sequence may then be transmitted across the computer network 2720, or it may be stored for future use. The compressed video may be decoded using systems like system 2700 and displayed, for example, on video display 2714.

As described above, the first arrangement uses the coding method 714, the component weighting method 713 and the static block truncation stabilization method 712. However, in alternative arrangements for video compression, different combinations of the three methods can be used. For example, each of the three methods can be used for video compression without use of the other two.

3.1 Nomenclature

For a video sequence, assume the video consists of frames $1, \ldots, F$. The achieved bit-rate of frame $f \in \{1, \ldots, F\}$ is $R_{achieved}$ and the target bit-rate is $R_{target}$. Let the rate-distortion-slope threshold of frame f be $\lambda_f$. If the rate-distortion slope is less than threshold $\lambda_f$ then the bit-plane encoding of a code-block is terminated. For a single video frame there are N code-blocks and for a code-block $n \in \{1, \ldots, N\}$ the coding pass is $i_n$. Then for a code-block n, let the rate-distortion slope of the coding pass $i_n$ be $\lambda^{i_n}$.

The following notation is introduced to describe the quantization of wavelet coefficients. The wavelet coefficients are normalized to lie within (−1,1) and each coefficient is described using a fixed-point binary representation with P digits of precision. That is, a coefficient C is given by:

$$C = s \sum_{p=1}^{P} a_p 2^{-p}, \qquad (8)$$

where $s = \pm 1$ is the sign of the coefficient, $a_p \in \{0,1\}$ denotes the p th binary digit of the fractional part of C. Note that this representation implies an explicit quantization of the real-valued wavelet coefficients to a binary fraction with finite precision. Henceforth, when quantization thresholds are discussed, such is not a reference to this explicit quantization, but rather to the implicit quantization caused by the truncation of each code-block at a certain bit-plane after the rate-distortion optimization routine.

The operation of quantizing the coefficient C by bit-plane truncation at bit-plane L may be described as an operator Q[C, L] given by:

$$Q[C, L] = s \sum_{p=1}^{L} a_p 2^{-p}. \qquad (9)$$

That is, Q[C,L] is the quantized value of C where only the first L binary digits of C have been kept. |C| denotes the magnitude of the wavelet coefficient, which is equivalent to Q[C,L] if s is set to 1. The truncation bit plane L and the truncation point T of a code-block are related by $$L = 2 + \text{floor}[(T+2)/3], \qquad (10)$$

where floor is an operator such that any real number is approximated by its lower nearest integer. In the following description f refers to the current frame and (f−1) refers to the previous frame.

Figure 8:
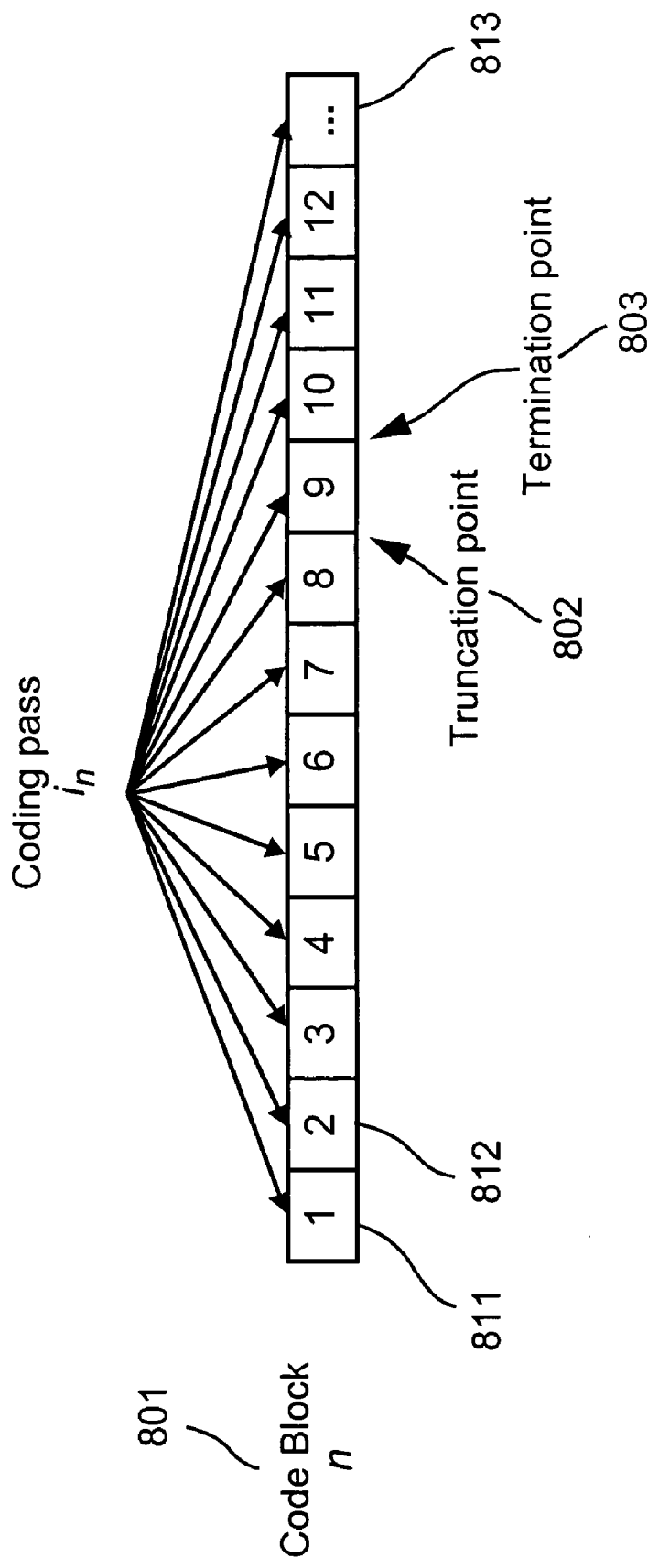
FIG. 8 is a schematic diagram illustrating the difference between a truncation point and a termination point.

There is a distinction between a "truncation point" and a "termination point", as illustrated with reference to FIG. 8, which shows the bit-plane encoding of a code-block n 801 consisting of coding passes $i_n$. Note each bit-plane of code-block n is encoded in one of the three nominal coding passes (significance pass, magnitude refinement pass and clean-up pass).

The encoding of code-block n begins at coding pass $i_n=1$ 811 and proceeds to coding pass $i_n=2$ 812 and so on until the last coding pass 813, which codes the least significant bit-plane. At the end of each coding pass a decision is made to determine whether the encoding process should be terminated. This decision is influenced by several factors discussed below in greater detail. In the example of FIG. 8, encoding of code-block n terminates at the end of coding pass $i_n=9$. This is referred to as the termination point 803 of code-block n. The final compressed codestream includes compressed data generated up to the truncation point 802 of code-block n. In the coding scheme 714 of the first arrangement, the truncation point of code-block n is usually one coding pass less than the termination point of code-block n. The goal is to minimize the amount of over-coding. The decision to terminate the encoding process is substantially based on the truncation point of the corresponding code-block in the previous frame (i.e. the same location in the wavelet domain).

3.2 Storing Information Between Frames

Figure 9:
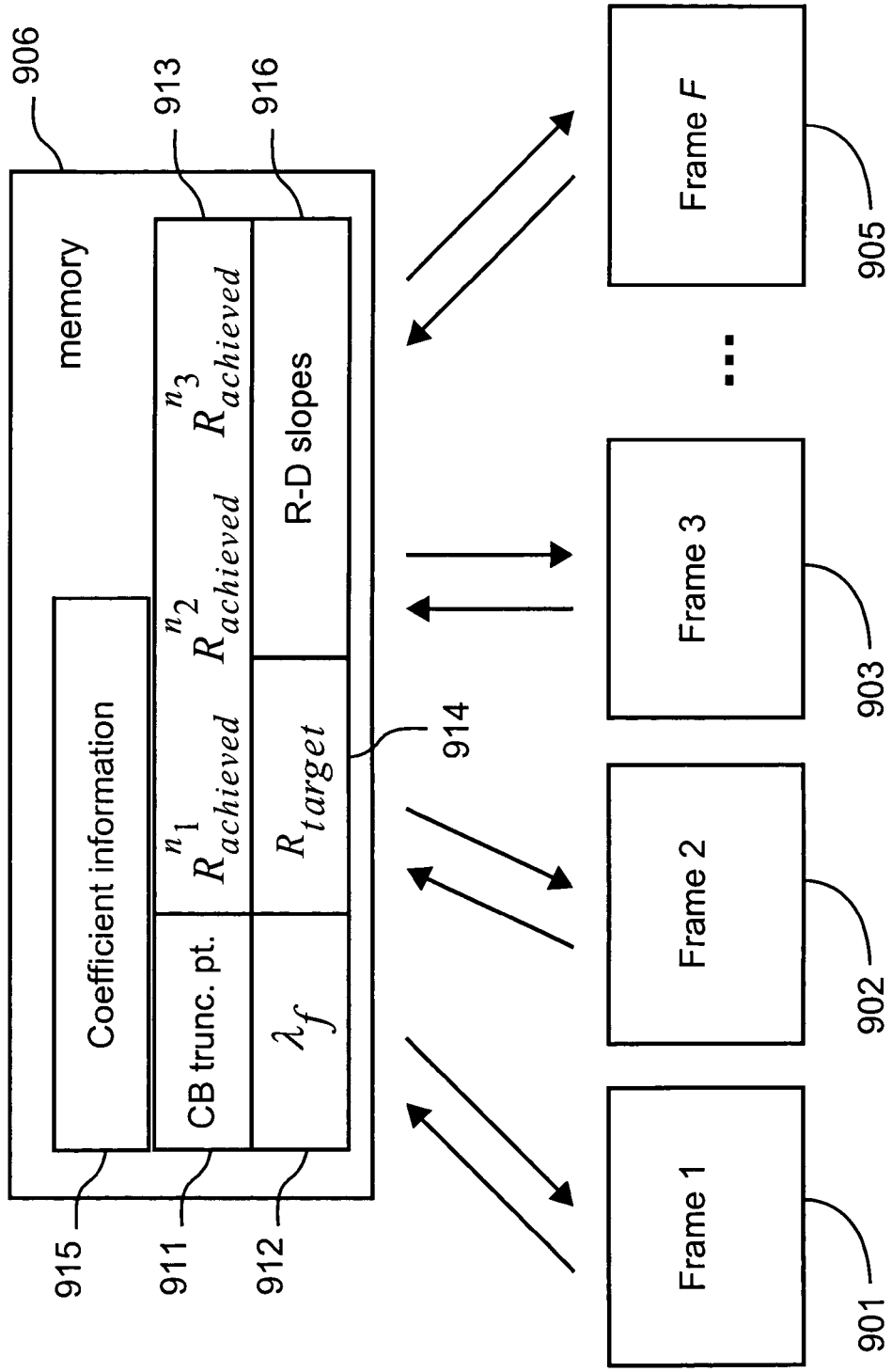
FIG. 9 shows a schematic block diagram of a memory arrangement for use in storing inter-frame information when applying the methods of FIG. 7.

Except when processing the first frame, the method of FIG. 7 makes use of information from the previous frame when coding a current frame. A suitable memory configuration for storing information between frames is illustrated in FIG. 9. A video sequence is made up of frame 1 901, frame 2 902, frame 3 903 up to frame F 905.

Once the encoding of frame 1 901 is complete, relevant information is stored in memory 906, which is preferably a region of memory 2706 seen in FIG. 27. The stored information is used by the processor 2705 in encoding frame 2 902. Relevant information of frame 2 then replaces the stored information in memory 906 to be used when processing frame 3. This sequential updating of memory 906 continues until the final frame 905 is processed.

After processing a video frame f, the wavelet coefficient values of the frame are stored in memory location 915 for use in processing the next frame of the sequence. In one implementation, the full wavelet coefficient values are stored. Preferably, however, only a subset of the wavelet coefficient values of the video frame is stored. For example, the flicker-reduction scheme 711 requires only two bits and thus only the two least-significant bits of the truncated coefficients need be stored, as described further in Section 5.0.

After processing a video frame f, the truncation point of each code-block of frame f is stored in location 911 of memory 906. The truncation point information is used in processing the next frame in sequence when considering whether or not to terminate coding. In one implementation, memory location 911 stores the truncation bit planes $L_n$ of each code-block. This implementation may be used, for example, when the PCRD-opt routine is used during coding of a video frame.

An alternative approach to storing the truncation bit-plane $L_n$ of each code-block n to memory location 911 is to store the number of coding passes included in the final bit-stream for each code-block. The coding passes are employed to code only non-zero bit-planes. One or more zero bit-planes may be encountered before a non-zero bit-plane is reached that requires a coding pass. Let the number of zero bit-planes for a code-block n be $A_n$.

In the first arrangement, the value stored to memory location 911 is given by:

$$\text{value stored} = \left\lceil \frac{I_n}{3} \right\rceil + A_n, \qquad (11)$$

where $I_n$ is the number of coding passes included in the bit-stream for code-block n. Note that there are normally three coding passes associated with each bit-plane. Compensating for the zero bit-planes in each code-block allows one to deduce exactly the equivalent location of the truncation point in the next frame, since the number of zero bit-planes of code-blocks may vary from frame to frame.

The absolute truncation bit-plane for each code-block in a video frame is stored after the truncation points have been determined. The storage of truncation points into memory location 911 preferably occurs during step 506 of FIG. 7.

Memory location 913 stores the achieved rate for each component of a frame. FIG. 9 shows three components which, in one implementation, are the Y, $C_b$ and $C_r$ components of the image. Note that the overall achieved rate for a video frame is the sum of the achieved rates for each component:

$$R^f_{achieved} = \sum_{m=1}^{M} R^{fm}_{achieved} \qquad (12)$$

where M is the number of components.

The cutoff threshold $\lambda_f$ for frame f is stored in memory location 912. The target rate $R_{target}$ is stored in memory location 914.

Memory location 916 is used to store the rate-distortion slopes for each code-block n.

3.3 Estimating the Cut-off Threshold

For good rate control when encoding an image, it is important to choose a good cutoff slope threshold. Estimating $\lambda_f$ for a current image in a video sequence involves using the cutoff rate-distortion slope threshold of the previous video frame $\lambda_{f-1}$ and the achieved rate of the previous frame $R^{f-1}_{achieved}$. In other words $\lambda_f$ for frame f is a function of $\lambda_{f-1}$, $R^{f-1}_{achieved}$ and the target bit-rate $R_{target}$.

In the first arrangement, $\lambda_1$, ie the slope threshold of the first frame in the video sequence, is preferably selected by the PCRD-opt algorithm, although other selection methods may be used.

For subsequent frames, $\lambda_f$ for f≠1 is estimated as follows:

$$\text{error} = \frac{R^{f-1}_{achieved} - R_{target}}{R_{target}} \times 100 \quad (13)$$

and $$\lambda_f \lambda_{f-1} + 10 \times \text{error}. \quad (14)$$

Thus, for a current frame, the processor 2705 calculates the slope cutoff threshold using values from the previous frame that have been stored in memory 906.

In the first arrangement, $\lambda_f$ is computed for a current frame prior to any coding steps.

3.4 Static Code-block Truncation Stabilization

Figure 10:
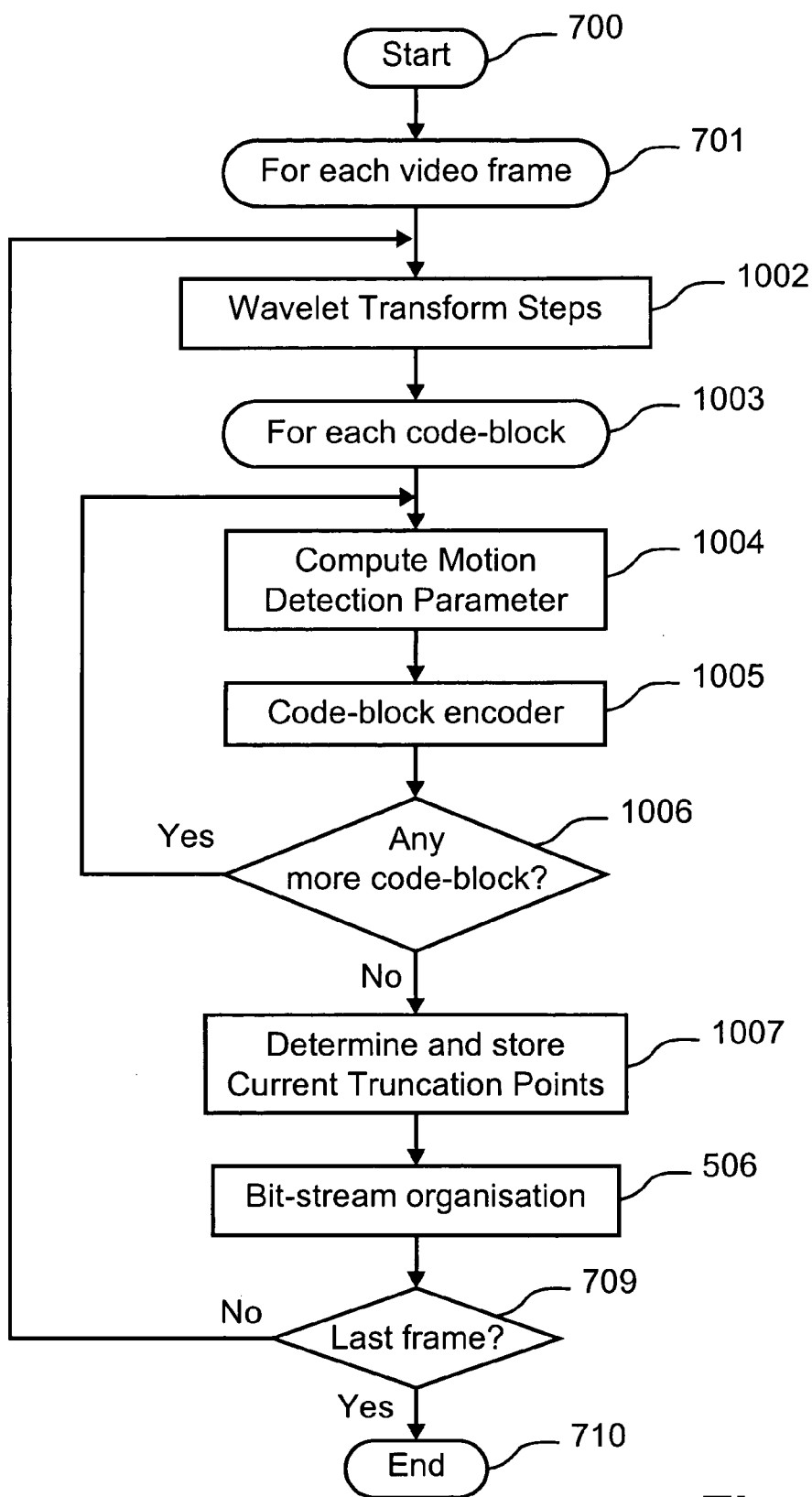
FIG. 10 shows a flow chart of the method of static block truncation stabilisation of FIG. 7.

The first arrangement includes a static block truncation stabilisation scheme 712. FIG. 10 illustrates a method of compressing each frame of a video sequence into MJ2K format. FIG. 10 includes many of the steps of FIG. 7, but provides more detail regarding the coding step 705 with static block truncation stabilisation 712. Specifically, steps 1003 through 1006 correspond to steps 705 and 712 of FIG. 7.

The method begins at step 700 and then enters loop 701, wherein each iteration of the loop compresses a current frame of a video sequence. Once all the frames have been processed, loop 701 ends and the method terminates in step 710.

Within loop 701, the processor 2705 performs wavelet transform steps on the current video frame f in step 1002, such steps incorporating the pre-processing step 501, the wavelet transformation step 502, the quantization step 503 and, preferably, the flicker reduction step 711.

Next, the program running on processor 2705 enters loop 1003 to encode each code-block $n_f$ of f in turn. For each code-block, a motion detection parameter is computed in step 1004, which is described in more detail below with reference to FIG. 11. In step 1004 the processor 2705 compares the current code-block $n_f$ with the corresponding code-block $n_{f-1}$ of the previous frame (f−1). A code-block $n_f$ is flagged as 'static' if no motion is detected between code-block $n_f$ and code-block $n_{f-1}$. Otherwise, code-block $n_f$ is flagged as a 'non-static' code-block.

Once the motion detection parameter has been computed, frame f is encoded in step 1005, which uses a method for terminating the encoding procedure. Different terminating strategies are applied in step 1005 depending on whether the current code-block is determined as static or non-static. Step 1005 is described below in more detail with reference to FIG. 12.

Next, in step 1006, the processor carries out a test to determine if there are any more code-blocks to process for frame f. If test 1006 returns positive, the method returns to step 1004 to process the next code-block of frame f. If, however, test 1006 returns negative (ie there are no more code-blocks in the current frame) then process flow proceeds with step 1007.

In step 1007 the processor 2705 determines and stores the truncation point of each code-block $n_f \in [n=1, \ldots, N]$, where N is the total number of code-blocks in f. The truncation point of each code-block $n_f$ is determined by choosing the largest point $i_n$ corresponding to $\lambda^{i_n} \leq \lambda_f$ (ie step 706 of FIG. 7). An alternative implementation involves using the PCRD-opt routine recommended by the JPEG2000 standard (ie step 505 of FIG. 7). Other rate control strategies may also be used. The set of truncation points determined in step 1007 is stored into memory 911 for use when processing the next frame f+1.

Next, the encoded values are organized into a bit-stream (step 506).

In step 709 a test is carried out to determine if current frame f is the last frame of the video sequence. If test 709 returns negative, then processing returns to step 1002 to process the next frame in the sequence. If test 709 returns positive (ie there are no more frames), then loop 701 is exited and the method ends at step 710.

3.4.1 Calculating Motion Between Code-blocks

Figure 11:
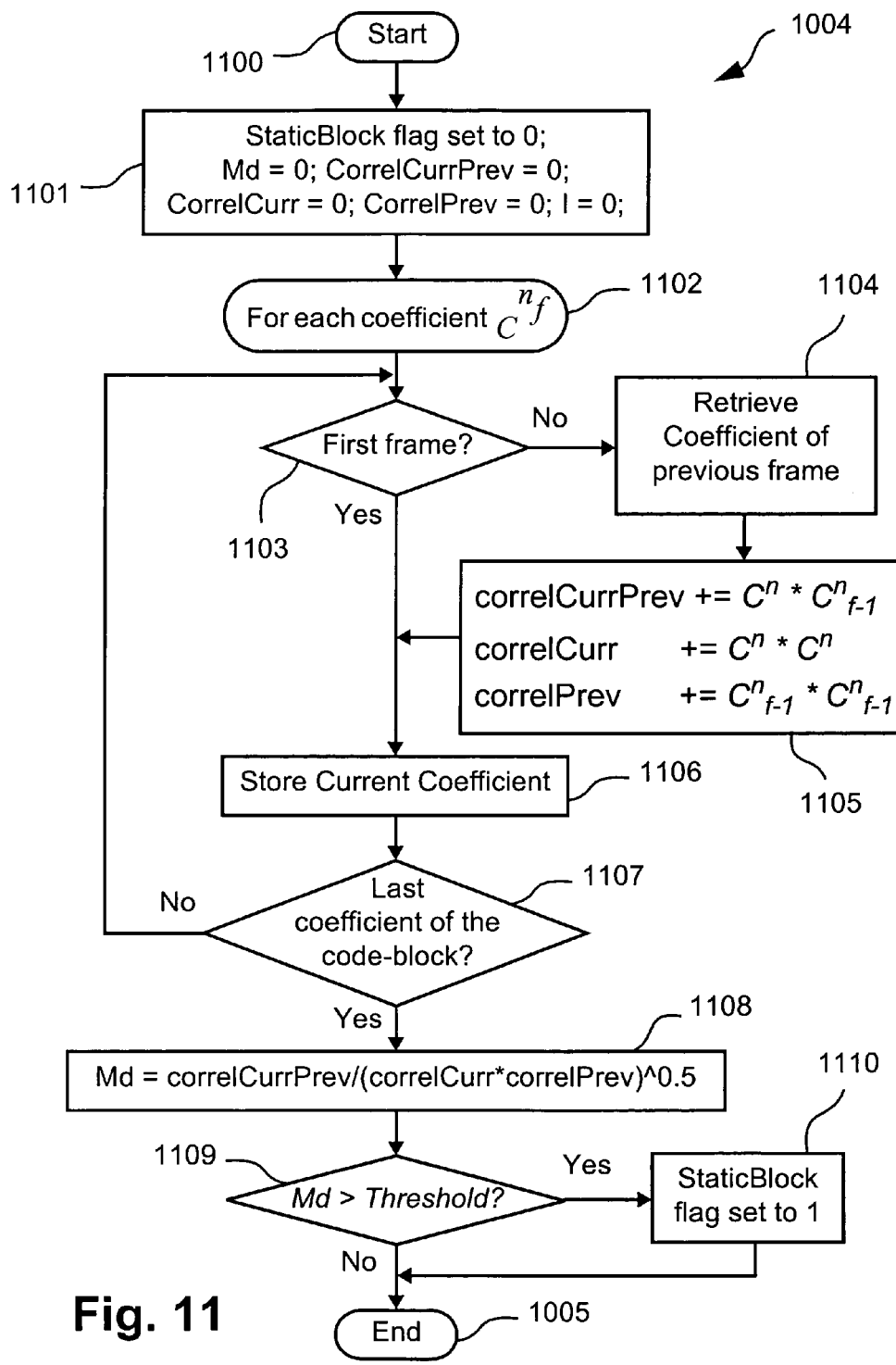
FIG. 11 shows a flow chart of a method of computing a motion detection parameter in the method of FIG. 10.

Step 1004, which computes the motion detection parameter, is described in more detail with reference to FIG. 11. The parameter computation commences at step 1100 and proceeds to step 1101, where all necessary parameters used to perform the motion detection are initialized to 0.

The initialized parameters are a StaticBlock flag that is used to indicate whether a code-block is static or non-static and Md (a motion detection parameter). Three parameters used in the computation of Md are also initialized to zero, the three parameters being CorrelCurrPrev, CorrelCurr and CorrelPrev.

In the first arrangement Md is a correlation coefficient which is computed preferably as follows:

$$Md = \frac{\sum_{j=1}^{L} (x_j \times y_j)}{\sqrt{\left(\sum_{j=1}^{L} x_j^2\right)\left(\sum_{j=1}^{L} y_j^2\right)}} \quad (15)$$

where $x_1, x_2, \ldots, x_L$ and $y_1, y_2, \ldots, y_L$ are entries to two vectors X and Y both having L number of entries. X is a vectorized representation of code-block $n_f$ and Y is a vectorized representation corresponding to code-block $n_{f-1}$. L is the size of code-block $n_f$. For example, if code-block $n_f$ is of size height×width, then L=height×width.

After initialization of the variables, loop 1102 is entered to process each wavelet coefficient of code-block $n_f$ in turn. The currently considered coefficient is $C^n$. For each coefficient, a test is carried out in step 1103 to determine if the current frame f=1. If this is the case (the Yes option of step 1103) then no comparison with previous frames can be made, and code-block $n_f$ is coded without any modification to the wavelet coefficients. For the Yes option of step 1102, process flow proceeds directly to step 1106. If step 1103 returns negative (ie. the current frame is not the first frame), then for every wavelet coefficient of code-block $n_f$ the corresponding wavelet coefficient of code-block $n_{f-1}$ is retrieved from memory in step 1104. The coefficients of the previous frame are stored in memory location 915

In step 1105, the variables CorrelCurrPrev, CorrelCurr and CorrelPrev are updated as follows:

CorrelCurr+=$C^n * C^n$;

CorrelPrev+=$C^n_{f-1} * C^n_{f-1}$; and

CorrelCurrPrev+=$C^n * C^n_{f-1}$.

The operator += denotes a cumulative addition to the previous value of the variable.

It will be appreciated that once all the coefficients $C^n$ in the current code-block have been processed, the following summations are obtained:

$$1.\ CorrelCurr = \sum_{j=1}^{L} x_j^2,$$

where X is the code-block $n_f$;

$$2.\ CorrelPrev = \sum_{j=1}^{L} y_j^2,$$

where Y is the code-block $n_{f-1}$; and $$3.\ CorrelCurrPrev = \sum_{j=1}^{L} (x_j \times y_j),$$

where X is the code-block $n_f$ and Y is the code-block $n_f$-1.

In step 1106, the wavelet coefficients of current code-block $n_f$ are stored into memory 915 to be used in processing the next frame in the sequence. In step 1107, a test is carried out to determine if all the wavelet coefficients of code-block $n_f$ have been processed. If test 907 returns positive (ie. there are no more coefficients in the block) then loop 1102 exits and process flow proceeds at step 1108. If there are still coefficients in the current code-block (the No option of step 1107), then process flow returns to step 1103.

In step 1108 Md is computed using equation (15). In step 1109, a test is conducted to see if Md is greater than a threshold Ts. If Md is greater than the threshold (the Yes option of step 1109) then the StaticBlock flag is set to 1 in step 1110, indicating that the current code-block is highly correlated with the previous code-block. If Md is less than the threshold (the No option of step 1109) then StaticBlock is left unchanged at zero. Process flow resumes at step 1005.

In the first arrangement the threshold Ts is set to 0.9. Other values are possible. In one implementation, different values of Ts are used for different DWT levels. In a further implementation, different values of Ts are used for different components of the image. The lower the value of Ts, the more efficient the stabilization process. However, there is a trade-off with image quality.

In the case where only two bits per coefficient are stored between frames, the correlation coefficient Md is calculated using only the two available bits. A correlation component calculated in this fashion still indicates changes in motion between frames.

3.4.2 Using the Motion Detection Parameter in Coding a Block

Figure 12:
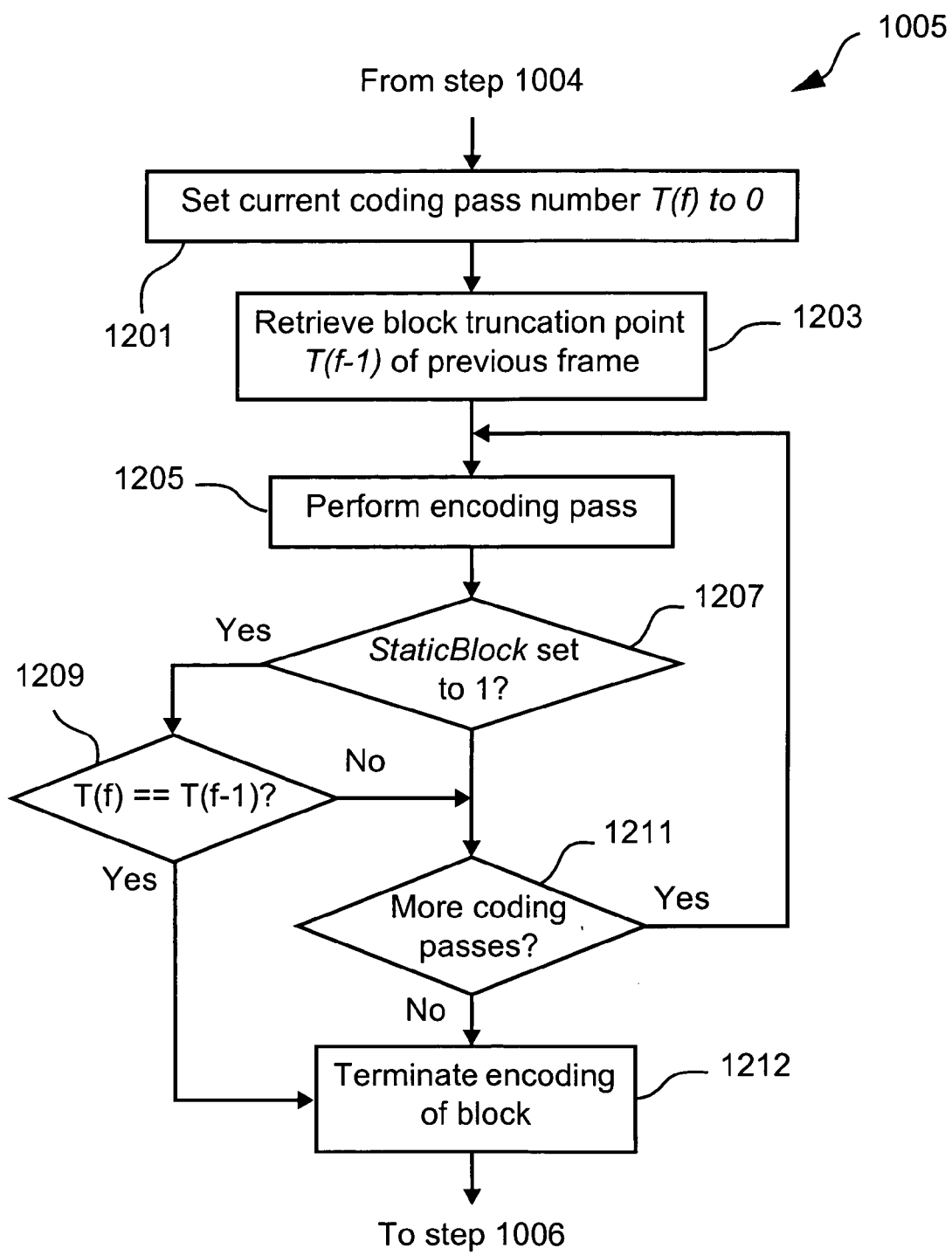
FIG. 12 shows a flow chart that illustrates how the motion detection parameter of FIG. 11 is used in the method of FIG. 10.

FIG. 12 illustrates how the motion detection parameter calculated in step 1004 is used in determining whether to terminate coding of the current code-block $n_f$. The steps of FIG. 12 correspond to step 1005.

In step 1201 the current coding pass $T_f$ is set to 0. Then, in step 1203, the block truncation point T(f-1) of the corresponding code-block $n_{f-1}$ in the previous video frame is retrieved from memory 911.

Next, in step 1205, code-block $n_f$ is encoded using the usual JPEG 2000 coding method. Then, in step 1207, a test is performed to see whether the StaticBlock flag of the current block is set to 1. If the current block is static (the Yes option of step 1207) then process flow proceeds to step 1209. If, however, the current block is not static (the No option of step 1207) then process flow proceeds to step 1211.

In step 1209 the processor 2705 compares the value of the current coding pass T(f) with the value of T(f-1). If $T_f$=T(f-1) and the current code-block is a static code-block (the Yes option of step 1209) then the encoding of the current code-block is terminated in step 1212.

If, however, T(f) is not yet equal to T(f-1) (the No option of step 1209) then process flow proceeds to step 1211.

Step 1211 is performed when the current block is not a static block or when $T_f$ is not yet equal to T(f-1). In step 1211 a test is performed to see whether there are still any coding passes for the current block. If there are still coding passes (the Yes option of step 1211) then process flow returns to step 1205. If, however, there are no more coding passes for the current block (the No option of step 1211) then encoding of the current block terminates in step 1212.

Once coding of the current block is complete in step 1212, processing resumes in step 1006.

3.5 Frame-dependent Component Weighting

The first arrangement provides a method for weighting the image components of each video frame adaptively. This frame dependent component weighting method 713 uses different cut-off rate-distortion thresholds $\lambda_f$ for the luminance and chrominance components in the $YC_bC_r$ color space. In the following description component 0 refers to the luminance component Y, and components 1 and 2 refer to the chrominance components $C_b$ and $C_r$ respectively. The luminance component has a greater effect on perceived quality than the chrominance components and thus the weighting method 713 favors the encoding of the luminance component at the expense of the chrominance components.

Weighting $\lambda_f$ for different components is an improvement on the method of applying visual weighting. Two alternative component weighting methods are discussed with reference to FIGS. 13 and 14 respectively. In each of the two methods, the compressibility of the current frame is determined with respect to the previous frame. In the first version, compressibility is estimated on the basis of the chrominance components. If the frame is determined to be more compressible (i.e. fewer bits are required to code the chrominance components), the bit budget allocated to the luminance component is increased.

In the second version of the weighting method 713, the coding of the luminance component is maintained at a certain distortion level and the coding of the chrominance components is weighted to compensate if there is overcoding of the luminance component.

In addition the first version of method 713 allows trimming of the compressed data of a video frame to be limited to the chrominance components. Thus, if the luminance component of a frame was compressed too leniently, then trimming more data from the frame's chrominance components will save bits.

3.5.1 Weighting the Luminance Cutoff Threshold

Figure 13:
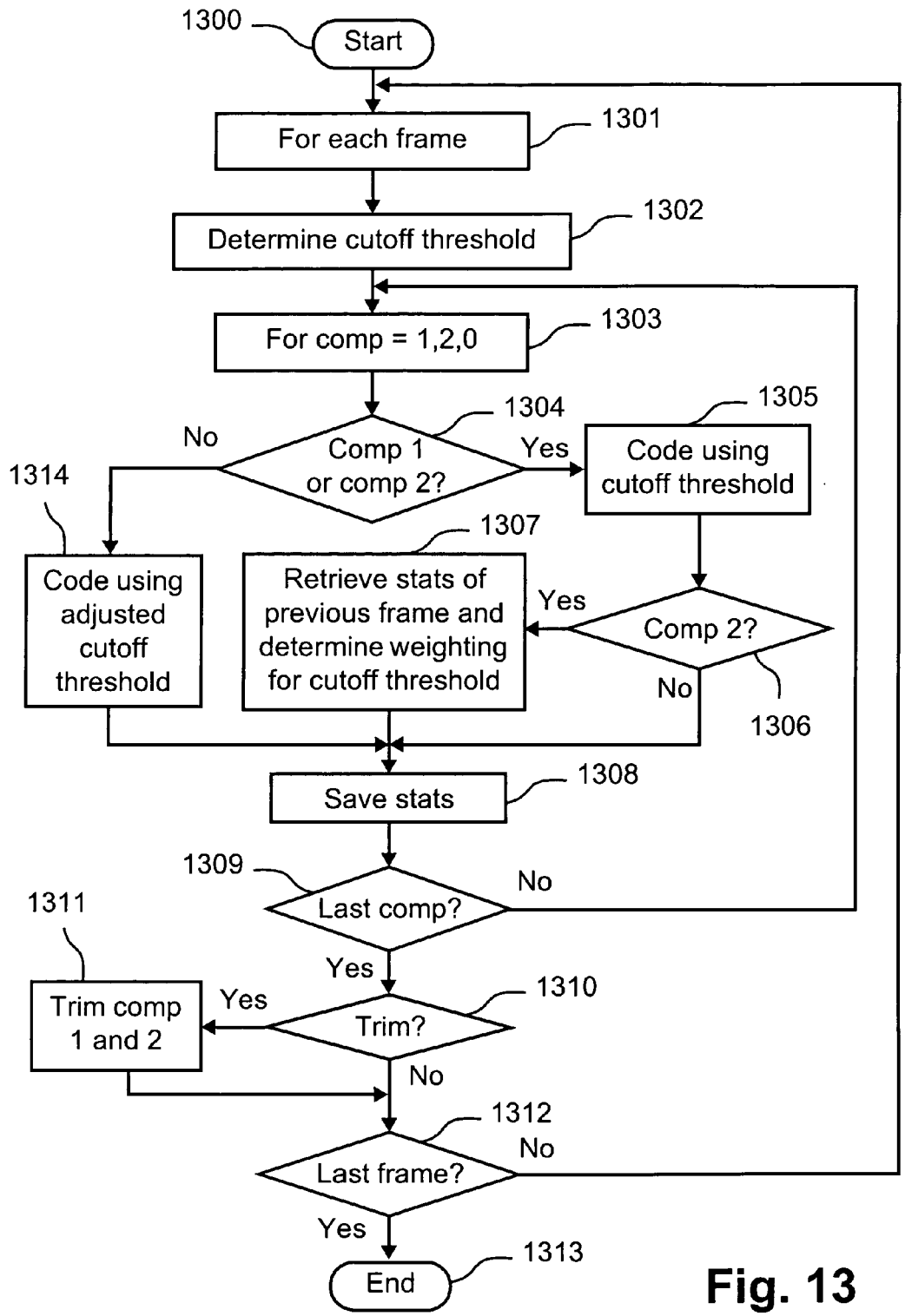
FIG. 13 shows a flow chart of a first method of frame-based component weighting for use in the methods of FIG. 7.

FIG. 13 illustrates the component weighting scheme 713 where the luminance cutoff threshold is potentially adjusted. With reference to FIG. 7, FIG. 13 provides more detail regarding the coding step 705 making use of the component weighting scheme 713. For the purpose of clarity FIG. 13 reproduces some of the steps of FIG. 7. For example, steps 1300, 1301, 1312 and 1313 of FIG. 13 correspond to steps 700, 701, 709 and 710 of FIG. 7. The steps are retained in FIG. 13 to emphasize that the component weighting scheme is applied in turn to each frame of the video sequence.

The method of frame dependent component weighting 713 begins at step 1300 and then enters loop 1301, in which the processor 2705 processes each frame of the video sequence in turn. In loop 1301 the processor 2705 processes the first frame of the video sequence in the first pass and during subsequent passes processes subsequent frames of the video. After all the frames of the video have been processed, loop 1301 exits at step 1312 and the method terminates at step 1313.

Within loop 1301, in step 1302 the processor 2705 first determines a cutoff threshold $\lambda_f$ for the current frame f as described above in section 3.3. The current frame also has a target bit rate that determines a bit budget for encoding the current frame.

The usual J2K encoding steps such as pre-processing, component transform and quantization are then performed by the processor 2705 (as shown in steps 501-503 of FIG. 7). Next, loop 1303 is entered to process each component of the video frame in turn. In loop 1303 the processor 2705 first processes the chrominance components and then in the final pass processes the luminance component. That is, loop 1303 processes the components in the order 1, 2 and then 0.

In step 1304 a test is carried out by the processor 2705 to determine if the current component is one of the two chrominance components. If test 1304 returns positive, step 1305 is performed to encode the current component according to the usual J2K encoding process using $\lambda_f$ as determined in step 1302. After the current component has been encoded, processor 2705 carries out a test in step 1306 to determine if the current component is component 2. If the current component is 1 (the No option of step 1306), processing continues at step 1308, in which values associated with the current component are saved in memory 906. In particular, the achieved rate of the current component is saved in location 913.

In the next step 1309 the processor 2705 carries out a test to determine if the current component is the last component. If test 1309 returns negative process flow returns to step 1304 to process the next component.

If the current component is 2 (the Yes option of step 1306) then step 1307 is carried out to retrieve the statistics of the previous frame from memory 906. The retrieved statistics include the achieved component rate $R_{achieved}$ of the previous frame f−1. In step 1307 the processor also calculates a weighting for $\lambda_f$ to be used in encoding the luminance component. The weighting uses the achieved rates of the chrominance components of both the current frame f and the previous video frame f−1 to estimate the overall compressibility of the current video frame. For example, if the achieved rates of the current components are higher than the achieved rates of the previous video frame, then the current video frame is likely to be less compressible compared to the previous video frame. The first arrangement uses this information to encode the luminance component more effectively.

If the current frame is determined to be more compressible in step 1307, then $\lambda_f$ is preferably weighted to increase the achieved rate of the luminance component. If the current frame is more compressible, it means that fewer bits are used in encoding the chrominance components and therefore more bits are available for coding the luminance component, while remaining within the target bit rate for the frame.

In step 1307 the processor 2705 adjusts $\lambda_f$ according to the following equation:

$$\lambda_f = \frac{\sum_{m=1,2} R_{achieved}^{fm}}{\sum_{m=1,2} R_{achieved}^{f-1m}} \lambda_f \qquad (16)$$

where $$R_{achieved}^{fm}$$

is the achieved rate for component m in the current frame f and $$R_{achieved}^{f-1m}$$

is the achieved rate for component m in the previous frame f−1.

The weighting factor of equation (16) is limited to unity if the current frame is less compressible than the previous frame. The reason for limiting the weighting factor to unity is that luminance has a greater impact on perceived quality than the chrominance components. Accordingly, for a less compressible frame, the encoding of the luminance component is not compromised. It may then be necessary to trim the chrominance components (see step 1310 below).

After step 1307 is complete, process flow proceeds to step 1308, in which the achieved rates of the current coefficient are stored in memory 906.

If the current component is the luminance component (the No option of step 1304) then encoding of the component is carried out in step 1314 using the adjusted $\lambda_f$ as determined in step 1307. Note that if $\lambda_f$ is reduced in step 1307, more coding passes are generally used in coding the luminance component than would otherwise have been the case. After step 1314, process flow proceeds to step 1308 to save the achieved rates in memory 906.

After all the components of the current video frame f have been processed (the Yes option of step 1309), then step 1310 is entered to determine if the data requires trimming, i.e. whether the target bit rate has been exceeded. If trimming is required (the Yes option of step 1310) then step 1311 is carried out to trim the compressed data of components 1 and 2. Trimming the compressed data consists of discarding compressed data of coding pass $i_n$ of code-blocks $n_f$ of components 1 and 2 whose $\lambda^{in} \leq Z$ (a predetermined threshold). The threshold Z is preferably determined as follows:

$$Z = \frac{\sum_{m=1,2} R_{achieved}^{fm}}{\sum_{m=1,2} R_{achieved}^{f-1m}} \lambda_f. \quad (17)$$

The trimming steps 1310 and 1311 correspond to the post-coding trimming step 706 of FIG. 7.

After step 1311 is complete, step 1312 checks whether the current frame is the last frame. If there are frames remaining (the No option of step 1312), then process flow returns to step 1302 to process the next frame. If there are no more frames the process ends in step 1313.

If the trimming process is not required (the No option of step 1310) then step 1311 is skipped and processing continues at step 1312.

3.5.2 Weighting the Chrominance Cutoff Threshold

Figure 14:
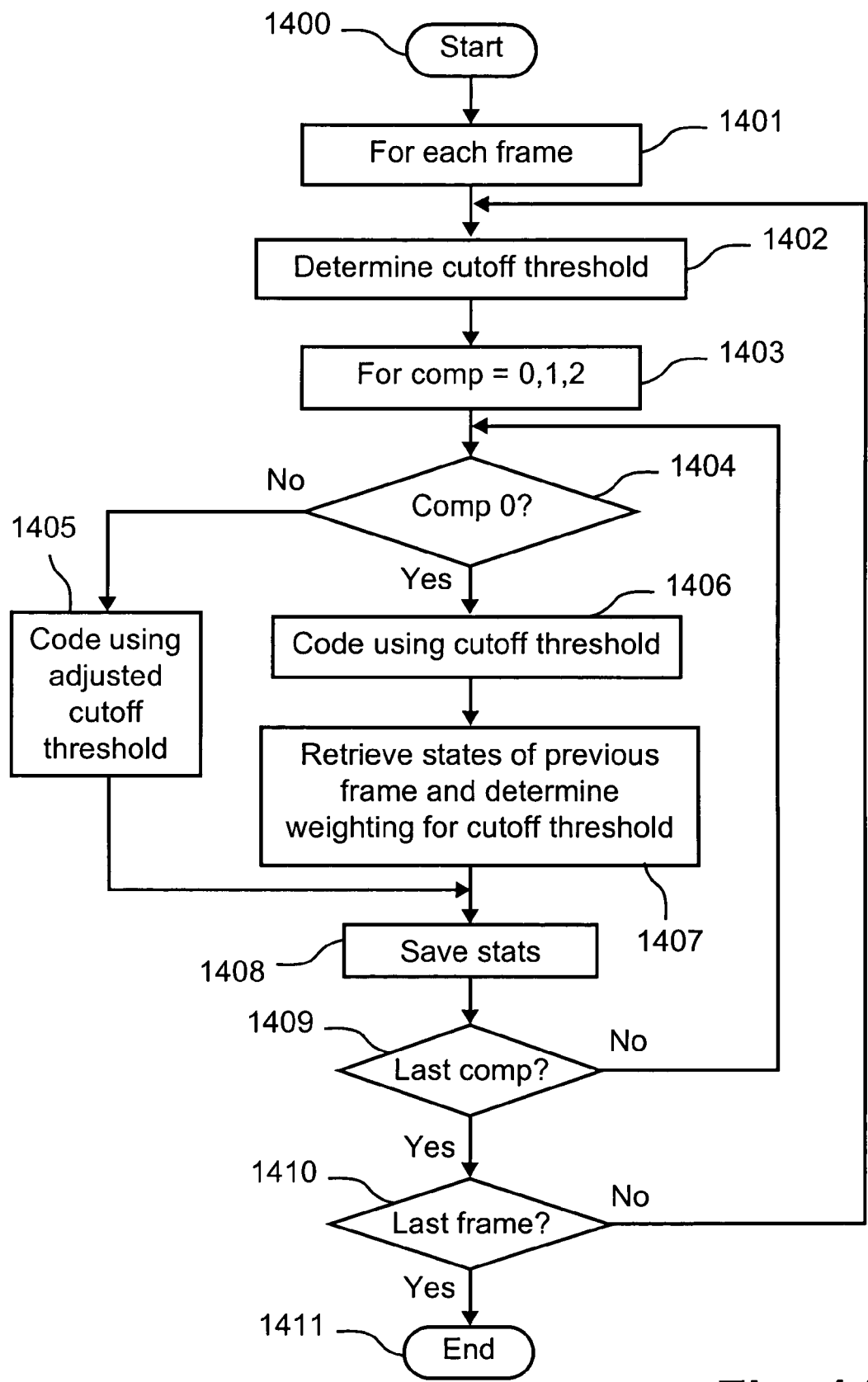
FIG. 14 shows a flow chart of an alternative method of frame-based component weighting for use in the methods of FIG. 7.

FIG. 14 shows an alternative implementation of the frame-dependent component weighting scheme 713, in which the cutoff for the luminance component is not adjusted but the weighting of the chrominance component is weighted according to the estimated compressibility.

The method commences at 1400 and enters loop 1401 process each frame of the video sequence in turn. After all video frames have been processed, loop 1401 exits at step 1410 and the method terminates at 1411.

Within loop 1401, in step 1402 processor 2705 determines a cutoff threshold $\lambda_f$ for the current video frame f. Step 1402 is the same as step 1302 and uses the procedure described in section 3.3. The usual J2K encoding processing steps such as pre-processing and component transform (steps 501-503 of FIG. 7) are then performed on the current frame.

Then, in step 1403, a loop is entered to process each component of the current video frame in turn. In loop 1403 the processor 2705 first processes the luminance component and then in subsequent passes processes each of the chrominance components in turn. Thus, loop 1403 processes the components in the sequence 0,1,2.

In step 1404 a test is carried out to determine if the current component is the luminance component. If test 1404 returns positive, process flow proceeds to step 1406, which encodes the component according to the usual J2K encoding process using $\lambda_f$ as determined in step 1402. After the component has been encoded, step 1407 retrieves relevant statistics of the previous video frame f−1 from memory 906. In particular, the rates achieved in the previous frame are retrieved from memory 913.

Step 1407 also determines the weighting for $\lambda_f$ to be used in encoding the chrominance components. Based on the achieved rates of the luminance component of both the current frame f (as determined in step 1406) and the previous frame f−1, the overall compressibility of the current video frame can be estimated. Thus, if the achieved rate of the luminance component of f is higher than the luminance component of f−1 then video frame f is likely to be less compressible than video frame f−1. Cutoff threshold $\lambda_f$ is weighted accordingly to decrease the achieved rates of the chrominance components of f.

Threshold $\lambda_f$ is preferably weighted according to the following equation:

$$\lambda_f = \frac{R_{achieved}^{fm}}{R_{achieved}^{f-1m}} \lambda_f \quad (18)$$

where m=0 i.e. the luminance component.

After the encoding is complete for the current component, step 1408 is carried out to save the achieved rate of the component to memory 916 for use in processing the following frame.

If the current component is one of the chrominance components (the No option of step 1404) then in step 1405 the current chrominance component is encoded using the weighted $\lambda_f$ determined previously in step 1407. The program running on processor 2705 then proceeds to step 1408, which saves the achieved rate of the current component to memory 913.

Next, step 1409 checks whether the current component is the last component. If there are other components of the frame, process flow returns to step 1404 to process the next component. If all the components have been processed (the Yes option of step 1409), then step 1410 checks whether the current frame is the last frame. If all the frames have been processed (the Yes option of step 1410) then loop 1401 exits and the method ends at 1411. Otherwise (the No option of step 1410) process flow returns to step 1402 to process the next frame in the sequence.

3.6 Coding Scheme

The first arrangement uses a coding scheme 714 that reduces the amount of over-coding for each code-block $n_f$ of a current video frame f. The coding scheme 714 uses the truncation points of code-blocks in a previous frame of the video sequence to decide when to terminate coding of code-blocks in frame f.

Figure 15:
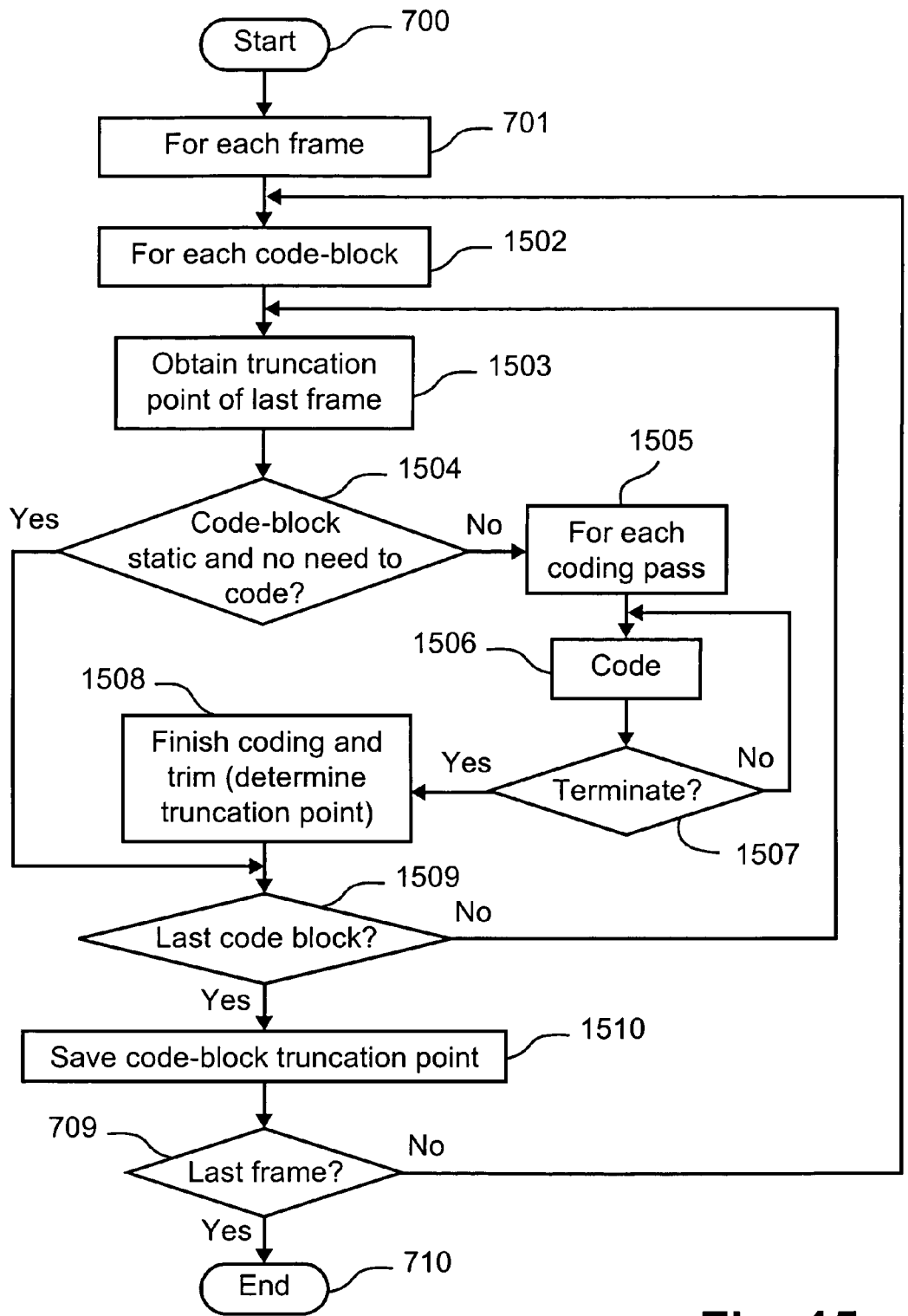
FIG. 15 shows a flow chart of a coding scheme for use in the methods of FIG. 7.

FIG. 15 illustrates the coding scheme 714 as used in the encoding process of FIG. 7. For clarity, FIG. 15 reproduces some, but not all, of the steps of FIG. 7. The process starts in step 700 and enters a loop 701 to process each frame f of a video sequence in turn. Loop 701 processes the first frame of the video sequence in the first iteration and during subsequent iterations loop 701 processes corresponding subsequent frames of the video. After all the frames of the video have been processed, loop 701 exits at step 709 and the method terminates at step 710.

Within loop 701 the encoding method performs several steps not shown in FIG. 15. For each video frame, the method estimates the cutoff threshold $\lambda_f$ (step 1302 of FIG. 13) and then processor 2705 performs the standard J2K encoding steps of preprocessing, discrete wavelet transform (DWT) and quantization (steps 501-503 of FIG. 7). Loop 701 then enters another loop 1502 for processing each code-block $n_f$ in the video frame f in turn. After all code-blocks $n_f$ have been processed, loop 1502 exits at step 1509 and the processing continues at step 1510, which stores the truncation point of code-block $n_f$.

Within loop 1502, in step 1503 the processor 2705 retrieves from memory 906 the truncation point of the corresponding code-block $n_{f-1}$ in the previous frame f−1. Note that the first frame is treated as a special case, as there is no information from prior frames to use when encoding the first frame. Thus, for the first frame, steps 1503 and 1504 are omitted and coding of the first frame commences at step 1505.

In step 1504 a test is carried out to determine whether to proceed coding the current code-block $n_f$ or not. Step 1504 checks whether the current code-block is a static block and whether code-block $n_{f-1}$ was coded (i.e. whether any significant bit-planes were coded in the bit-stream). A procedure for determining whether code-block $n_f$ is static is described above with reference to FIG. 11. If code-block $n_f$ is determined to be a static code-block and code-block $n_{f-1}$ was not coded (the Yes option of step 1504) then processing proceeds to step 1509 and no coding for code-block $n_f$ is performed. If however, test 1504 returns negative (the No option of step 1504) then process flow proceeds to step 1505.

In step 1505 a loop is entered to code each coding pass of code-block $n_f$. A maximum number of coding passes to code for a particular code-block is determined prior to coding (not shown). The maximum number of passes is determined using standard JPEG 2000 methods. Note that in J2K there are nominally three coding passes for each bit-plane.

Within loop 1505, in step 1506 the processor 2705 codes the quantized wavelet coefficients in code-block $n_f$. Upon first entering loop 1505, step 1506 performs a clean-up pass. In subsequent iterations, step 1506 performs a significance propagation pass, a magnitude refinement pass or a clean-up pass in this order, before resuming from the significance propagation pass. After coding a coding pass, the coding step 1506 determines a distortion value and a rate associated with the current coding pass. The distortion and the rate are used to determine whether to terminate the coding after the current coding pass. The termination test is carried out in step 1507 after each coding pass 1506, and is described in more detail below with reference to FIG. 16.

If the termination test 1507 is negative and if there are more coding passes to process then the processing returns to step 1506 to process the next coding pass. If, however, the termination test 1507 is positive the current coding pass is determined as the final coding pass and process flow proceeds to step 1508 to finish coding code-block $n_f$.

Step 1507 establishes the termination point of code-block $n_f$. Then, in step 1508, trimming is applied to code-block $n_f$. The trimming consists of determining the truncation point of code-block $n_f$ and discarding compressed data of any coding pass $i_n$ having a rate-distortion slope $\lambda^{i_n} \leq \lambda_f$. The trimming performed in step 1508 corresponds to the post-coding trimming of step 706.

After the trimming is complete, in step 1509 the processor 2705 tests whether the current code-block is the last code-block. If there are more code-blocks to process (the No option of step 1509) then the processing returns to step 1503. If, however, all the code-blocks have been coded (the Yes option of step 1509) then loop 1502 exits.

After all the code-blocks have been processed, some standard J2K encoding steps are performed, although not shown in FIG. 15. The encoding steps include bit-stream organization (step 506 of FIG. 7).

Next, in step 1510 the truncation points for all the code-blocks are stored into memory 911 for use in processing the next video frame (f+1). Then, step 709 tests whether the current frame is the last frame. If this is not the case (the No option of step 709), then process flow returns to step 1502 to encode the next frame in the sequence. If there are no more frames (the Yes option of step 709), the method ends in step 710.

3.6.1 Termination Criteria

A procedure for determining the termination point for code-block $n_f$ is now described in greater detail with reference to FIG. 16, in which steps 1603 to 1608 correspond to step 1507 of FIG. 15. In the first arrangement, the decision to terminate a code-block $n_f$ after a coding-pass makes use of the truncation point of code-block $n_{f-1}$.

Figure 16:
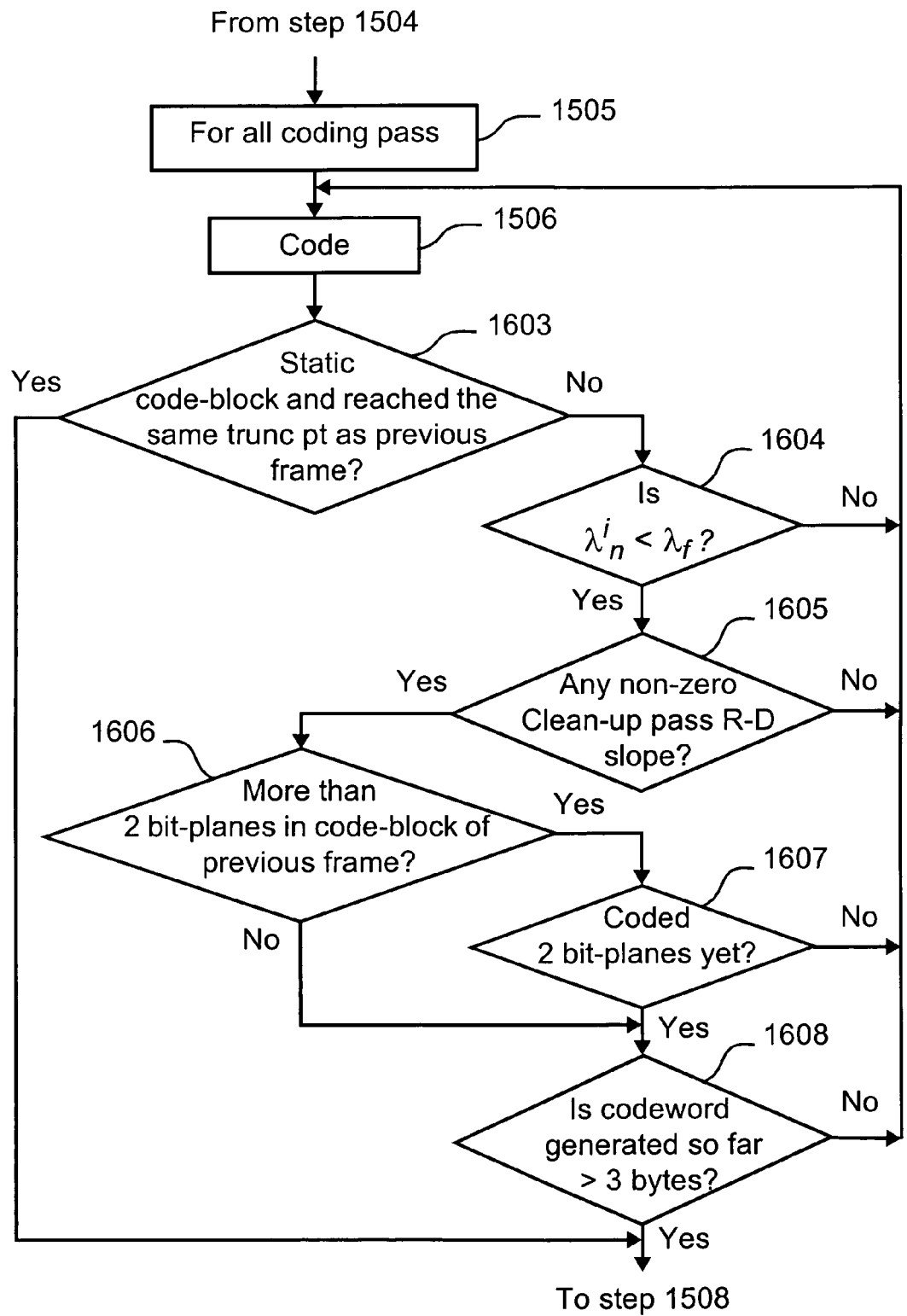
FIG. 16 shows a flow chart of termination conditions for use in the method of FIG. 15.

Referring to FIG. 16, loop 1505 is entered to process each coding pass of code-block $n_f$ as described above with reference to FIG. 15. After coding all the required coding passes, loop 1505 exits and process flow proceeds to step 1508 to finish the coding process. Note that terminating the coding process of a code-block $n_f$ usually occurs before encoding the final coding pass for code-block $n_f$.

Step 1603 tests whether the current code-block $n_f$ is a static code-block and whether the current coding process has reached the same truncation point (bit-plane) as the corresponding code-block $n_{f-1}$. If these two conditions are met (the Yes option of step 1603) then the coding of code-block $n_f$ terminates and process flow proceeds to step 1508 to finish coding. If, however, the current code-block is not a static block or the truncation point of the corresponding previous code-block is not yet reached (the No option of step 1603) then process flow proceeds to step 1604, in which a further termination test is performed. The procedure for determining whether a code-block is a static block is described above with respect to FIG. 11.

For code-block $n_f$, coding step 1506 calculates a rate-distortion slope $\lambda^{i_n}$ of the current coding pass $i_n$. Step 1604 tests whether the rate-distortion slope $\lambda^{i_n}$ is greater than the cut-off threshold $\lambda_f$ for the current frame. Calculation of the cutoff threshold is described above in section 3.3. If the rate-distortion slope of the current coding pass is greater than the cutoff threshold (the No option of step 1604) then processing returns to step 1506 to code the next coding pass (i.e. $i_n = i_n + 1$). If, however, the rate-distortion slope of the current coding pass is less than the cutoff threshold (the Yes option of step 1604) then process flow proceeds to step 1605, where a further test is carried out.

Step 1605 checks all the coding passes processed so far for code-block $n_f$ in loop 1505, and determines if there are any clean-up coding passes with non-zero $\lambda^{i_n}$, i.e. whether a significant bit was coded in at least one clean up pass for the current code-block. If test 1605 returns positive (i.e. a significant bit has previously been coded in a clean-up pass) then process flow proceeds to step 1606, in which a further test is carried out. If test 1605 is negative (i.e. there is a clean-up coding pass with non-zero $\lambda^{i_n}$), then process flow returns to step 1506 to encode the next coding pass.

In step 1606 the processor 2705 tests whether more than two significant bit-planes were coded in code-block $n_{f-1}$. If test 1606 returns negative then processing continues at step 1608. If test 1606 returns positive (i.e. more than two significant bit-planes were coded in code-block $n_{f-1}$), then a further test is carried out in step 1607. In step 1607, if more than two significant bit-planes have been coded so far for code-block $n_f$ (the Yes option of step 1607) then processing continues in step 1608. If, however, test 1607 returns negative then processing returns to step 1506 to process the next coding pass.

In step 1608 a further test is carried out to determine if the compressed data generated by coding pass $i_n$ in step 1506 is greater than A bytes in length. In the first arrangement preferably A=3 bytes. If test 1608 returns negative then processing returns to step 1506 to process a further coding pass. If, however, test 1608 returns positive (i.e. the generated codeword is greater than A bytes, then loop 1505 exits, and process flow resumes in step 1508. Exiting loop 1505 establishes the current coding pass as the termination point of the code-block.

In variations of the first arrangement, additional terminating conditions are possible, for example checking whether bytes have been contributed to the codeword by specific types of coding pass, such as a clean-up pass. In addition, different values of A may be used.

3.7 Post-coding Trimming

Figure 17:
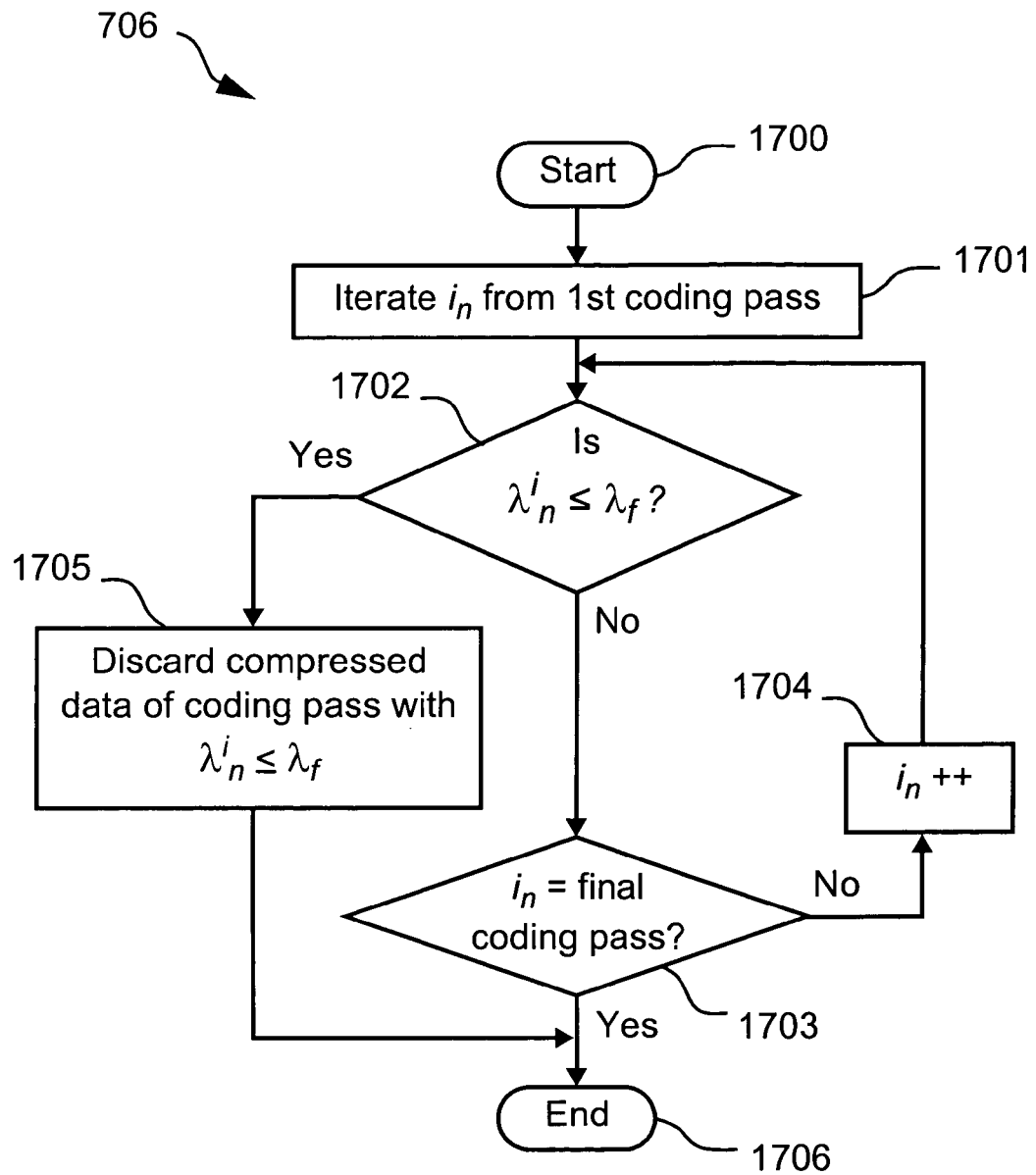
FIG. 17 shows a flow chart of a method of post-coding trimming for use in the method of FIG. 15.

As discussed above, the first arrangement uses a method of post-coding trimming, which is now described with reference to FIG. 17. The steps of FIG. 17 correspond to step 706 of FIG. 7, and are also used in the trimming of step 1508 in FIG. 15. The trimming method is applied once coding of a code-block has finished. Coding a code-block results in a series of coding passes, from a first coding pass to a final coding pass where coding was terminated. There is a rate-distortion slope associated with each coding pass.

The trimming method begins at step 1700 and enters a loop 1701 to iterate through the coding passes of code-block $n_f$, starting with the first coding pass of code-block $n_f$.

Within loop 1701, in step 1702 the processor 2705 determines whether the rate-distortion slope $\lambda^{i_n}$ of the current coding pass $i_n$ is less than or equal to $\lambda_f$, the cutoff threshold for the current frame f. If test 1702 returns negative (ie $\lambda^{i_n} > \lambda_f$), then the current coding pass is retained for inclusion in the codeword and processing proceeds to step 1703, which determines if the current coding pass is the final coding pass for code-block $n_f$. If the current coding pass is not the final coding pass (the No option of step 1703), then step 1704 increments the index of the coding pass $i_n$ and process control returns to step 1702 to consider the next coding pass. Coding only proceeds up to the maximum number of coding passes. If test 1703 returns positive (ie the current coding pass is the final coding pass), loop 1701 exits and the trimming method ends at step 1706.

If $\lambda^{i_n} \leq \lambda_f$ (ie the Yes option of step 1702) then the compressed data associated with coding pass $i_n$ is discarded in step 1705 and the method ends in step 1706, thus discarding subsequent coding passes.

After trimming is complete, the final remaining coding pass is the truncation point of code-block $n_f$.

The method 1700 is preferably carried out after the system 2701 has completed coding for code-block $n_f$. Method 1700 is used to trim the compressed data of a code-block $n_f$ and the compressed data that remain after trimming are kept to compose the final bit-stream of video frame f This method can also be considered as truncating the code-block to a truncation point determined by $\lambda_f$.

In alternative implementations the trimming method 706 can be implemented at several locations during the MJ2K encoding process, for example either after coding a subband or after coding a resolution level.

The post-coding trimming method 706 can be considered as a form of post-coding distortion optimization and differs from the PCRD-opt algorithm recommended by the JPEG2000 standard in that optimization of the distortion is achieved using a value of $\lambda_f$ determined prior to any coding. In contrast, PCRD-opt chooses $\lambda_f$ after coding.

4.0 Second Arrangement

Figure 18:
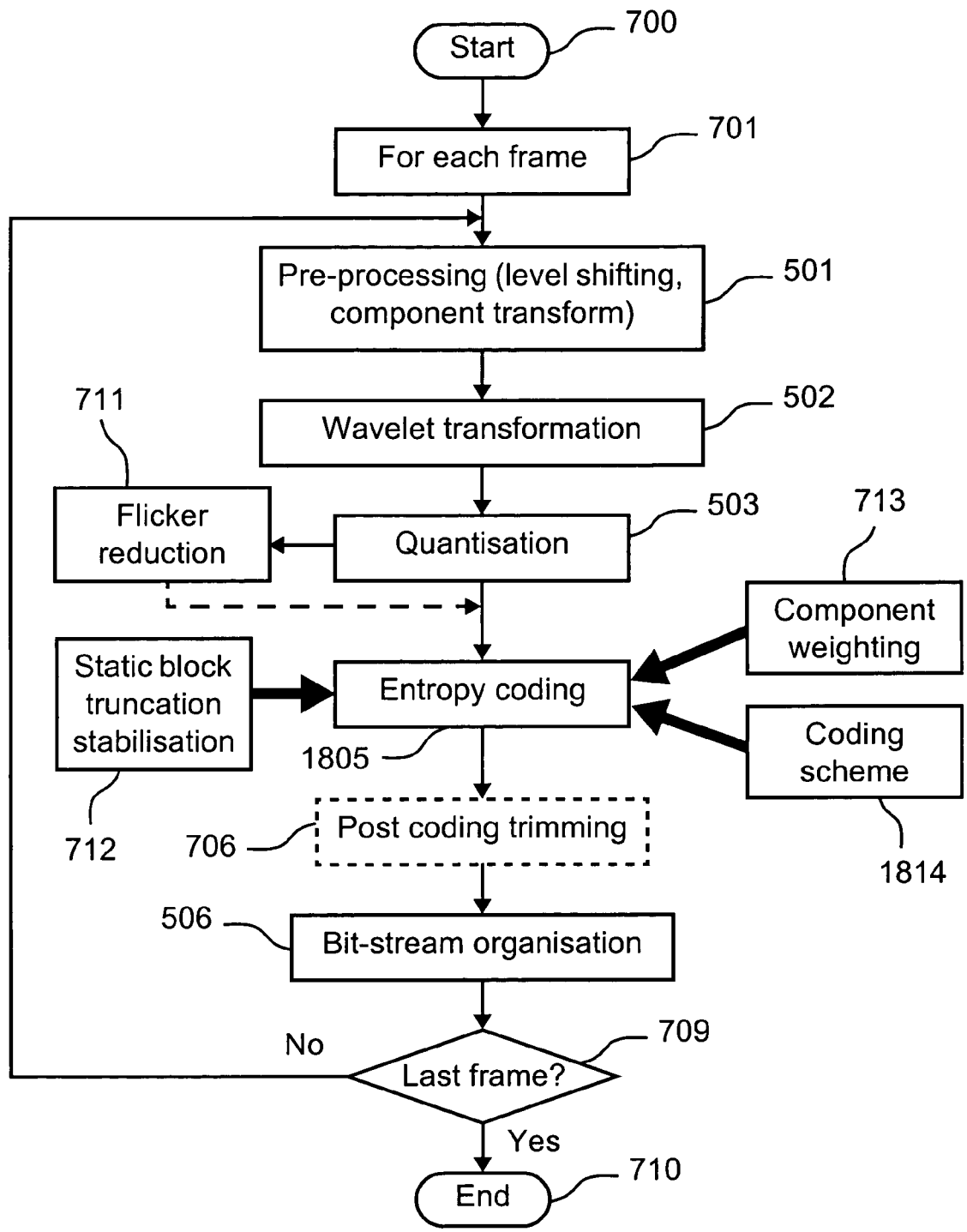
FIG. 18 shows a flow chart of a second arrangement for compressing video images in accordance with the present disclosure.

A second arrangement for compressing a video sequence is shown in FIG. 18. The second arrangement has several elements in common with the first arrangement described with respect to FIG. 7, but differs in that a different coding scheme is used. When encoding a coding pass for a current code-block, the second arrangement predicts a rate-distortion slope of the next coding pass and uses the predicted slope when determining whether to terminate coding.

An overview of the second arrangement for processing a video sequence will now be described with reference to FIG. 18. The method begins at 700 and then enters loop 701 to process each frame f of the video sequence in turn, beginning with the first frame of the sequence. After all the frames are processed, loop 701 exits at step 709 and the method 1800 terminates at step 710.

Within loop 701, in step 501 the processor 2705 performs any necessary preprocessing for the current frame, including level shifting and component transformation as required. After preprocessing, in step 502 the discrete wavelet transform is applied to the image by the processor 2705. The wavelet transformed coefficients are then quantized to integer values in step 503. After quantizing the wavelet coefficients, the processor 2705 preferably applies the flicker reduction scheme 711. Thus far the method is the same as the method of the first arrangement.

Next, in step 1805 the processed quantized wavelet coefficients of the current image are arranged into code-blocks and each code-block is encoded in bit-planes with an arithmetic encoder. The coding 1805 of a code-block is governed by a coding scheme 1814 to avoid over-coding where possible.

In addition the coding 1805 of a code-block $n_f$ preferably makes use of the component weighting scheme 713 described above. Furthermore, while coding code-block $n_f$, the decision to terminate the encoding process in step 1805 is preferably affected by the static block truncation stabilization scheme 712 described above.

After coding is complete for a code-block in current frame f, a post-coding trimming scheme 706 is optionally applied for further rate control.

Then, in step 506 the coded data of frame f is organized into a bit-stream to output the compressed video frame. The compressed frame may be transmitted over the computer network 2720, or it may be stored for future use, for example on CD-ROM 2712.

In step 709 a test is entered to determine whether f is the last video frame in the video sequence. If test 709 returns negative then processing returns to step 501 to process the next video frame. If test 709 returns positive then loop 701 exits and the method ends in step 710.

4.1 Coding Scheme with Prediction of Rate-distortion Slope

The second arrangement uses a coding method 1814 to avoid over-coding of each code-block. Entropy coding 1805 using coding scheme 1814 is now described with reference to FIG. 19. For clarity some, but not all, steps of FIG. 18 are repeated in FIG. 19.

The method starts in step 700 and enters loop 701, which processes each frame f of the video in turn, commencing with the first frame. After having processed all the frames of the video, loop 701 exits at step 709 and the method terminates at step 710.

Figure 19:
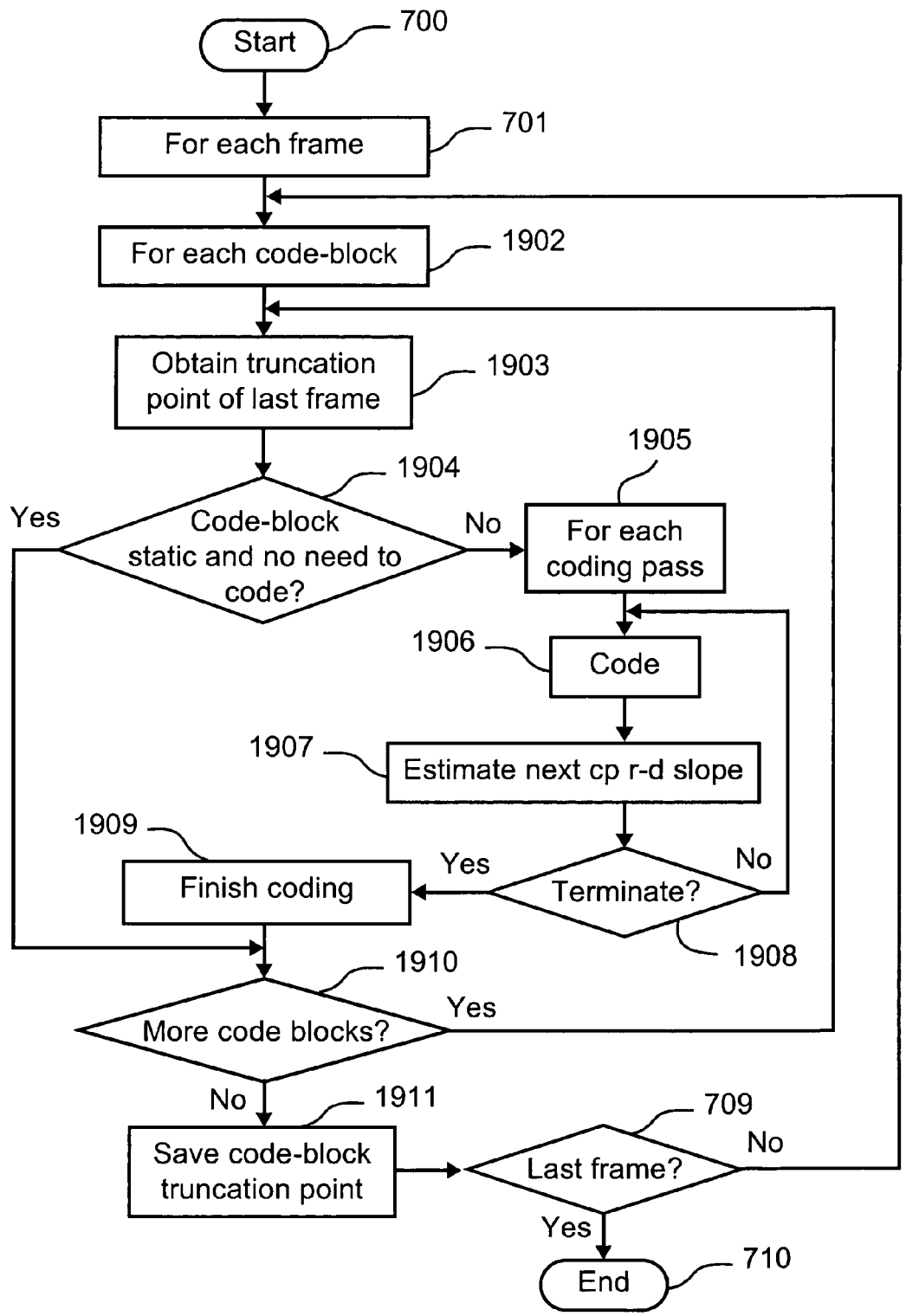
FIG. 19 shows a flow chart of a coding scheme for use with the second arrangement of FIG. 18.

Within loop 701 the processor 2705 performs for each video frame the usual J2K encoding steps such as preprocessing, DWT and quantization (steps 501-503, not shown in FIG. 19). The method then enters another loop 1902 for processing each code-block $n_f$ in frame f After having processed all the code-blocks in a single video frame, loop 1902 exits at 1910, following which step 1911 stores the truncation point of each code-block $n_f$.

Within loop 1902, in step 1903 the processor 2705 first retrieves the truncation point of code-block $n_{f-1}$. Note this step is skipped if f=1, which is treated as a special case. For the first frame, instead of entering step 1903 the processing enters step 1904.

In step 1904 a test is carried out to determine whether to proceed coding code-block $n_f$ or not. If code-block $n_f$ is determined to be a static code-block and code-block $n_{f-1}$ was not coded, then test 1904 will be positive in which case processing proceeds to step 1910 and no coding is performed for code-block $n_f$. A procedure for determining if a code-block is static is described above with reference to FIG. 11.

If, however, test 1904 returns negative, process flow proceeds to step 1905 in order to encode the current code-block. In step 1905 a loop is entered for coding each coding pass $i_n$ of code-block $n_f$. The maximum number of coding passes to code for a particular code-block is determined prior to coding. Note that in J2K there are nominally three coding passes for each bit-plane.

Step 1906 codes the current coding pass of the current code-block using the usual JPEG2000 encoding methods. Upon first entering loop 1905, step 1906 performs the clean-up pass. In subsequent iterations, step 1906 performs a significance propagation pass, a magnitude refinement pass and a clean-up pass in this order before resuming the cycle with a significance propagation pass. Step 1906 determines a distortion value and a rate associated with the current coding pass $i_n$.

Next, the rate and distortion values are used by the processor 2705 in step 1907 to estimate the rate-distortion slope $\lambda^{i_n+1}$ of the next coding pass $i_n+1$. The estimation is performed based on the previous rate-distortion slopes of the coding passes processed so far for the current code-block. The estimation method is described in more detail below with respect to FIG. 21.

Next, step 1908 tests whether to terminate the encoding process after the current coding pass. If termination test 1908 is negative and if there are more coding passes to process, then process flow returns to step 1906 to encode the next coding pass. If, however, termination test 1908 is positive, meaning that the current coding pass is determined as the final coding pass, then process flow proceeds to step 1909 to finish coding code-block $n_f$. Finishing the coding process involves terminating the arithmetic encoding engine, resource cleanup and the like.

Once coding is complete, step 1910 tests whether there are any more code-blocks to process. If so, (the Yes option of step 1910) then processing returns to step 1903 to process the next code-block. If test 1910 returns negative then loop 1902 exits at step 1910. After all the code-blocks have been processed J2K encoding steps such as bit-stream organization are carried out (not shown).

In step 1911 the truncation points of all code-blocks are stored into memory 906 for use in processing the next video frame. Then, step 709 tests whether the current frame is the last frame. If test 709 returns positive, process flow returns to step 1902 to process the next frame. If test 709 returns negative loop 701 exits and the method ends in step 710.

4.1.1 Termination Criteria

Figure 20A:
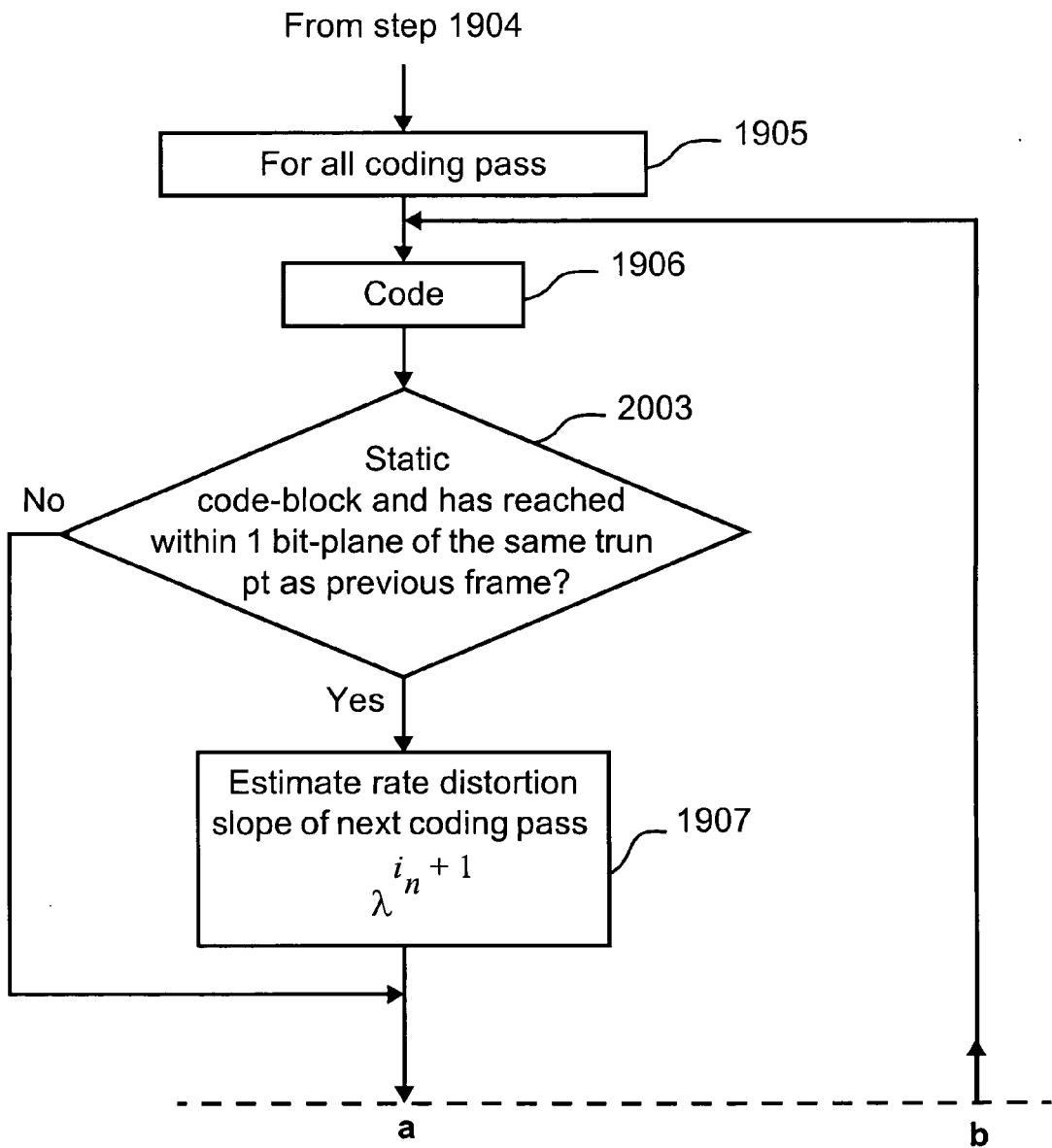

FIG. 20(*a*) and 20(*b*) shows a flow chart that describes the termination test of step 1908. For clarity, FIG. 20(*a*) and 20(*b*) repeats some, but not all, the steps of FIG. 19. The decision to terminate encoding code-block $n_f$ after a current coding-pass uses the estimated rate-distortion slope of the next coding pass $\lambda^{i_n+1}$ and the truncation point of code-block $n_{f-1}$.

Referring to FIG. 20(*a*) and 20(*b*), in step 1905 a loop is entered to process the coding of each coding pass of a current code-block in video frame f. After having performed the coding for all the required coding passes, loop 1905 exits and step 1909 finishes the coding process for the current code-block.

Loop 1905 iterates coding pass ($i_n$) from the first coding pass to the last coding pass of the current code-block. Step 1906 first codes the quantized wavelet coefficients of a code-block $n_f$ in one of three passes, as described above. Then, in step 2003 a test is carried out to determine if code-block $n_f$ is classified as a static code-block and if coding has reached to within the last B bit-planes of code-block $n_{f-1}$ (i.e. if the coded bit-planes in the current code-block exceed the truncation bit plane of code-block $n_{f-1}$ minus B bit-planes). Preferably B=1, although other values of B can be used. If test 2003 returns negative then processing continues at step 2005 and $\lambda^{i_n+1}$ is not estimated. If, however, test 2003 returns positive then $\lambda^{i_n+1}$ is estimated in step 1907.

Processing continues in step 2005, in which a test is carried out to determine if code-block $n_f$ is a static code-block and if coding pass $i_n$ is equal to the truncation point of code-block $n_{f-1}$. If test 2005 returns positive then the coding of code-block $n_f$ terminates and process flow proceeds to step 1909 to finish coding. If test 2005 returns negative then a further test is carried out in step 2006.

Step 2006 tests if the estimated $\lambda^{i_n+1}$ (as determined in step 1907) is greater than $\lambda_f$. If this is the case, then processing returns to step 1906 to code the next coding pass (i.e. $i_n:=i_n+1$) of code-block $n_f$. If test 2006 is positive (i.e. the estimated rate-distortion slope is less than the cutoff threshold), then a farther test is carried out in step 2007.

Step 2007 tests for any non-zero clean-up pass rate-distortion slopes among the coding passes already coded. If there are none, then processing returns to step 1906 to process the next coding pass. In other words, step 2007 checks all coding passes $i_n$ processed so far for code-block $n_f$, and determines if there are any clean-up coding passes with non-zero $\lambda^{i_n}$. If test 2007 is positive then a further test is carried out in step 2008.

Step 2008 determines if more than two significant bit-planes were coded in code-block $n_{f-1}$. If test 2008 returns negative then processing continues at 2010. If test 2008 returns positive then step 2009 tests whether more than two significant bit-planes have been coded so far in code-block $n_f$. If this is the case then processing continues at step 2010. If, however, test 2009 returns negative (i.e. less than two bit-planes have been encoded) then processing returns to step 1906 to code the next coding pass.

In step 2010 a further test is carried out to determine if the compressed data generated by coding pass $i_n$ in step 1906 is greater than E bytes in length. In the second arrangement preferably E=3 bytes. If test 2010 returns negative then processing returns to step 1906 to process further coding passes. If test 2010 returns positive then loop 1905 exits and the coding process of code-block $n_f$ is finished up in 1909.

Note that the $\lambda^{i_n}$ for code-block $n_f$ used in step 1907 to perform the estimation of $\lambda^{i_n+1}$ are slopes that lie on the rate-distortion convex hull for code-block $n_f$. In other words the convex hull for code-block $n_f$ is computed after each coding pass.

In further variations of the second arrangement, additional coding terminating conditions apart from those described in steps 2003 to 2010 of FIG. 20(*a*) and 20(*b*) can be included.

4.1.2 Estimating the Next Rate-distortion Slope

Figure 21:
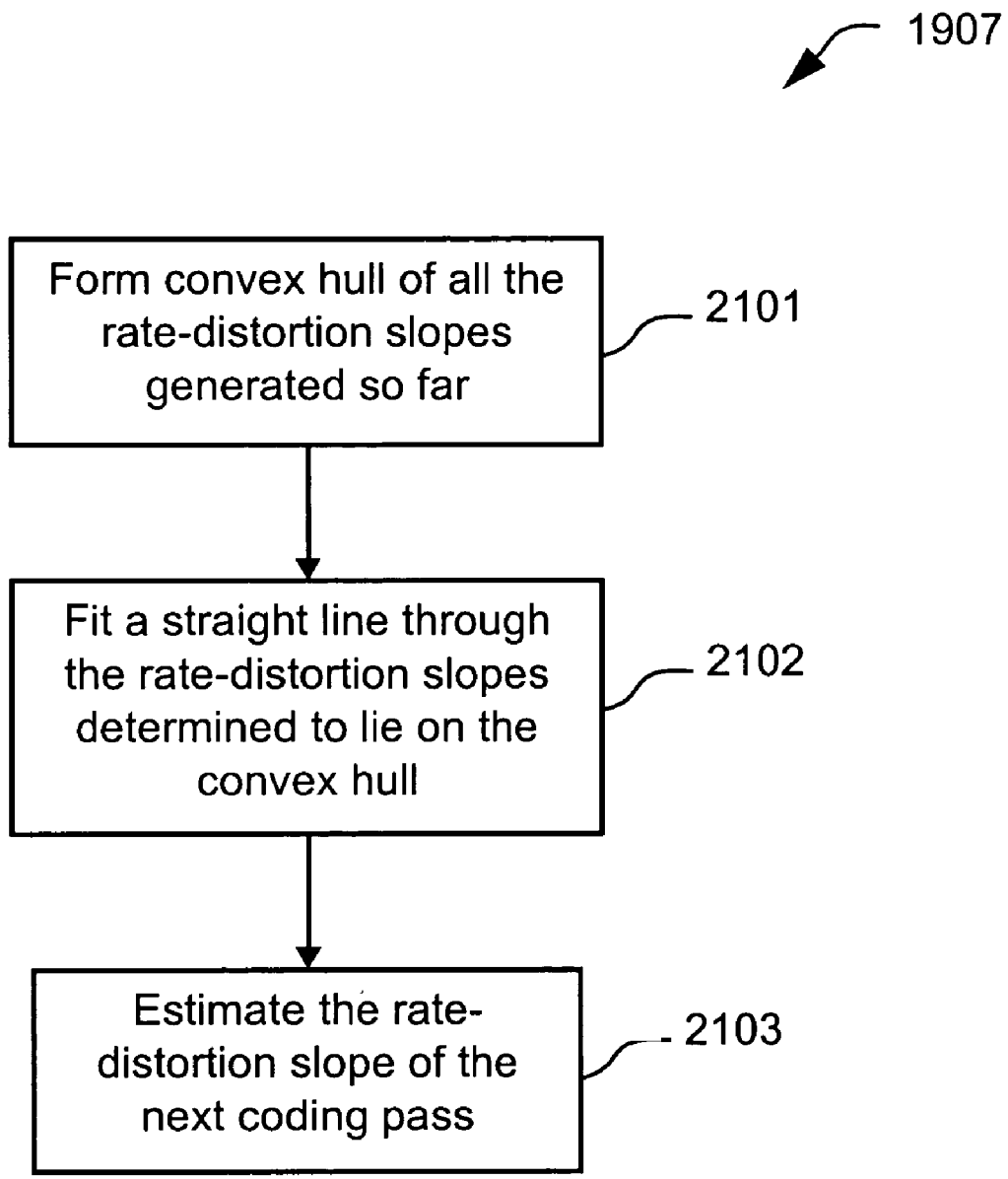
FIG. 21 shows a flow chart of a method of predicting the rate-distortion slope of a next coding pass, for use in the method of FIG. 20(a) and 20(b)

A method for estimating $\lambda^{i_n+1}$ is shown in FIG. 21. The steps of FIG. 21 correspond to step 1907.

Figure 22:
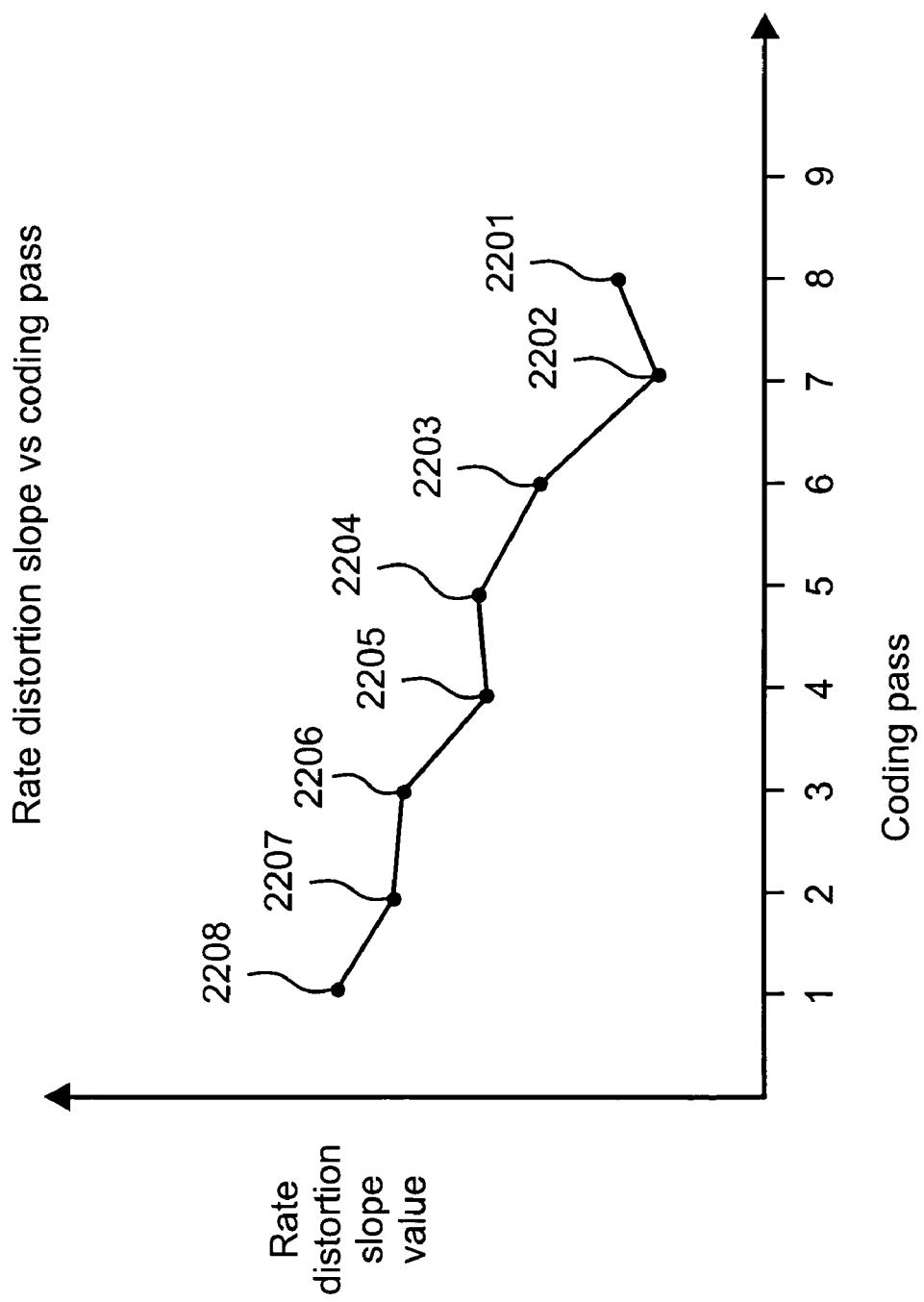
FIG. 22 shows an example of rate-distortion slopes plotted for a number of coding passes.

In step 2101 the convex hull of the rate-distortion slope points generated so far for code-block $n_f$ is formed. The convex hull is formed by:

1. Plotting the rate-distortion slopes of each coding pass for code-block $n_f$. FIG. 22 shows an example of a rate-distortion slope versus coding pass plot. The y-axis is the rate-distortion slope and the x-axis is the corresponding coding pass. The example of FIG. 22 shows slopes for eight coding passes. Slope 2208 corresponds to the first coding pass, slope 2207 corresponds to the second coding pass, slope 2206 corresponds to the third coding pass, and so on until slope 2201, which corresponds to the eighth coding pass. In general, the slopes decrease with each successive coding pass, but the decrease is not monotonic.
2. From the last coding pass for code-block $n_f$, work back towards the first coding pass and set rate-distortion slopes to 0 if the rate-distortion slope does not increase in value. In the example of FIG. 22 and starting at slope 2201, the rate-distortion slope 2202 is set to 0 because the value of slope 2202 is smaller than the value of slope 2201. Rate-distortion slope 2203 is included in the convex hull because the value of slope 2203 is greater than the rate-distortion slope 2201. In a similar fashion, slope 2204 is included in the convex hull, but slope 2205 is set to zero. This process is repeated until slope 2208.

Figure 23:
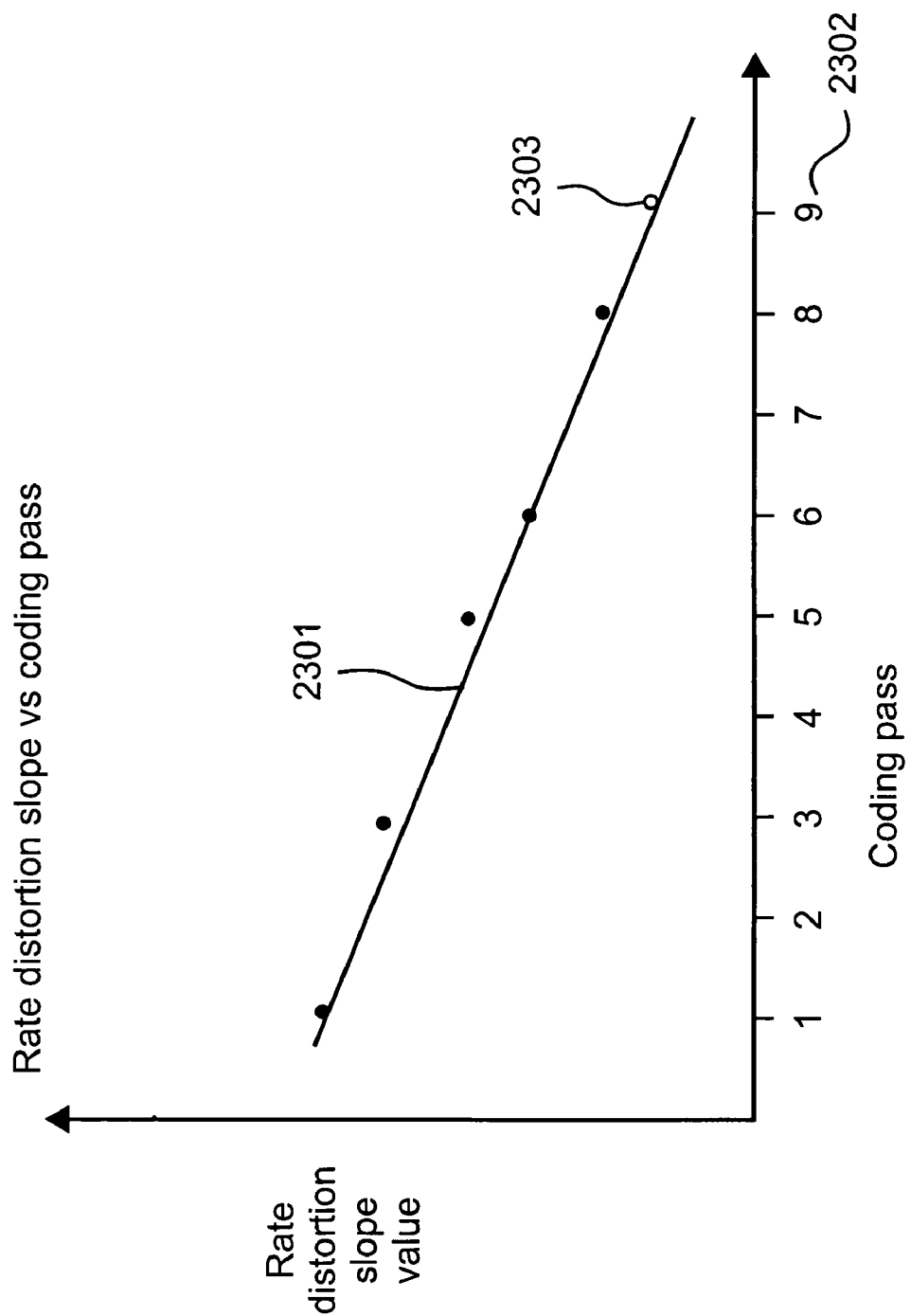
FIG. 23 shows the convex hull of the plot of FIG. 22.

If the rate-distortion slope $\lambda^{i_n}$ of coding passes $i_n$ is not on the convex hull, the rate-distortion slope is set to zero. Once the convex hull has been formed, step 2102 fits a straight line through the rate-distortion slopes on the convex hull. This is illustrated in FIG. 23, in which straight line 2301 is fitted to the slopes of the convex hull of FIG. 22.

In step 2103 the fitted line is linearly extrapolated to estimate the rate-distortion slope $\lambda^{i_n+1}$. For example referring to FIG. 25, the rate-distortion slope $\lambda^{i_n+1}$ 2303 for coding pass 9 (2302) is estimated by assuming that it lies on the straight line 2301.

In other variations the estimation of $\lambda^{i_n+1}$ is obtained with other forms of estimation instead of the linear estimation just described (for example using spline estimation). In addition further variations on the estimation process use $\lambda^{i_n}$ values of only clean-up passes without forming a convex hull in step 2101.

5.0 Flicker Reduction

As seen in FIGS. 7 and 18, the first and second arrangements preferably utilize a flicker-reduction method 711.

The non-linear quantization process of Motion JPEG 2000 amplifies the sensor noise that is present in the original video sequence. It is desirable to stabilize this noise amplification. Smoothing techniques have been used in Motion JPEG 2000 wherein wavelet coefficients of a previous frame are used to smooth the wavelet coefficients of the current frame. The memory cost associated with coefficient storage can be significant.

However, to avoid flicker artifacts, it is not necessary to store the entire wavelet coefficient of the previous frame. Instead, smoothing can be achieved using only two bits of a coefficient. Thus, if 32 bits were ordinarily to be used in storing the coefficients of a previous frame, then the 2-bit smoothing technique described below reduces the memory required to store an entire previous frame by a factor of 16.

The non-linear amplification of noise can be regarded as the propagation of noise within the bit patterns of a wavelet coefficient. The technique described below with reference to FIGS. 24-26 smooths the amplification that propagates through the bits of the wavelet coefficient of the current frame. Only two bits of the corresponding coefficient in the previous frame are required.

Under certain constraints applying the following formula to the current wavelet coefficients smooths the flicker:

$$|C^f| = |C^f| + (\alpha_{L(f)}{}^f - \alpha_{L(f)}{}^{f-1}) * (2 * |\alpha_{L(f)-1}{}^f - \alpha_{L(fn)-1}{}^{f-1}| - 1) * 2^{-L(f)} \quad (19)$$

where $|C^f|$ denotes the magnitude of the coefficient and $\alpha_p \in \{0,1\}$.

As defined above, the values $\alpha_p$ denote the $p^{th}$ binary digit of the fractional part of the coefficient. The index f refers to the current frame and (f−1) refers to the previous frame.

The truncation bitplane L(f) is a key parameter of equation (19), because it is used as a reference to smooth the coefficient. L(f) is the truncation bitplane in the current frame. However, the truncation bitplane may not be available until encoding of the code-block is complete. Consequently, the arrangements instead make use of the truncation bitplane of the corresponding previous code-block, L(f−1).

The modified version of equation 19 is:

$$|C^f| = |C^f| + (\alpha_{L(f-1)}{}^{f-1}) * (2 * |\alpha_{L(f-1)-1}{}^f - \alpha_{L(f-1)-1}{}^{f-1}| - 1) * 2^{-L(f-1)}. \quad (20)$$

Figure 24:
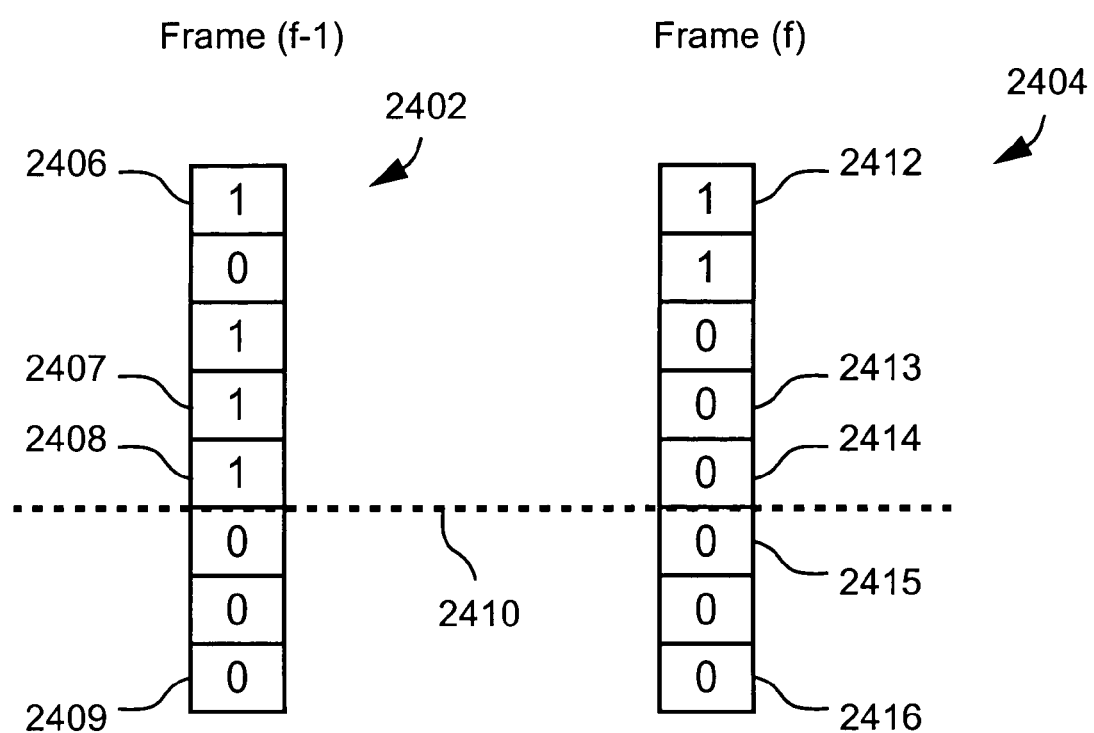
FIG. 24 is an example of two corresponding coefficients in successive frames.

FIG. 24 is a schematic diagram that illustrates the position of the binary digits used in the flicker smoothing technique 711. FIG. 24 shows a coefficient 2404 in the current frame n, and a corresponding coefficient 2402 in the previous frame, (f−1). For illustrative purposes, the two coefficients are shown as having 8 bits. The most significant bit of coefficient 2402 is bit 2406, and the least significant bit of coefficient 2402 is bit 2409. The indexing of the bits commences at the most significant bit and is incremented until the least significant bit is reached.

The line 2410 denotes the truncation bitplane L(f−1) of the coefficient in frame (f−1). In the example, the three least significant bits of coefficient 2402 are discarded.

Bit 2407 is $\alpha_{L(f-1)-1}{}^{f-1}$. Bit 2408 is $\alpha_{L(f-1)}{}^{f-1}$. Bits 2407 and 2408 are the two least-significant bits of the truncated form of coefficient 2402.

In coefficient 2404 of the current frames bit 2413 is $\alpha_{L(f-1)}{}^{f-1}$. Bit 2414 is $\alpha_{L(f-1)}{}^f$. Bit 2415 is $\alpha_{L(f-1)+1}{}^{f-1}$. Thus, if coefficient 2404 is truncated at bitplane L(f−1), then bit 2415 is the most significant discarded bit, and bits 2413 and 2414 are the two least-significant bits remaining in the truncated form of coefficient 2404.

The flicker reduction technique makes no distinction between signal and noise. As a result, when a wavelet coefficient in the current frame f differs from the corresponding wavelet coefficient in the previous frame f−1, the current coefficient will be smoothed, even though the difference is genuinely present in the signal and is not a result of noise. However, the change to the magnitude of the wavelet coefficient is so small that it is not noticeable.

Figure 25:
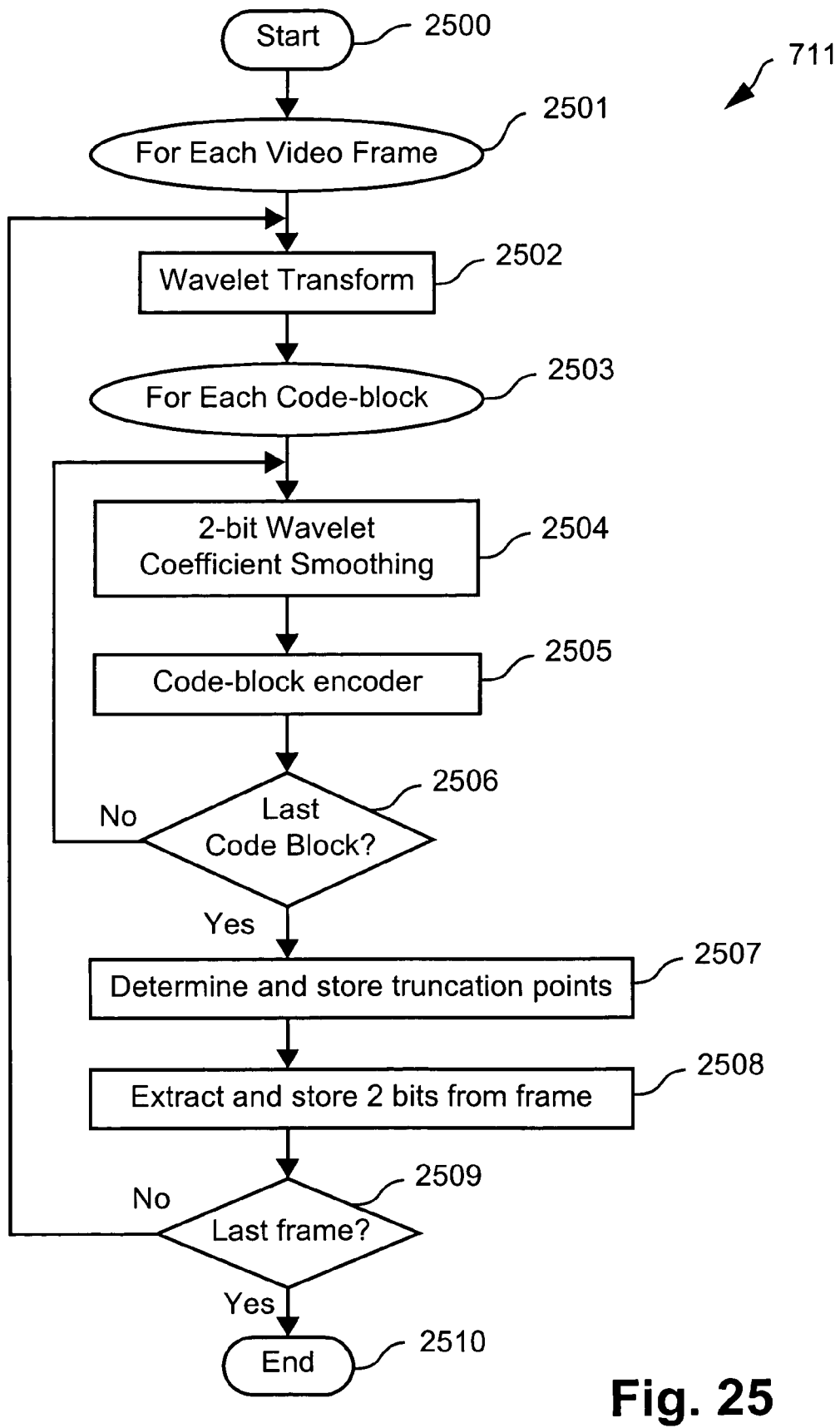
FIG. 25 shows a flow chart of a method of compressing a sequence of frames of a video into Motion JPEG2000 format using two-bit smoothing for flicker reduction.

FIG. 25 shows a flow chart of a technique for flicker reduction of a Motion JPEG2000 video sequence using two bits per coefficient from the previous frame. The flicker smoothing is effected in steps 2504 and 2508 of the process. The remaining steps of FIG. 25 can be implemented using standard Motion JPEG2000 encoding techniques.

The method begins at step 2500, in which any necessary variables are initialized. Next, a loop 2501 commences for compressing one frame at a time in the video sequence. Once the loop 2501 has processed all the frames, the loop exits at step 2509 and processing terminates at step 2510.

Within the loop 2501, a discrete wavelet transform (DWT) is applied to the current frame in step 2502. Next, a loop 2503 is entered wherein each iteration encodes a code-block of the current frame.

In step 2504 the two-bit flicker-smoothing technique is applied to the wavelet coefficients in the current code-block. Step 2504 will be described in more detail with reference to FIG. 26.

Next, in step 2505, the arithmetic encoding of the current code-block is processed. Then, in step 2506, the processor 2705 checks whether the current code-block is the last code-block in the frame. If there are still code-blocks within the frame (the NO option of step 2506), process control returns to step 2504, in which the next code-block is processed. If the current block is the final block in the current frame (the YES option of step 2506) then process flow proceeds to step 2507.

In step 2507 the truncation depths of all the code-blocks are determined in order to fit the targeted bit-rate. A suitable technique for step 2507 is the PCRD-opt algorithm recommended by the JPEG2000 Standard and described above with reference to FIG. 6. Other bit-rate control techniques may be used to provide truncation point information. This truncation point information is a requirement for decoders compliant with the Motion JPEG 2000 Standard. The truncation points for the code-blocks of the current frame are stored in memory to be used for encoding the next frame.

In step 2508 the two bits $\alpha_{L(f)}{}^f$ and $\alpha_{L(f)-1}{}^f$ of each wavelet coefficient in the current frame are extracted. The two extracted bits for each coefficient are stored in memory for use in processing the following frame in the video sequence.

Next, in step 2509, the processor 2705 checks whether the current frame is the last frame in the video sequence. If there are frames remaining (the NO option of step 2509), process flow returns to step 2502, in which the DWT is applied to the next frame. If, however, the current frame is the final frame (the YES option of step 2509), then processing terminates in step 2510.

FIG. 26 is a flow chart that shows in greater detail the two-bit wavelet coefficient smoothing of step 2504. The two-bit flicker-smoothing technique commences at step 2600. Next, step 2601 tests whether the current frame is the first frame in the sequence. The first frame cannot be smoothed by the two-bit smoothing technique as there is no available information relating to earlier frames. If the current frame is the first frame (the YES option of step 2601), control flow terminates in step 2612. The overall algorithm thereby bypasses the steps of the smoothing algorithm and continues with step 2505.

If the current frame is not the first frame in the sequence (the NO option of step 2601), then control flow proceeds to step 2602, entering a loop in which each coefficient within the current code-block is considered.

In step 2603, the first step within loop 2602, two stored bits ($\alpha_{L(f-1)}$ and $\alpha_{L(f-1)-1}$) of the corresponding coefficient in frame (f−1) are retrieved from memory. In the illustrative example of FIG. 24, the two bits retrieved in step 2603 are bits 2407 and 2408, i.e. the two least-significant bits of the corresponding coefficient of the previous frame.

Step 2603 also retrieves the truncation point T of the corresponding code-block of frame (f−1). This previous truncation point T(f−1) was stored in memory as described in step 2508. The truncation bitplane L(f−1) may be obtained by applying the following equation:

$$L(f-1) = 2 + \text{floor}[(T(f-1)+2)/3], \quad (21)$$

where floor is an operator such that any real number is approximated by the lower nearest integer.

Next, in step 2604, the binary digits of the current coefficient $C^f$ are retrieved. Step 2605 then determines whether the current coefficient requires smoothing.

A suitable test for use in step 2605 is:

$$(Q[|C^f|, L(f-1)] > 0) \| (Q[|C^f|, L(f-1)] == 0 \&\& Q[|C^f|, L(f-1)+1] != 0 \&\& \alpha_{L(f-1)}{}^{f-1} == 1), \quad (22)$$

where the operator $\|$ is a logical OR; $==$ is an operator that returns TRUE if both operands have the same value; $\&\&$ is a logical AND; and $!=$ (i.e. not equal to) is an operator that returns TRUE if the operands are different from one another.

The operand to the left of the logical OR examines the magnitude of the current coefficient, truncated at bitplane L(f−1). This corresponds to the summation:

$$Q[|C^f|, L(f-1)] = \sum_{p=1}^{L(f-1)} a_p 2^{-p} \quad (23)$$

If the summation of equation (23) is greater than zero, it implies that at least one binary digit of the current coefficient, truncated at bitplane L(f−1), is 1. In the illustrative example of FIG. 24, the expression on the left of the logical OR tests whether at least one of bits 2412-2414 is nonzero. If the expression of equation (22) is TRUE, it implies that the current coefficient is likely to be encoded into the bitstream, and accordingly it is appropriate to apply two bit smoothing to the current coefficient.

The expression to the right of the logical OR in equation (22) is TRUE when the current coefficient is unlikely to be coded when the truncation bitplane remains the same as that of the previous frame. However, the expression to the right of the logical OR identifies a particular constellation of bits that makes it desirable to apply the two-bit smoothing technique to the current coefficient.

The expression first checks whether the summation of equation (23) is equal to zero. This implies that, if the current coefficient is truncated at bitplane L(f−1), all the remaining binary digits of the current coefficient are zero. In the example of FIG. 24 this condition would be satisfied if all bits 2412-2414 are equal to zero. When this is the case, the current coefficient is unlikely to be coded.

The second term of the expression looks at the significance of the current coefficient when the next most significant bit is added to the truncated form of the current coefficient. In the example of FIG. 24, this additional bit considered is bit 2415. The second expression involves the summation:

$$Q[|C^f|, L(f-1)+1] = \sum_{p=1}^{L(f-1)+1} a_p 2^{-p} \quad (24)$$

With reference to FIG. 24, the particular constellation of bits identified by the expression on the right of the logical OR in equation (22) arises when bit 2408 is "1", bit 2415 is "1" and bits 2412-2414 are all "0".

If the current coefficient does not require smoothing (the NO option of step 2605), then control flow proceeds to step 2610, bypassing the smoothing steps 2606 and 2607. If, however, smoothing is required (the YES option of step 2605) the control flow proceeds to step 2606, in which the magnitude of the current coefficient is smoothed.

The smoothing of step 2606 is performed by application of equation (20). Alternatively, the following look-up table can be used for the smoothing step 2606:

TABLE 5

Look-up table for modifying current coefficient.

| $a_{L(f-1)}{}^f$ | $a_{L(f-1)-1}{}^f$ | $a_{L(f-1)-1}{}^{f-1}$ | Add to current coefficient at L(f − 1) truncation bitplane |
|---|---|---|---|
| 0 | 0 | 0 | +1 |
| 0 | 0 | 1 | −1 |
| 0 | 1 | 0 | −1 |
| 0 | 1 | 1 | +1 |
| 1 | 0 | 0 | −1 |
| 1 | 0 | 1 | +1 |
| 1 | 1 | 0 | +1 |
| 1 | 1 | 1 | −1 |

In Table 5, when the condition specified in the first three columns is satisfied, the quantity shown in the fourth column is added to the L(f−1) truncation bitplane of the current coefficient. Table 5 is only applied in cases where $\alpha_{L(f-1)}{}^f$ and $\alpha_{L(f-1)}{}^{f-1}$ are different. As may be seen from equation (20), when the bits at the truncation bit plane L(f−1) are the same in frames f and (f−1), the current coefficient is unchanged.

In the following step, 2607, the sign of the wavelet coefficient is restored.

Next, in step 2610 the processor 2705 checks whether the current coefficient is the last coefficient in the code-block. If there are still coefficients remaining in the code-block (the NO option step of 2610), process flow returns to step 2603 to process the next coefficient. If, however the current coefficient is the last coefficient of the code-block (the YES option of step 2610), then the two-bit wavelet coefficient smoothing terminates in step 2611 and the overall algorithm proceeds to step 2505 of FIG. 25.

Other conditions can be added to step 2605. For example, the following condition may be tested:

$$L(f-1) = L(f-2).$$

This condition is used to ensure that the truncation bitplane of the code-block has not changed from frame (f−2) to frame (f−1). This makes it more likely that the truncation bitplane has not changed from frame (f−1) to the current frame f. In order to use this condition, one could store the truncation points of each code-block of frame (f−2). Alternatively, one could store a flag that indicates whether the change took place.

Additionally, the conditions $$Q[|C^f|, L(f-1)] == 0 \text{ and } Q[|C^f|, L(f-1)] \neq \sum_{j=1}^{L} 2^{-j}$$

can be used in step 2605 to avoid some undesired artifacts.

It is possible to further reduce the memory needed for storing the two bits of the current coefficient. In step 2508, only four kinds of two-bit words are stored: (0,0), (0,1), (1,0) and (1,1). In relevant applications, the inventors have observed that more than 80% of the two-bit words which are stored are (0,0). Consequently, by storing the (0,0) word using a single bit zero and by storing the other words as 101, 110 and 111 respectively, the memory needs can be further reduced to 1.4 bits per wavelet coefficient on average. It may be possible to further reduce this figure using other techniques.

The two-bit wavelet coefficient smoothing technique is preferably applied to all the components of a frame. Nevertheless, some experiments show that, using the $YC_bC_r$ color space, smoothing only the Y component was enough to significantly reduce the visual artifacts caused by flicker. Smoothing only the Y component could result in reducing the memory requirement to less than one bit per wavelet coefficient (for example, 0.95 bits per wavelet coefficient using the 4:2:0 $YC_bC_r$ color space.

The two-bit wavelet coefficient smoothing technique is preferably applied to all the code-blocks of a component of a frame. However, it is possible to apply the smoothing technique only to levels 1, 2 and 3 of the DWT resolution level. This would further reduce the memory required to store the bits while significantly reducing the flicker artifacts.

In one implementation of the method, the truncation bitplane L used to truncate the coefficients may be selected as a function of sensor noise.

As outlined above, the modification of wavelet coefficients in the current frame f is based on two bits per wavelet coefficient from the previous frame (f−1). Note that in computing the correlation coefficient Md, the wavelet coefficients of the last frame (f−1) are also needed. The correlation coefficient is used to indicate changes between corresponding code-bocks due to motion. The correlation coefficient will still indicate changes to motion if it is computed with only two bits of precision per wavelet coefficient. Accordingly, the two bits which are used in filtering the current coefficient by the method of FIG. 26 are also sufficient to compute the correlation coefficient.

6.0 Industrial Applicability

It is apparent from the above that the arrangements described are applicable to the video and computer industries.

The foregoing describes only some embodiments of the present invention, and modifications and/or changes can be made thereto without departing from the scope and spirit of the invention, the embodiments being illustrative and not restrictive. For example, the methods have been described in the context of applying a discrete wavelet transform (DWT) to input images. However, the methods described herein can also be used when different transforms, such as the discrete cosine transform (DCT), are applied to the input images.

The claimes defining the invention are as follows:

1. A method of compressing a current image of a sequence of images in a computer apparatus by a processor, said method comprising the steps of:
    (a) transforming the current image with a predetermined transform to provide a set of transform coefficients by the processor;
    (b) dividing the set of transform coefficients into a plurality of blocks, by the processor;
    (c) encoding a block of the plurality of blocks in a series of coding passes, the encoding including:
        (i) comparing the block being encoded with a corresponding block of a previously encoded image in the sequence, by the processor;
        (ii) determining if the block being encoded is a static block based on a result of the comparing of the block with the corresponding block, by the processor; and
        (iii) terminating encoding of the block at a truncation point of the corresponding block of the previously encoded image in the sequence only if the block is a static block.

2. The method as claimed in claim 1, further comprising:
    a predicting step of predicting a performance measure for a subsequent coding pass in the series and said terminating step terminates encoding of the block before the subsequent coding pass.

3. The method as claimed in claim 2 wherein said predicting step comprises the steps of:
    fitting a model to a set of performance measures of coding passes already coded in the series; and
    estimating the performance measure of the subsequent coding pass from the model.

4. The method as claimed in claim 3 wherein the set of performance measures comprises a convex hull of the coding passes already coded in the series.

5. The method as claimed in claim 3 wherein the set of performance measures comprises the performance measures of clean-up passes of the series of coding passes.

6. The method as claimed in claim 2 wherein the performance measure is a rate-distortion slope and the encoding termination criterion is satisfied if the predicted rate-distortion slope is less than a rate-distortion cut-off threshold.

7. The method as claimed in claim 1 wherein encoding of the block is not terminated at the terminating step if a codeword generated by said encoding step is less than a predetermined size.

8. The method as claimed in claim 7 wherein the predetermined size is three bytes.

9. The method as claimed in claim 1 wherein encoding of the block is not terminated at the terminating step if there are no non-zero clean-up passes in the series of coding passes.

10. A system for compressing a current image in a sequence of images, the system comprising:
- a storage unit that stores information descriptive of the compression of previous images in the sequence; and
- a processor connected to said storage unit, said processor comprising:
  - means to transform the current image with a predetermined transform to provide a set of transform coefficients;
  - means to divide the set of transform coefficients into a plurality of blocks;
  - means to encode a block of the plurality of blocks in a series of coding passes;
  - means to compare the block being encoded with a corresponding block of a previously encoded image in the sequence;
  - means to determine if the block being encoded is a static block based on a result of the comparing of the block being encoded with the corresponding block;
    - means to terminate encoding of the block at a truncation point of the corresponding block of the previously encoded image in the sequence only if the block is a static block; and
  - means to store information descriptive of the compression of the current image in said storage unit.

11. A non-transitory computer readable storage medium having a program stored thereon, the program being executable in a compressing apparatus to perform a method of compressing a current image of a sequence of images, the method comprising the steps of:
- (a) transforming the current image with a predetermined transform to provide a set of transform coefficients;
- (b) dividing the set of transform coefficients into a plurality of blocks;
- (c) determining an encoding termination condition for a block of the plurality of blocks;
- (d) encoding the at least one block in a series of coding passes, the encoding includes:
  - (i) comparing the block being encoded with a corresponding block of a previously encoded image in the sequence;
  - (ii) determining if the block being encoded is a static block based on a result of the comparing of the block with the corresponding block; and
  - (iii) terminating encoding of the block at a truncation point of the corresponding block of the previously encoded image in the sequence only if the block is a static block.

* * * * *